US012700161B2

(12) United States Patent
Chen et al.

(10) Patent No.: US 12,700,161 B2
(45) Date of Patent: Aug. 4, 2026

(54) 3D DIGITAL VIRTUAL CHARACTER GENERATION WITH FACIAL FEATURE PRESERVATION

(71) Applicant: Zoom Video Communications, Inc., San Jose, CA (US)

(72) Inventors: Wenyu Chen, Singapore (SG); Chichen Fu, San Jose, CA (US); Zhongyuan Hu, Singapore (SG); Qiang Li, Hangzhou (CN); Wenchong Lin, Hangzhou (CN); Bo Ling, Saratoga, CA (US); Gengdai Liu, Singapore (SG)

(73) Assignee: Zoom Communications, Inc., San Jose, CA (US)

( * ) Notice: Subject to any disclaimer, the term of this patent is extended or adjusted under 35 U.S.C. 154(b) by 11 days.

(21) Appl. No.: 18/433,672

(22) Filed: Feb. 6, 2024

(65) Prior Publication Data

US 2025/0252647 A1 Aug. 7, 2025

(51) Int. Cl.
*G06T 13/40* (2011.01)
*G06T 15/00* (2011.01)
(Continued)

(52) U.S. Cl.
CPC ............ *G06T 13/40* (2013.01); *G06T 15/005* (2013.01); *G06T 19/20* (2013.01); *H04N 7/157* (2013.01)

(58) Field of Classification Search
None
See application file for complete search history.

(56) References Cited

U.S. PATENT DOCUMENTS 6,556,196 B1 4/2003 Blanz et al.
8,860,731 B1 10/2014 Cohen Bengio et al.
(Continued)

FOREIGN PATENT DOCUMENTS

CN        116863064 A * 10/2023 ............. G06T 17/00
WO    WO-2023056356 A1 * 4/2023 ............... G06T 5/50
WO    WO-2023132881 A1 * 7/2023 ........... G06N 3/0495

OTHER PUBLICATIONS

Wu CY, Xu Q, Neumann U. Synergy between 3dmm and 3d landmarks for accurate 3d facial geometry. In2021 international conference on 3D Vision (3DV) Dec. 1, 2021 (pp. 453-463). IEEE. (Year: 2021).*
(Continued)

*Primary Examiner* — Zhengxi Liu
(74) *Attorney, Agent, or Firm* — Kilpatrick Townsend & Stockton, LLP

(57) ABSTRACT
Systems and methods for generating virtual characters for video conferencing are provided. In an example, a computing device accesses a source human face model, a target human face model, and a source virtual character face model as well as feature curves marked on the source human face model and the source virtual character face model. The computing device deforms the source virtual character face model based on the source human face model and the target human face model to generate a target virtual character face model. Deforming the source virtual character face model includes minimizing a loss function that includes terms defined based on the feature curves to preserve features of the source virtual character face model on the target virtual character face model. The computing device further renders the target virtual character face model.

14 Claims, 19 Drawing Sheets
(8 of 19 Drawing Sheet(s) Filed in Color)

VIRTUAL TRIANGLES 310

(a)

(b)

(c) (d)

(51) Int. Cl.
  *G06T 19/20*     (2011.01)
  *H04N 7/15*     (2006.01)

(56) References Cited

U.S. PATENT DOCUMENTS

| | | | |
|---|---|---|---|
| 12,198,241 | B1 | 1/2025 | Ivchenko et al. |
| 2009/0132371 | A1 | 5/2009 | Strietzel et al. |
| 2013/0076619 | A1 | 3/2013 | Carr et al. |
| 2014/0362091 | A1 | 12/2014 | Bouaziz et al. |
| 2015/0287229 | A1 | 10/2015 | Sela et al. |
| 2017/0091535 | A1 | 3/2017 | Yu et al. |
| 2018/0033190 | A1 | 2/2018 | Ma et al. |
| 2019/0266806 | A1 | 8/2019 | Aluru et al. |
| 2019/0325633 | A1 | 10/2019 | Miller, IV et al. |
| 2020/0234481 | A1 | 7/2020 | Scapel et al. |
| 2020/0306640 | A1 | 10/2020 | Kolen et al. |
| 2021/0005003 | A1 | 1/2021 | Chong et al. |
| 2021/0104086 | A1 | 4/2021 | Wang et al. |
| 2021/0233299 | A1* | 7/2021 | Zhou ..................... G06T 13/205 |
| 2021/0264563 | A1 | 8/2021 | Shen |
| 2021/0327116 | A1 | 10/2021 | Bai et al. |
| 2021/0328954 | A1 | 10/2021 | Orvalho et al. |
| 2021/0390792 | A1 | 12/2021 | Xu et al. |
| 2021/0392296 | A1 | 12/2021 | Rabinovich et al. |
| 2022/0398795 | A1 | 12/2022 | Phan |
| 2023/0222721 | A1 | 7/2023 | Chen et al. |
| 2023/0260184 | A1 | 8/2023 | Chen et al. |
| 2023/0334805 | A1 | 10/2023 | Danieau et al. |
| 2023/0410447 | A1* | 12/2023 | Cheng ..................... G06T 7/50 |
| 2024/0290034 | A1 | 8/2024 | Fang et al. |
| 2025/0104353 | A1 | 3/2025 | Kim et al. |
| 2025/0148720 | A1 | 5/2025 | Finnigan et al. |
| 2025/0209707 | A1* | 6/2025 | Pan .......................... G06T 15/04 |

OTHER PUBLICATIONS

Summer, et al., "Deformation Transfer for Triangle Meshes", ACM Transactions of Graphics (TOG) 203.3, 2004,pp. 399-405.

U.S. Appl. No. 18/433,618 , Non-Final Office Action, Mailed on Dec. 4, 2025, 9 pages.

Wang et al., "Fully Automatic Blendshape Generation for Stylized Characters", 2023 The Institute of Electrical and Electronics Engineers Conference Virtual Reality and 3D User Interfaces (VR), May 1, 2023.

U.S. Appl. No. 18/433,638 , Non-Final Office Action, Mailed on Aug. 19, 2025, 13 pages.

U.S. Appl. No. 18/433,781 , Non-Final Office Action, Mailed on Aug. 13, 2025, 36 pages.

Blanz et al., "A Morphable Model for the Synthesis of 3D Faces", SIGGRAPH '99: Proceedings of the 26th Annual Conference on Computer Graphics and Interactive Techniques, Jul. 1, 1999, 8 pages.

Malleson et al., "Rapid One-shot Acquisition of Dynamic VR Avatars", Institute of Electrical and Electronics Engineers Virtual Reality (VR), Mar. 18, 2017, pp. 131-140.

Menzel et al., "Automated Blendshape Personalization for Faithful Face Animations Using Commodity Smartphones", Proceedings of the 2022 ACM Workshop on Software Supply Chain Offensive Research and Ecosystem Defenses, Nov. 29, 2022, 9 pages.

Application No. PCT/US2025/014267 , International Search Report and Written Opinion, Mailed on Jul. 4, 2025, 28 pages.

PCT/US2025/014267 , "Invitation to Pay Additional Fees and, Where Applicable, Protest Fee", May 12, 2025, 15 pages.

Saito , "Smooth Contact-Aware Facial Blendshapes Transfer", Proceedings of the Symposium on Digital Production, Jul. 20, 2013, pp. 7-12.

Sela et al., "Computational Caricaturization of Surfaces", Computer Vision and Image Understanding, vol. 141, Dec. 2015, pp. 1-17.

Zhang et al., "Real-time Facial Expression Driving Based on 3d Facial Feature Point", International Conference on Computer Information Science and Artificial Intelligence, 2021, pp. 944-947.

U.S. Appl. No. 18/433,638 , Final Office Action, Mailed On Jan. 26, 2026, 16 pages.

U.S. Appl. No. 18/433,781 , Final Office Action, Mailed On Mar. 4, 2026, 35 pages.

Wood et al., "A 3D Morphable Eye Region Model for Gaze Estimation", Available Online At: http://multicomp.cs.cmu.edu/wp-content/uploads/2017/09/2016_EuroGraphics_Wood_3D.pdf, Oct. 2016, 17 pages.

* cited by examiner

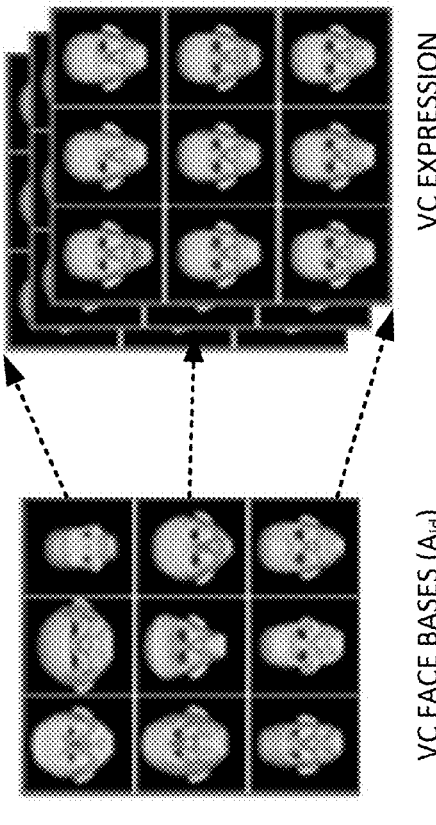
VC EXPRESSION BASES ($A_{exp}$) 636
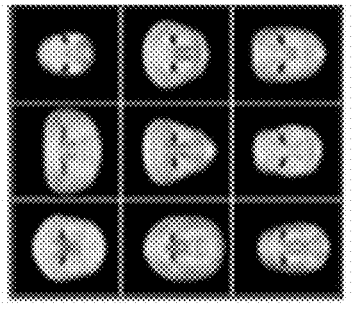
HUMAN EXPRESSION BASES ($S_{exp}$) 646
VC FACE BASES ($A_{id}$) 634
HUMAN FACE BASES ($S_{id}$) 644
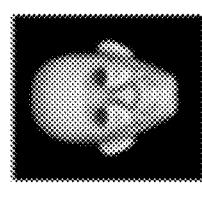
VC FACE MODEL ($A_0$) 632
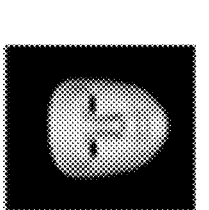
HUMAN BASE FACE ($S_0$) 642
*FIG. 6*

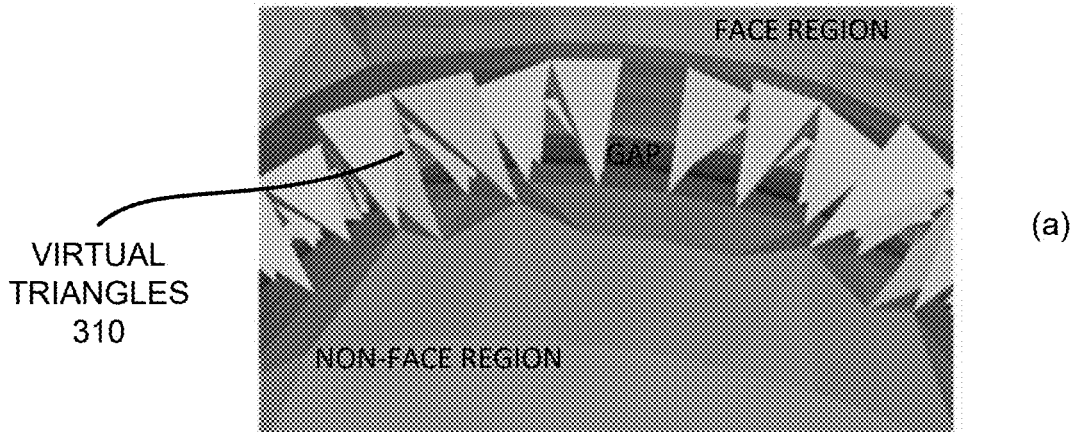
(a)
VIRTUAL
TRIANGLES
310
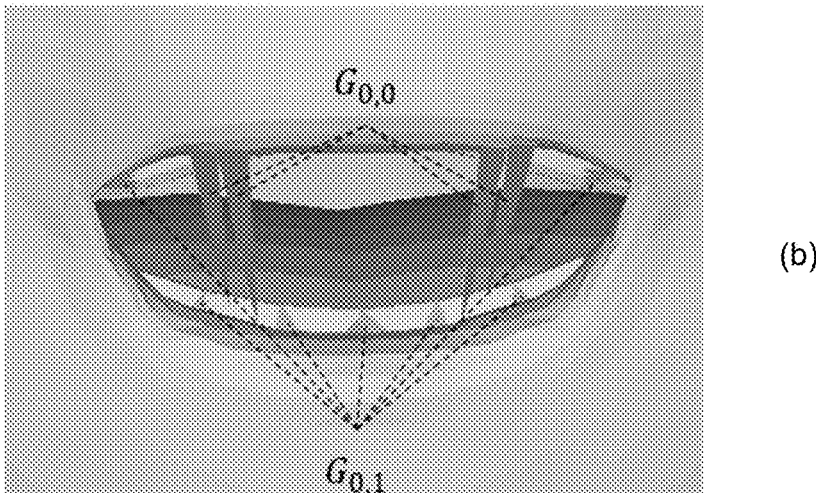
(b)
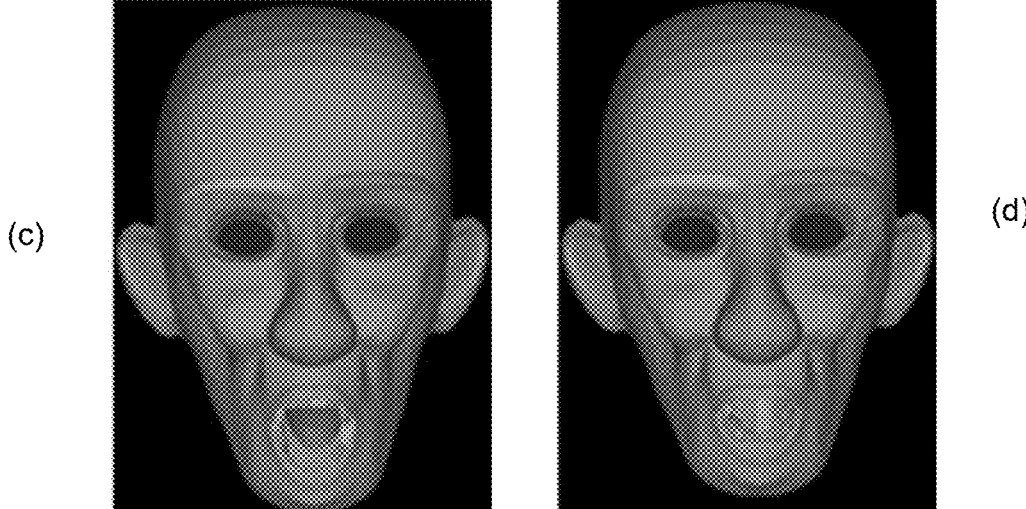
(c)          (d)
*FIG. 9*

CONSTRAINT CURVE 1312

CONSTRAINT CURVE 1314

CONSTRAINT CURVE 1316

CONSTRAINT CURVE 1304

CONSTRAINT CURVE 1302

CONSTRAINT CURVE 1306

CONSTRAINT CURVE 1308

CONSTRAINT CURVE 1310

1400

JOIN A VIDEO CONFERENCE — 1405

DETERMINE AN EXPRESSION PARAMETER VECTOR FROM THE VIDEO OF THE PARTICIPANT — 1410

GENERATE A CUSTOMIZED VIRTUAL CHARACTER FOR THE PARTICIPANT — 1415

RENDERING THE CUSTOMIZED VIRTUAL CHARACTER FOR THE PARTICIPANT — 1420

EXIT THE VIDEO CONFERENCE? — 1425

NO

YES

DISCONNECT FROM THE VIDEO CONFERENCE — 1430

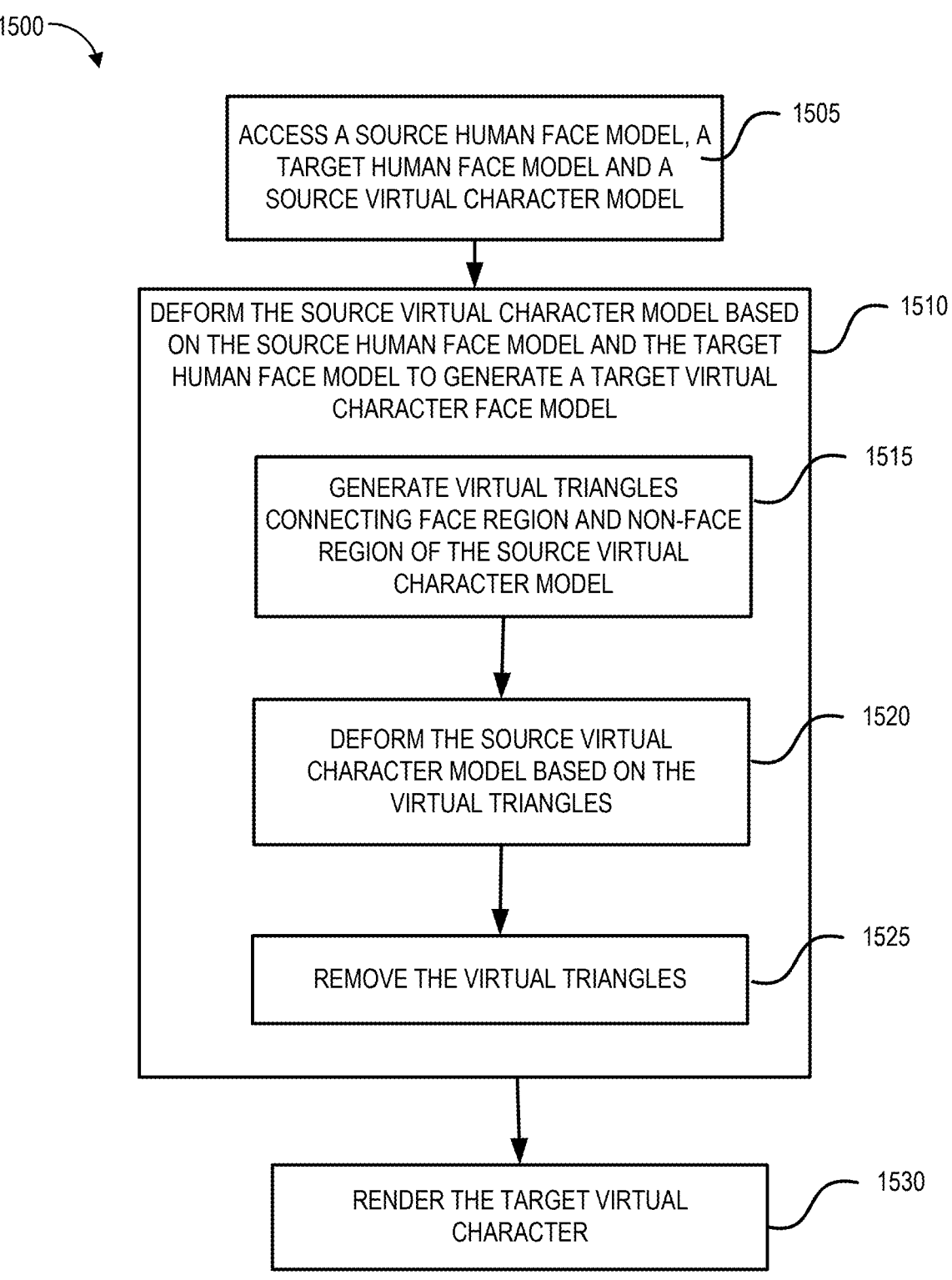

1500

1505 — ACCESS A SOURCE HUMAN FACE MODEL, A TARGET HUMAN FACE MODEL AND A SOURCE VIRTUAL CHARACTER MODEL

1510 — DEFORM THE SOURCE VIRTUAL CHARACTER MODEL BASED ON THE SOURCE HUMAN FACE MODEL AND THE TARGET HUMAN FACE MODEL TO GENERATE A TARGET VIRTUAL CHARACTER FACE MODEL

1515 — GENERATE VIRTUAL TRIANGLES CONNECTING FACE REGION AND NON-FACE REGION OF THE SOURCE VIRTUAL CHARACTER MODEL

1520 — DEFORM THE SOURCE VIRTUAL CHARACTER MODEL BASED ON THE VIRTUAL TRIANGLES

1525 — REMOVE THE VIRTUAL TRIANGLES

1530 — RENDER THE TARGET VIRTUAL CHARACTER

*FIG. 15*

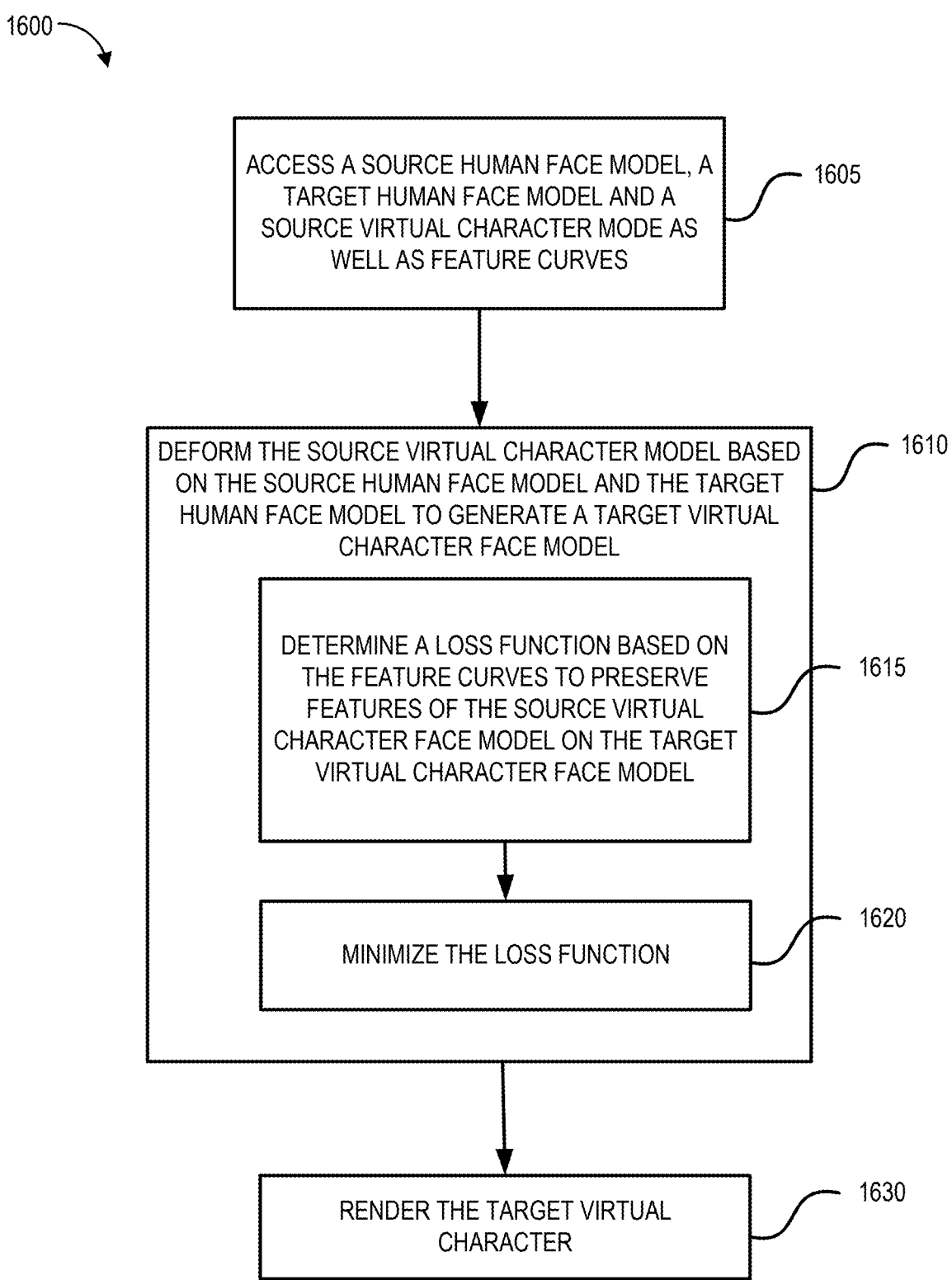

1600

ACCESS A SOURCE HUMAN FACE MODEL, A TARGET HUMAN FACE MODEL AND A SOURCE VIRTUAL CHARACTER MODE AS WELL AS FEATURE CURVES — 1605

DEFORM THE SOURCE VIRTUAL CHARACTER MODEL BASED ON THE SOURCE HUMAN FACE MODEL AND THE TARGET HUMAN FACE MODEL TO GENERATE A TARGET VIRTUAL CHARACTER FACE MODEL — 1610

DETERMINE A LOSS FUNCTION BASED ON THE FEATURE CURVES TO PRESERVE FEATURES OF THE SOURCE VIRTUAL CHARACTER FACE MODEL ON THE TARGET VIRTUAL CHARACTER FACE MODEL — 1615

MINIMIZE THE LOSS FUNCTION — 1620

RENDER THE TARGET VIRTUAL CHARACTER — 1630

FIG. 16

1700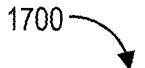

```
┌────────────────────────────────────────┐
│  ACCESS A SOURCE HUMAN FACE MODEL, A    │ ⟶ 1705
│  TARGET HUMAN FACE MODEL AND A          │
│  SOURCE VIRTUAL CHARACTER MODE          │
└────────────────────────────────────────┘
                    │
                    ▼
┌────────────────────────────────────────┐
│  ACCESS A VIRTUAL FEATURE TRIANGLE      │ ⟶ 1710
│  MARKED ON THE SOURCE HUMAN FACE        │
│  MODEL AND A CORRESPONDING VIRTUAL      │
│  FEATURE TRIANGLE MARKED ON THE         │
│  SOURCE VIRTUAL CHARACTER FACE          │
│  MODEL                                  │
└────────────────────────────────────────┘
                    │
                    ▼
┌────────────────────────────────────────────┐
│  DEFORM THE SOURCE VIRTUAL CHARACTER MODEL  │ ⟶ 1715
│  BASED ON THE SOURCE HUMAN FACE MODEL AND   │
│  THE TARGET HUMAN FACE MODEL TO GENERATE A  │
│  TARGET VIRTUAL CHARACTER FACE MODEL        │
│                                             │
│  ┌──────────────────────────────────────┐  │
│  │  DETERMINE A LOSS FUNCTION BY         │  │ ⟶ 1720
│  │  INCLUDING A TERM DEFINED BASED ON A  │  │
│  │  DIFFERENCE BETWEEN THE TWO VIRTUAL   │  │
│  │  TRIANGLES                            │  │
│  └──────────────────────────────────────┘  │
│                    │                        │
│                    ▼                        │
│  ┌──────────────────────────────────────┐  │
│  │       MINIMIZE THE LOSS FUNCTION      │  │ ⟶ 1725
│  └──────────────────────────────────────┘  │
└────────────────────────────────────────────┘
                    │
                    ▼
┌────────────────────────────────────────┐
│     RENDER THE TARGET VIRTUAL           │ ⟶ 1730
│             CHARACTER                   │
└────────────────────────────────────────┘
```

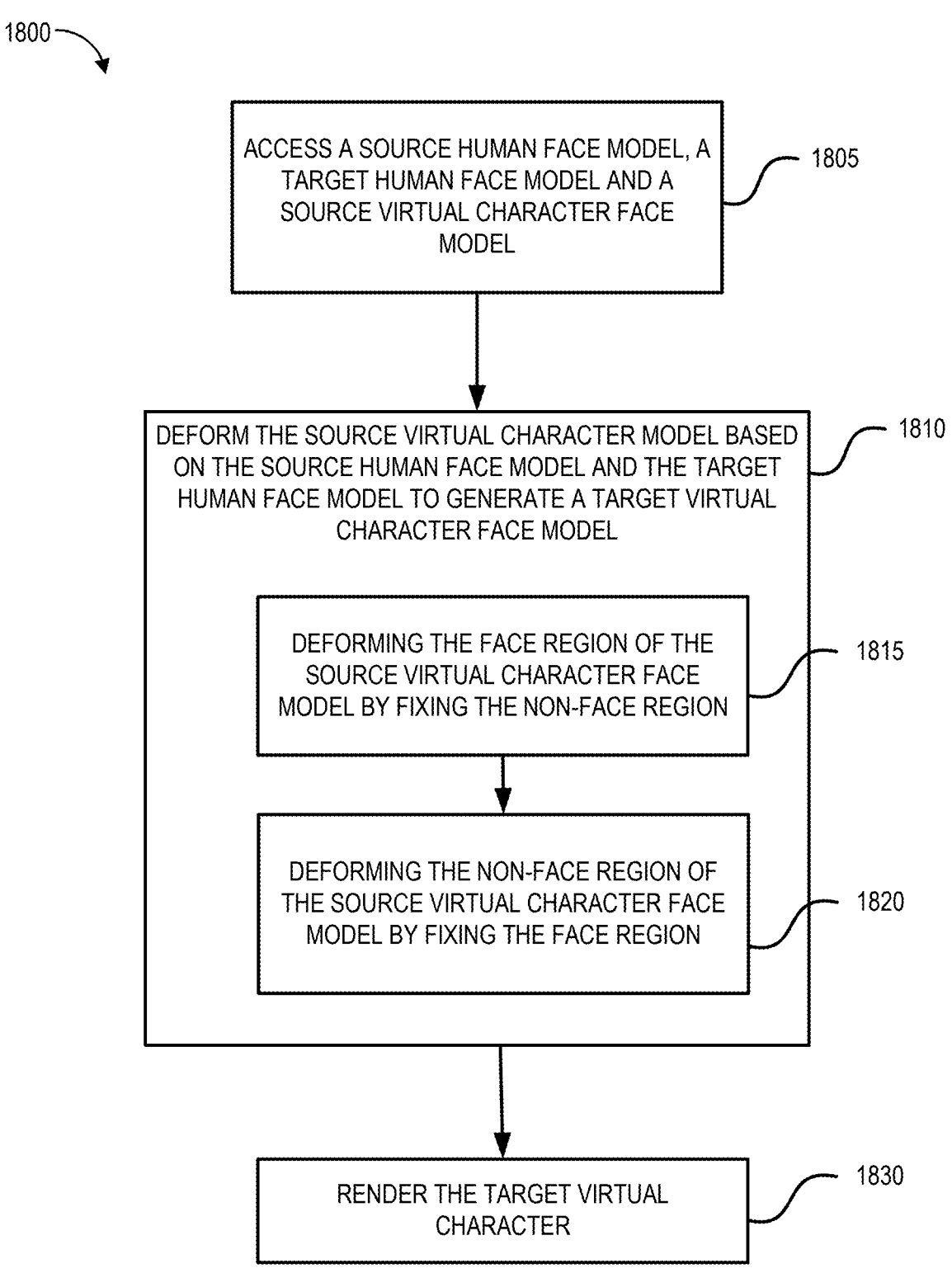

ACCESS A SOURCE HUMAN FACE MODEL, A TARGET HUMAN FACE MODEL AND A SOURCE VIRTUAL CHARACTER FACE MODEL — 1805

DEFORM THE SOURCE VIRTUAL CHARACTER MODEL BASED ON THE SOURCE HUMAN FACE MODEL AND THE TARGET HUMAN FACE MODEL TO GENERATE A TARGET VIRTUAL CHARACTER FACE MODEL — 1810

DEFORMING THE FACE REGION OF THE SOURCE VIRTUAL CHARACTER FACE MODEL BY FIXING THE NON-FACE REGION — 1815

DEFORMING THE NON-FACE REGION OF THE SOURCE VIRTUAL CHARACTER FACE MODEL BY FIXING THE FACE REGION — 1820

RENDER THE TARGET VIRTUAL CHARACTER — 1830

*FIG. 18*

3D DIGITAL VIRTUAL CHARACTER GENERATION WITH FACIAL FEATURE PRESERVATION

FIELD

The present application generally relates to videoconferencing, and more particularly relates to generating three-dimensional (3D) virtual characters for video conferencing.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings, which are incorporated into and constitute a part of this specification, illustrate one or more certain examples and, together with the description of the example, serve to explain the principles and implementations of the certain examples.

FIG. 6 shows examples of a human base face, human face bases, human expression bases, a virtual character base face, virtual character face bases, and virtual character expression bases, according to certain aspects described herein.

FIG. 9 shows examples of virtual triangles, according to certain aspects of the present disclosure.

FIG. 15 shows a flowchart of an example process for generating a virtual character using virtual triangles, according to certain aspects of the present disclosure.

FIG. 16 shows a flowchart of an example process for generating a virtual character with facial feature preservation, according to certain aspects of the present disclosure.

FIG. 17 shows a flowchart of an example process for generating a virtual character with feature enhancement, according to certain aspects of the present disclosure.

FIG. 18 shows a flowchart of an example process for generating a virtual character via a two-stage process, according to certain aspects of the present disclosure.

DETAILED DESCRIPTION

Figure 1:
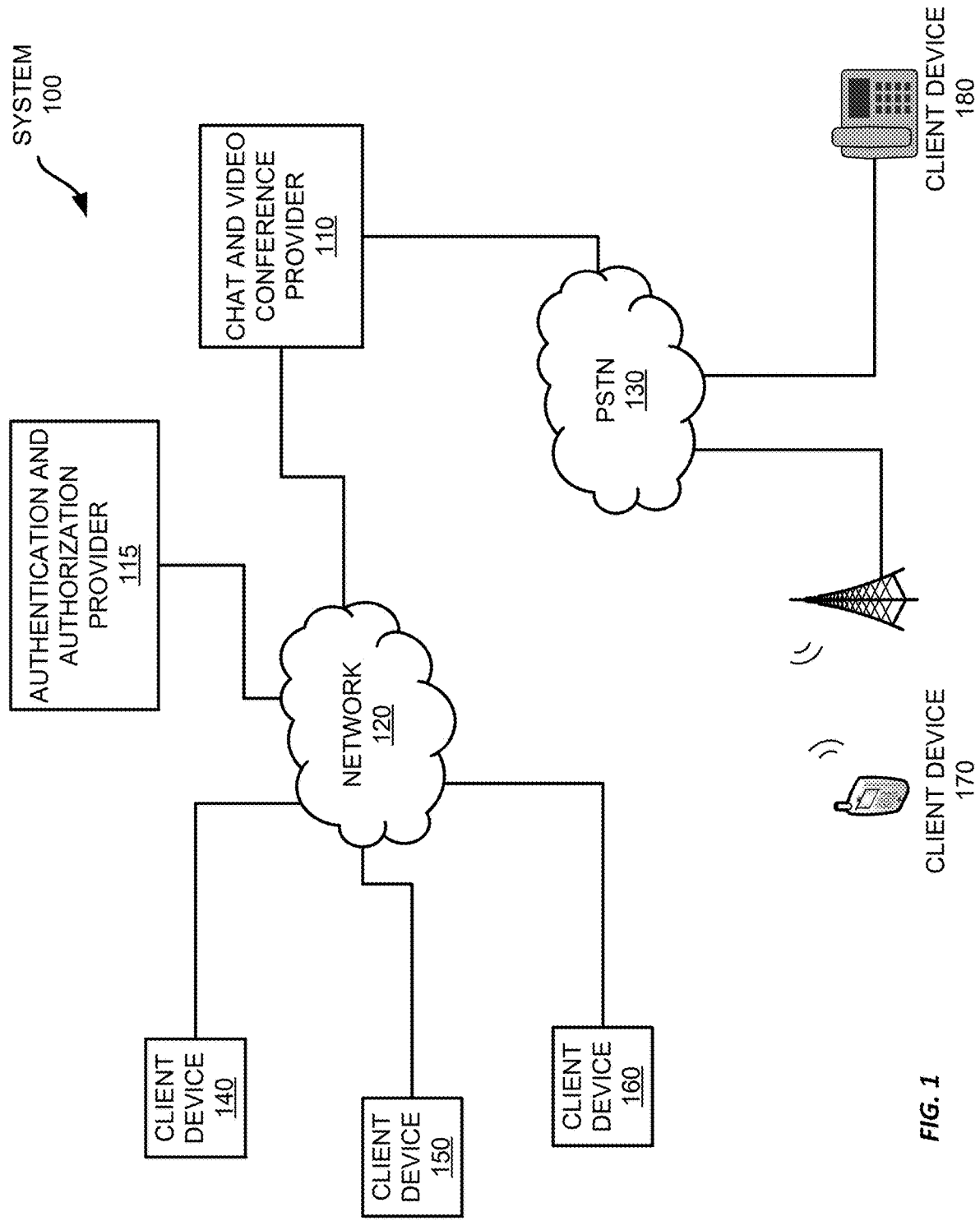
FIG. 1 shows an example system that provides videoconferencing functionality to various client devices, according to certain aspects described herein.

Examples are described herein in the context of systems and methods for generating three-dimensional (3D) digital virtual characters for applications such as video conferencing. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Videoconferencing has become a common way for people to meet as a group, but without being at the same physical location. Participants can be invited to a videoconference meeting, join from their personal computers or telephones, and are able to see and hear each other and converse largely as they would during an in-person group meeting or event. The advent of user-friendly videoconferencing software has enabled teams to work collaboratively despite being dispersed around the country or the world. It has also enabled families and friends to engage with each other in more meaningful ways, despite being physically distant from each other.

To engage with meeting attendees, some participants may choose to replace their appearances with 3D virtual characters that reflect the head movements and facial expressions of the participants. However, it is time consuming to generate 3D virtual characters with different facial expressions as they are currently manually created by designers. As a result, the number of choices for the 3D virtual characters is limited and the 3D virtual characters generated do not accurately reflect the face shapes and expressions of the participants.

To solve the above problems, example systems and methods for generating 3D digital virtual characters for video conferencing are provided herein. As described herein, a 3D virtual character ("virtual character," "3DVC," or "VC" in short) can be created based on a facial image of a participant and be animated during the meeting according to the movement and facial expression of the participant. The virtual character can be represented as a 3D Morphable Face Models (3DMM) model, which includes a human base face model, a set of human face bases (also referred to as PCA models), and human expression bases. A deformation transfer can be applied to transfer the human face bases and expression bases from an existing human 3DMM model to a 3D virtual character. During the setup phase, an input image of a user can be used to create a virtual character neutral face and customized virtual character expressions. During the online meeting, the virtual character can be animated based on the participant's expressions and poses and be rendered into images and be included in the video stream of the participant.

For example, a virtual character base model (VCBM) generation system can access a source human face model S (e.g., the human base face model in the 3DMM), a target human face model $\tilde{S}$ (e.g., a combination of the human base face model and a human face base in the 3DMM), and a source virtual character model A (e.g., the source virtual character model $A_0$). The VCBM generation system can determine a deformation transfer $\mathcal{F}(A, S, \tilde{S})$ such that the source virtual character model A can be deformed into a target virtual character model A in a way similar to how the source human face model S is deformed into the target human face model $\tilde{S}$, that is $\tilde{A} = \mathcal{F}(A, S, \tilde{S})$. For instance, the source human face model S can be the human base face $S_0$ in the 3DMM, and the target human face model $\tilde{S}$ can be a combination of the human base face $S_0$ and a human face basis $$S_{id}^j$$

in the 3DMM. For a source virtual character model A, the deformation can generate $\tilde{A}^j$ and the 3D virtual character basis (or virtual character PCA model)

$$A_{id}^j$$

can be derived as $$A_{id}^j = \tilde{A}^j - A.$$

Based on the 3D virtual character basis $$A_{id}^j,$$

the virtual character neutral face can be derived for a participant and for the virtual character model A. Virtual character expression bases can be derived similarly. Combining the virtual character expression bases according to the facial feature of the participant can lead to the customized virtual character expressions discussed above.

To derive the deformation transfer, correspondence between the human base face $S_0$ and the virtual character face model $A_0$ can be established. For instance, a set of points (referred to as "facial landmarks") can be labelled on the human base face $S_0$ and the virtual character face model $A_0$ to indicate the vertex correspondence between the human base face and the virtual character face model. Based on the vertex correspondence, the virtual character face model $A_0$ can be deformed in a way similar to the human base face $S_0$ being deformed into the target human face $\tilde{S}$. For example, a loss function can be constructed and minimized so that the deformation transfer from the source virtual character model A to the target virtual character model $\tilde{A}$ can be performed according to the deformation transfer from the source human face model S to the target human face model $\tilde{S}$. The minimization of the loss function can be performed by reformulating the loss function to a linear form and solving it through a linear solver. However, virtual character models are often different from the human face model and simply applying the deformation transfer from S to $\tilde{S}$ to the source virtual character A may lead to artifacts in the target virtual character A. As such, various types of processing are described herein to reduce the artifacts in the target virtual character A.

For example, the source human face model S and the target human face model S may only contain a human face, whereas a virtual character model contains, in addition to the face part (referred to as the "face region"), other models ("non-face region") such as an eye model and a mouth model. These models may contain internal areas that are not observable from the face of the virtual character. For example, an eye model may include an eye socket for holding the eyeball and the majority part of the eye socket is not observable from the face of the virtual character. Likewise, the mouth model of the virtual character also includes an interior portion holding the teeth and tongue of the virtual character that is not observable from the face of the virtual character. These non-face regions do not have corresponding portions in the human face model. As such, the deformation transfer from the source human face model S to the target human face model S does not provide information regarding the deformation of the non-face region. If directly applying the deformation transfer from the source human face model S to the target human face model $\tilde{S}$ to the source virtual character A, the face region of the source virtual character A can be deformed properly, but the non-face region is not deformed. As a result, the non-face region may be dislocated relative to the face region leading to artifacts such as the eye socket or mouth part protruding outside the face.

To solve these problems, virtual triangles can be generated connecting the face region and non-face region. For instance, a vertex-triangle distance between each vertex of a surface in the face region and each triangle of a surface in the non-face region can be determined. If the distance is below a threshold distance value, a virtual triangle connecting a vertex of the surface in the face region and an edge of the surface in the non-face region can be added to the source virtual character model. Multiple virtual triangles can be added in a similar way. Deforming the source virtual character face model can be performed by introducing constraints to minimize the deformation to the virtual triangles. In this way, the deformation in the face region can be propagated into the non-face region so that the non-face region can be deformed along with the face region of the virtual character.

The deformation transfer can be performed in a two-stage process. In the first stage, the face region of the virtual character is deformed while the non-face region is fixed. Constraints related to the non-face region are disabled, such as the constraints defined based on the virtual triangles discussed above. After the face region is deformed, the virtual triangles can be added back to the virtual character and the second stage of the deformation is performed. In the second stage, the deformed face region is fixed, and the non-face region is deformed with constraints that are not related to the non-face region disabled. For example, the virtual triangles can be used to enforce the deformation of the virtual triangles to be minimized so that the non-face regions can be deformed according to the deformation of the face region.

In another example, the two-stage deformation process can be performed without introducing the virtual triangles. For example, correspondence can be established between pairs of surfaces in the face region and non-face region. In other words, for a triangle surface in the face region, a triangle surface in the non-face region that is close to the face region can be identified. These pairs of corresponding surfaces can be utilized when deforming the non-face region in the second stage to enforce the deformation of the surface in the non-face region to be close to the deformation of the corresponding surface in the face region. In this way, the non-face region can be deformed similarly as the face region, thereby reducing the artifacts in the deformed virtual character.

Further, virtual characters are unreal characters and typically have facial features that are unproportional to other features. For example, the virtual character may have larger eyes with a smaller mouth than those in the human face. Deformation transfer derived from human face models may not lead to the proper deformation for those facial features. To address this, facial feature enhancement can be introduced as constraints in the deformation transfer process to ensure the desired facial features of the deformed virtual character to be obtained. For example, the deformation can be performed such that a difference between the deformation for a facial feature of the virtual character and a scaled deformation for the corresponding facial feature in the human face is minimized. In this way, the facial feature of the virtual character can be enhanced (e.g., enlarged eyes or shrunk mouth) from the corresponding facial feature of the human face model. In some implementations, the difference between the deformation for the facial feature of the virtual character and the scaled deformation for the corresponding facial feature in the human face is introduced as a loss term in the loss function to be minimized. In some examples, the deformation is represented by a deformation gradient.

While some facial features of the virtual character need to be enhanced, there are certain facial features need to be preserved during the deformation transfer. For example, when performing deformation transfer to generate virtual character expression bases from human face expression bases, facial features, such as closed mouth, closed eye, should be preserved. In other words, if a human facial expression basis has the mouth or an eye closed, the corresponding virtual character expression basis should also have the mouth or eye closed. Other features, such as the shape of the mouth and eyes, the symmetry of the vertices, should also be preserved. In some implementations, each feature preservation is introduced as a loss term in the loss function to be minimized. For example, a set of virtual feature triangles can be generated based on vertices of a feature curve. A loss term can be defined based on the differences between deformation gradients of the set of virtual feature triangles and an identity deformation gradient so that the deformation of the region near the feature curve is minimized. For a closeness feature, the closeness of a facial feature can be defined by two feature curves being overlapped. The corresponding loss term can be defined based on a mapping distance between the two feature curves so that the mapping distance is minimized (thus keeping the facial feature closed as much as possible). The feature curves used in the feature preservation can be defined based on facial landmark points on the human face model.

As described herein, certain embodiments provide improvements to video conferencing by solving problems that are specific to online platforms. These improvements include more efficiently generating virtual character face bases and expression bases. These virtual character base models allow the virtual character for a video conference participant to be generated to match the shape and other features of the participant and to show expressions dynamically based on the facial expressions of the participant during the meeting. These improvements significantly increase the speed of generating the virtual character for each participant and allow the virtual character to be customized according to the participant. This allows the video conference to be conducted more efficiently and the participants stay more engaged in the meeting, thereby reducing the amount of time and the computing and network resources spent on the video conference.

This illustrative example is given to introduce the reader to the general subject matter discussed herein and the disclosure is not limited to this example. The following sections describe various additional non-limiting examples and examples of systems and methods for generating 3D digital virtual characters for video conferencing.

Referring now to FIG. 1, FIG. 1 shows an example system 100 that provides videoconferencing functionality to various client devices. The system 100 includes a chat and video conference provider 110 that is connected to multiple communication networks 120, 130, through which various client devices 140-180 can participate in video conferences hosted by the chat and video conference provider 110. For example, the chat and video conference provider 110 can be located within a private network to provide video conferencing services to devices within the private network, or it can be connected to a public network, e.g., the internet, so it may be accessed by anyone. Some examples may even provide a hybrid model in which a chat and video conference provider 110 may supply components to enable a private organization to host private internal video conferences or to connect its system to the chat and video conference provider 110 over a public network.

The system optionally also includes one or more authentication and authorization providers, e.g., authentication and authorization provider 115, which can provide authentication and authorization services to users of the client devices 140-160. Authentication and authorization provider 115 may authenticate users to the chat and video conference provider 110 and manage user authorization for the various services provided by chat and video conference provider 110. In this example, the authentication and authorization provider 115 is operated by a different entity than the chat and video conference provider 110, though in some examples, they may be the same entity.

Figure 2:
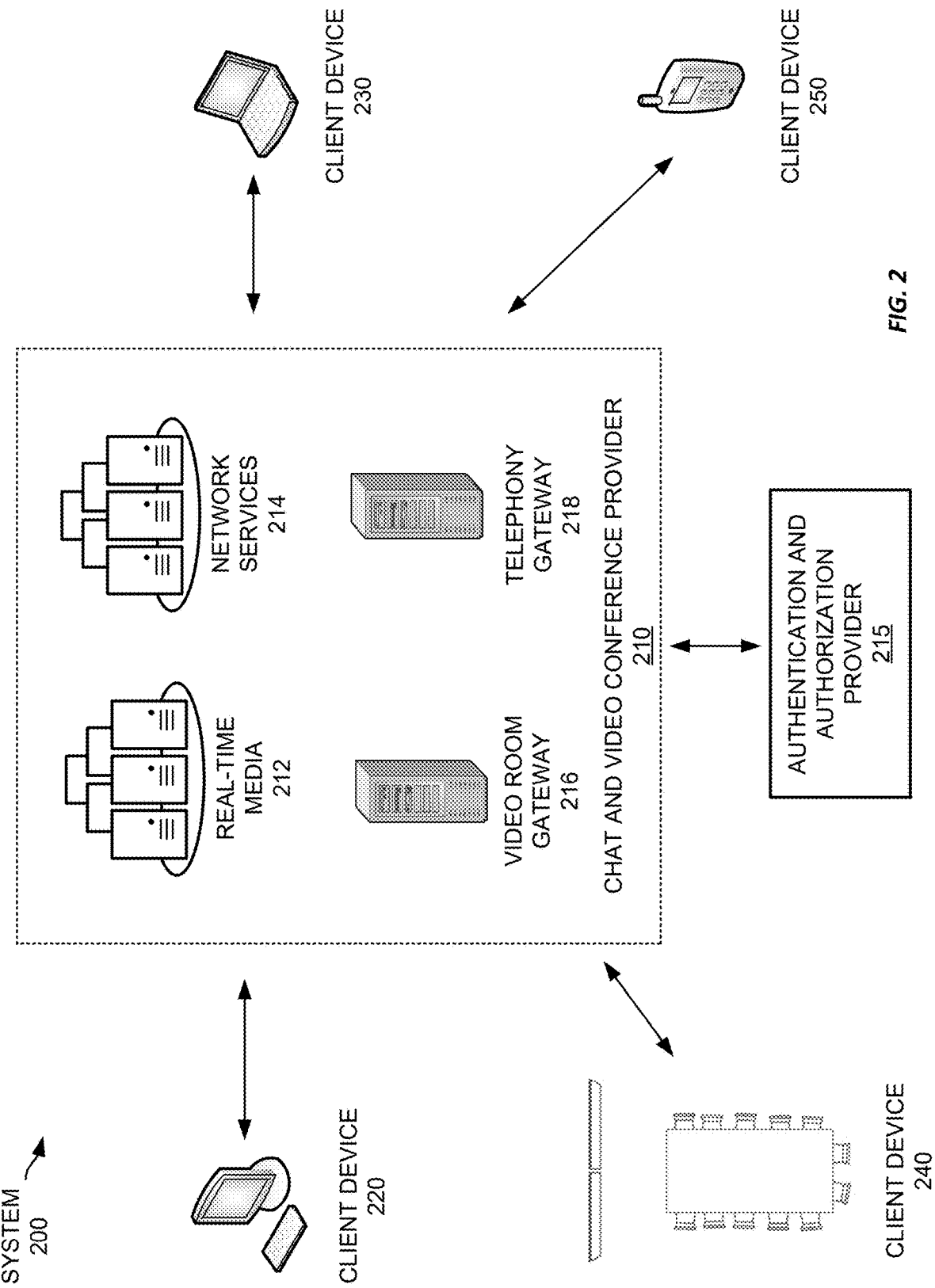
FIG. 2 shows an example system in which a chat and video conference provider provides videoconferencing functionality to various client devices, according to certain aspects described herein.

Chat and video conference provider 110 allows clients to create videoconference meetings (or "meetings") and invite others to participate in those meetings as well as perform other related functionality, such as recording the meetings, generating transcripts from meeting audio, generating summaries and translations from meeting audio, manage user functionality in the meetings, enable text messaging during the meetings, create and manage breakout rooms from the virtual meeting, etc. FIG. 2, described below, provides a more detailed description of the architecture and functionality of the chat and video conference provider 110. It should be understood that the term "meeting" encompasses the term "webinar" used herein.

Meetings in this example chat and video conference provider 110 are provided in virtual rooms to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used.

To create a meeting with the chat and video conference provider 110, a user may contact the chat and video conference provider 110 using a client device 140-180 and select an option to create a new meeting. Such an option may be provided in a webpage accessed by a client device 140-160 or a client application executed by a client device 140-160. For telephony devices, the user may be presented with an audio menu that they may navigate by pressing numeric buttons on their telephony device. To create the meeting, the chat and video conference provider 110 may prompt the user for certain information, such as a date, time, and duration for the meeting, a number of participants, a type of encryption to use, whether the meeting is confidential or open to the public, etc. After receiving the various meeting settings, the chat and video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started, or the host may be required to specifically admit one or more of the users.

During the meeting, the participants may employ their client devices 140-180 to capture audio or video information and stream that information to the chat and video conference provider 110. They also receive audio or video information from the chat and video conference provider 110, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting, and they will no longer receive audio or video streams for the meeting (and will stop transmitting audio or video streams). The chat and video conference provider 110 may also invalidate the meeting information, such as the meeting identifier or password/passcode.

To provide such functionality, one or more client devices 140-180 may communicate with the chat and video conference provider 110 using one or more communication networks, such as network 120 or the public switched telephone network ("PSTN") 130. The client devices 140-180 may be any suitable computing or communication devices that have audio or video capability. For example, client devices 140-160 may be conventional computing devices, such as desktop or laptop computers having processors and computer-readable media, connected to the chat and video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the chat and video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the chat and video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and are not limited solely to dedicated telephony devices like conventional telephones.

Referring again to client devices 140-160, these devices 140-160 contact the chat and video conference provider 110 using network 120 and may provide information to the chat and video conference provider 110 to access functionality provided by the chat and video conference provider 110, such as access to create new meetings or join existing meetings. To do so, the client devices 140-160 may provide user authentication information, meeting identifiers, meeting passwords or passcodes, etc. In examples that employ an authentication and authorization provider 115, a client device, e.g., client devices 140-160, may operate in conjunction with an authentication and authorization provider 115 to provide authentication and authorization information or other user information to the chat and video conference provider 110.

An authentication and authorization provider 115 may be any entity trusted by the chat and video conference provider 110 that can help authenticate a user to the chat and video conference provider 110 and authorize the user to access the services provided by the chat and video conference provider 110. For example, a trusted entity may be a server operated by a business or other organization with whom the user has created an account, including authentication and authorization information, such as an employer or trusted third-party. The user may sign into the authentication and authorization provider 115, such as by providing a username and password, to access their account information at the authentication and authorization provider 115. The account information includes information established and maintained at the authentication and authorization provider 115 that can be used to authenticate and facilitate authorization for a particular user, irrespective of the client device they may be using. An example of account information may be an email account established at the authentication and authorization provider 115 by the user and secured by a password or additional security features, such as single sign-on, hardware tokens, two-factor authentication, etc. However, such account information may be distinct from functionality such as email. For example, a health care provider may establish accounts for its patients. And while the related account information may have associated email accounts, the account information is distinct from those email accounts.

Thus, a user's account information relates to a secure, verified set of information that can be used to authenticate and provide authorization services for a particular user and should be accessible only by that user. By properly authenticating, the associated user may then verify themselves to other computing devices or services, such as the chat and video conference provider 110. The authentication and authorization provider 115 may require the explicit consent of the user before allowing the chat and video conference provider 110 to access the user's account information for authentication and authorization purposes.

Once the user is authenticated, the authentication and authorization provider 115 may provide the chat and video conference provider 110 with information about services the user is authorized to access. For instance, the authentication and authorization provider 115 may store information about user roles associated with the user. The user roles may include collections of services provided by the chat and video conference provider 110 that users assigned to those user roles are authorized to use. Alternatively, more or less granular approaches to user authorization may be used.

When the user accesses the chat and video conference provider 110 using a client device, the chat and video conference provider 110 communicates with the authentication and authorization provider 115 using information provided by the user to verify the user's account information. For example, the user may provide a username or cryptographic signature associated with an authentication and authorization provider 115. The authentication and authorization provider 115 then either confirms the information presented by the user or denies the request. Based on this response, the chat and video conference provider 110 either provides or denies access to its services, respectively.

For telephony devices, e.g., client devices 170-180, the user may place a telephone call to the chat and video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the chat and video conference provider 110. For example, telephony devices may be unable to provide authentication information to authenticate the telephony device or the user to the chat and video conference provider 110. Thus, the chat and video conference provider 110 may provide more limited functionality to such telephony devices. For example, the user may be permitted to join a meeting after providing meeting information, e.g., a meeting identifier and passcode, but only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide account information to the chat and video conference provider 110, even in cases where the user could authenticate and employs a client device capable of authenticating the user to the chat and video conference provider 110. The chat and video conference provider 110 may determine whether to allow such anonymous users to use services provided by the chat and video conference provider 110. Anonymous users, regardless of the reason for anonymity, may be restricted as discussed above with respect to users employing telephony devices, and in some cases may be prevented from accessing certain meetings or other services, or may be entirely prevented from accessing the chat and video conference provider 110.

Referring again to chat and video conference provider 110, in some examples, it may allow client devices 140-160 to encrypt their respective video and audio streams to help improve privacy in their meetings. Encryption may be provided between the client devices 140-160 and the chat and video conference provider 110 or it may be provided in an end-to-end configuration where multimedia streams (e.g., audio or video streams) transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the chat and video conference provider 110, while allowing the chat and video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a chat and video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus, the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the chat and video conference provider 110. Further, such a system enables users to use a wide variety of different client devices 140-180 from traditional standards-based video conferencing hardware to dedicated video conferencing equipment to laptop or desktop computers to handheld devices to legacy telephony devices. etc.

Referring now to FIG. 2, FIG. 2 shows an example system 200 in which a chat and video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the chat and video conference provider 210 over a communications network, such as the internet for client devices 220-240 or the PSTN for client device 250, generally as described above with respect to FIG. 1. The chat and video conference provider 210 is also in communication with one or more authentication and authorization providers 215, which can authenticate various users to the chat and video conference provider 210 generally as described above with respect to FIG. 1.

In this example, the chat and video conference provider 210 employs multiple different servers (or groups of servers) to provide different examples of video conference functionality, thereby enabling the various client devices to create and participate in video conference meetings. The chat and video conference provider 210 uses one or more real-time media servers 212, one or more network services servers 214, one or more video room gateways 216, one or more message and presence gateways 217, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the chat and video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead, each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the chat and video conference provider 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the chat and video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the chat and video conference provider 210 may allow a meeting participant to notify it of inappropriate behavior or content in a meeting. Such a notification may trigger the real-time media servers to 212 record a portion of the meeting for review by the chat and video conference provider 210. Still other functionality may be implemented to take actions based on the decrypted multimedia streams at the chat and video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the chat and video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the chat and video conference provider under a supervisory set of servers. When a client device 220-250 accesses the chat and video conference provider 210, it will typically communicate with one or more network services servers 214 to access their account or to participate in a meeting.

When a client device 220-250 first contacts the chat and video conference provider 210 in this example, it is routed to a network services server 214. The client device may then provide access credentials for a user, e.g., a username and password or single sign-on credentials, to gain authenticated access to the chat and video conference provider 210. This process may involve the network services servers 214 contacting an authentication and authorization provider 215 to verify the provided credentials. Once the user's credentials have been accepted, and the user has consented, the network services servers 214 may perform administrative functionality, like updating user account information, if the user has account information stored with the chat and video conference provider 210, or scheduling a new meeting, by interacting with the network services servers 214. Authentication and authorization provider 215 may be used to determine which administrative functionality a given user may access according to assigned roles, permissions, groups, etc.

In some examples, users may access the chat and video conference provider 210 anonymously. When communicating anonymously, a client device 220-250 may communicate with one or more network services servers 214 but only provide information to create or join a meeting, depending on what features the chat and video conference provider allows for anonymous users. For example, an anonymous user may access the chat and video conference provider using client device 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, assigning or moving users to the mainstage or a breakout room if present, recording meetings, etc. Such functionality may be managed by the network services server(s) 214.

For example, if a host wishes to remove a user from a meeting, they may select a user to remove and issue a command through a user interface on their client device. The command may be sent to a network services server 214, which may then disconnect the selected user from the corresponding real-time media server 212. If the host wishes to remove one or more participants from a meeting, such a command may also be handled by a network services server 214, which may terminate the authorization of the one or more participants for joining the meeting.

In addition to creating and administering on-going meetings, the network services server(s) 214 may also be responsible for closing and tearing-down meetings once they have been completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the chat and video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the chat and video conference provider 210. For example, the video conferencing hardware may be provided by the chat and video conference provider to one or more of its subscribers, which may provide access credentials to the video conferencing hardware to use to connect to the chat and video conference provider 210.

The video room gateway servers 216 provide specialized authentication and communication with the dedicated video conferencing hardware that may not be available to other client devices 220-230, 250. For example, the video conferencing hardware may register with the chat and video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the chat and video conference provider 210.

Referring now to the telephony gateway servers 218, these servers 218 enable and facilitate telephony devices' participation in meetings hosted by the chat and video conference provider 210. Because telephony devices communicate using the PSTN and not using computer networking protocols, such as TCP/IP, the telephony gateway servers 218 act as an interface that converts between the PSTN, and the networking system used by the chat and video conference provider 210.

For example, if a user uses a telephony device to connect to a meeting, they may dial a phone number corresponding to one of the chat and video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio streams to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server is instead joined to the meeting on the telephony device's behalf.

After joining the meeting, the telephony gateway server 218 receives an audio stream from the telephony device and provides it to the corresponding real-time media server 212 and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the chat and video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

In some examples according to the present disclosure, a user may select an option to use one or more optional AI features available from the virtual conference provider. The use of these optional AI features may involve providing the user's personal information to the AI models underlying the AI features. The personal information may include the user's contacts, calendar, communication histories, video or audio streams, recordings of the video or audio streams, transcripts of audio or video conferences, or any other personal information available the virtual conference provider. Further, the audio or video feeds may include the user's speech, which includes the user's speaking patterns, cadence, diction, timbre, and pitch; the user's appearance and likeness, which may include facial movements, eye movements, arm or hand movements, and body movements, all of which may be employed to provide the optional AI features or to train the underlying AI models.

Before capturing and using any such information, whether to provide optional AI features or to providing training data for the underlying AI models, the user may be provided with an option to consent, or deny consent, to access and use some or all of the user's personal information. In general, the goal is to invest in AI-driven innovation that enhances user experience and productivity while prioritizing trust, safety, and privacy. Without the user's explicit, informed consent, the user's personal information will not be used with any AI functionality or as training data for any AI model. Additionally, these optional AI features are turned off by default account owners and administrators control whether to enable these AI features for their accounts, and if enabled, individual users may determine whether to provide consent to use their personal information.

Figure 3:
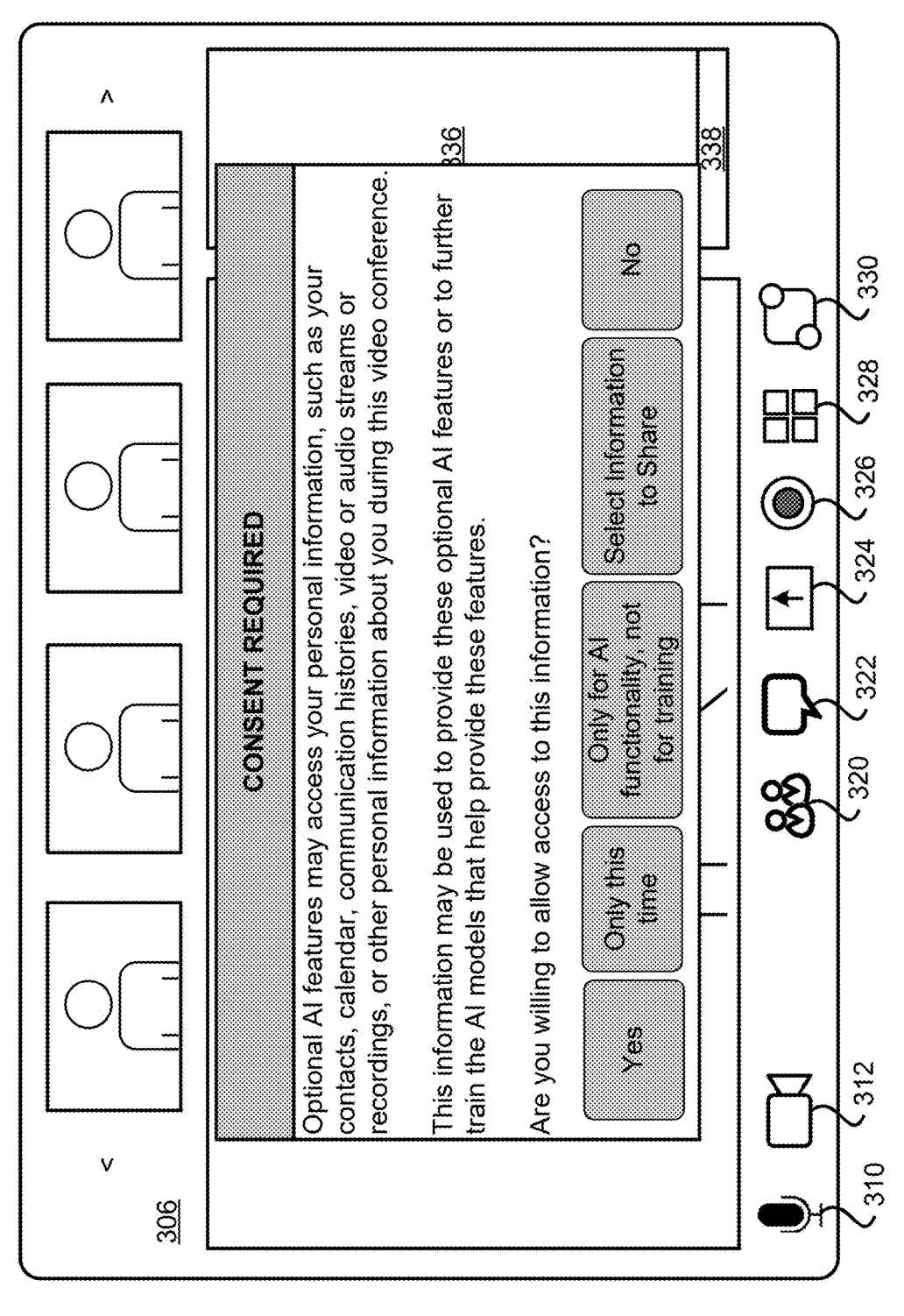
FIG. 3 shows an example of a user interface configured to display a consent authorization window for a user who has engaged in a video conference to interact with and to select options to use an available optional AI feature, according to certain aspects of the present disclosure.

As can be seen in FIG. 3, a user has engaged in a video conference and has selected an option to use an available optional AI feature. In response, the GUI has displayed a consent authorization window for the user to interact with. The consent authorization window informs the user that their request may involve the optional AI feature accessing multiple different types of information, which may be personal to the user. The user can then decide whether to grant permission or not to the optional AI feature generally, or only in a limited capacity. For example, the user may select an option to only allow the AI functionality to use the personal information to provide the AI functionality, but not for training of the underlying AI models. In addition, the user is presented with the option to select which types of information may be shared and for what purpose, such as to provide the AI functionality or to allow use for training underlying AI models.

Figure 4:
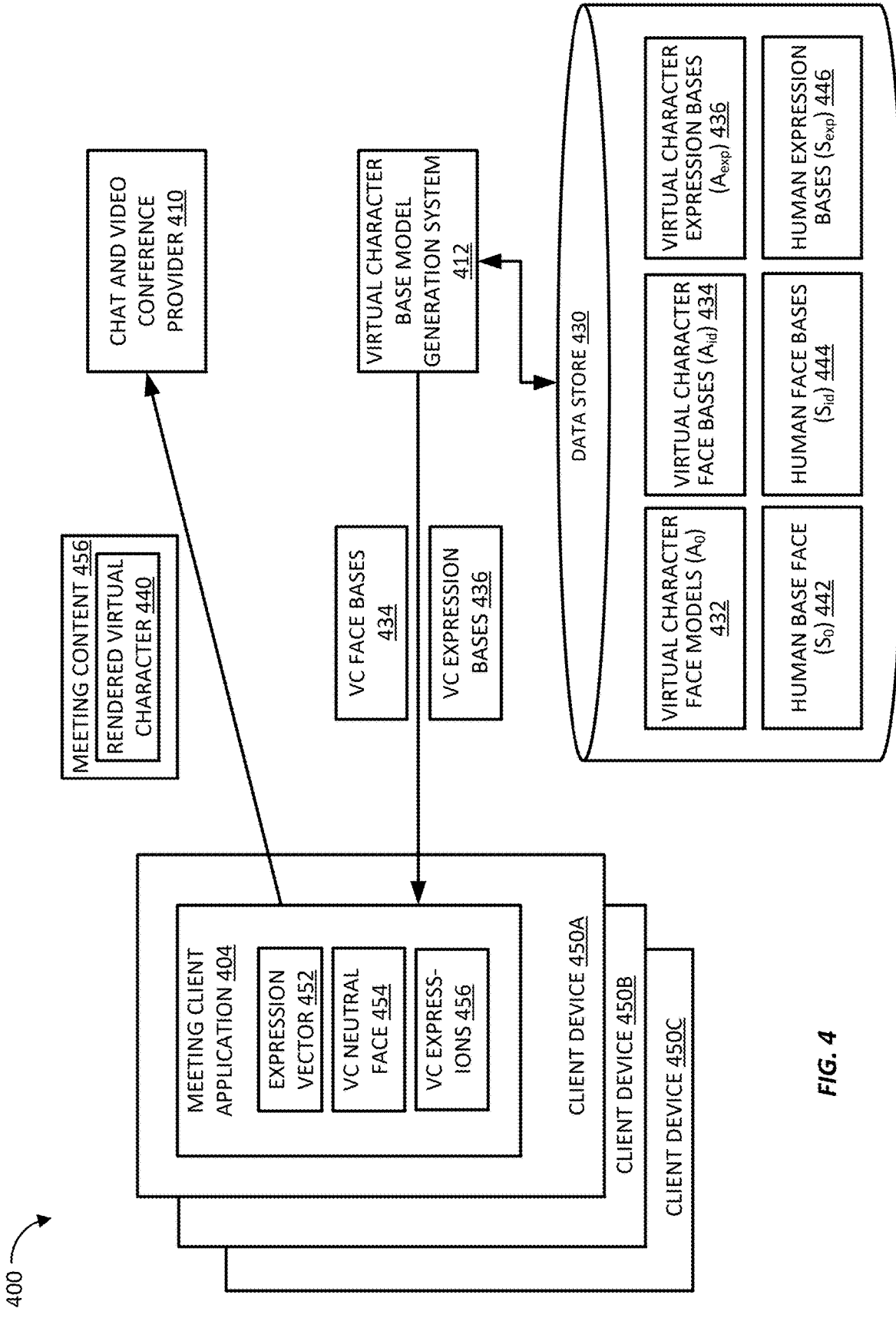
FIG. 4 shows an example of an operating environment for virtual character generation for videoconferencing, according to certain aspects of the present disclosure.

Referring now to FIG. 4, FIG. 4 shows an example of an operating environment 400 for generating virtual characters for videoconferencing, according to certain aspects described herein. The operating environment 400 includes a chat and video conference provider 410 configured to host and provide various functionalities of video conferences, such as the chat and video conference provider 110 and the chat and video conference provider 210 described above with respect to FIGS. 1 and 2, respectively. The chat and video conference provider 410 is configured to receive and deliver videoconferencing streams to client computing devices 450A-450C (which may be referred to herein individually as a client computing device 450 or collectively as the client computing devices 450). The video conferencing streams can include video signals of the participants, audio signals captured at respective client computing devices associated with the participants, and other signals or streams regarding the participants. The client computing devices 450 may be the client devices 140-180 and 220-250 discussed above with respect to FIGS. 1 and 2.

The operating environment 400 further includes a virtual character base model generation system 412. The virtual character base model generation system 412 is configured to generate various base models for generating a virtual character customized for each user, such as virtual character face bases 434 and virtual character expression bases 436. The virtual character face bases 434 represent different face shapes and the virtual character expression bases 436 represent different facial expressions. The virtual character face bases $A_{id}$ 434 and virtual character expression bases $A_{exp}$ 436 for each virtual character face model 432 can be stored in a data store 430 along with other models used to generate these base models such as the virtual character face models 432, the human base face $S_0$ 442, the human face bases $S_{id}$ 444, and the human expression bases $S_{exp}$ 446. Additional details regarding generating the virtual character face bases $A_{id}$ 434 and the virtual character expression bases $A_{exp}$ 436 are provided later.

In order for the virtual character to be generated and customized for use in video conferencing, the virtual character base model generation system 412 can send the virtual character face bases 434 and the virtual character expression bases 436 to each client device 450 that supports the virtual character rendering for video conferencing. At a client device 450, the meeting client application 404 that is configured to allow a user to join a video conference can process the virtual character face bases 434 and the virtual character expression bases 436. For example, the meeting client application 404 can access an image of the user associated with the client device 450 to identify a facial feature vector $\alpha$ for the user. The facial feature vector $\alpha$ can represent the shape of the user face and can indicate the weights of respective virtual character face bases $A_{id}$ 434 in contributing to the user face shape. Based on the facial feature vector $\alpha$, the meeting client application 404 can generate a virtual character neutral face $A_N$ 454 by combining the virtual character face model $A_0$ 432 selected by the user with the virtual character face bases $A_{id}$ 434 according to the facial feature vector $\alpha$.

The meeting client application 404 can further generate a set of virtual character expressions 456 for the user associated with the client device 450 by combining the virtual character expression bases $A_{exp}$ 436 based on the facial feature vector $\alpha$ of the user. The virtual character neutral face 454 and the virtual character expressions 456 can be generated before the video conference starts. During the video conference, the meeting client application 404 can detect the facial expression of the user based on the video of the user to determine an expression feature vector $\beta$ 452. The expression feature vector 452 can be used to incorporate the proper facial expression into the generated virtual character based on the facial expression of the user in real time or near real time. The generated virtual character A can be rendered and the rendered virtual character 440 can be included in the video of the user and transmitted as the meeting content 456 along with other data such as audio signals to the chat and video conference provider 410. The above process can be repeated if the user chooses a different virtual character face model $A_0$.

Figure 5:
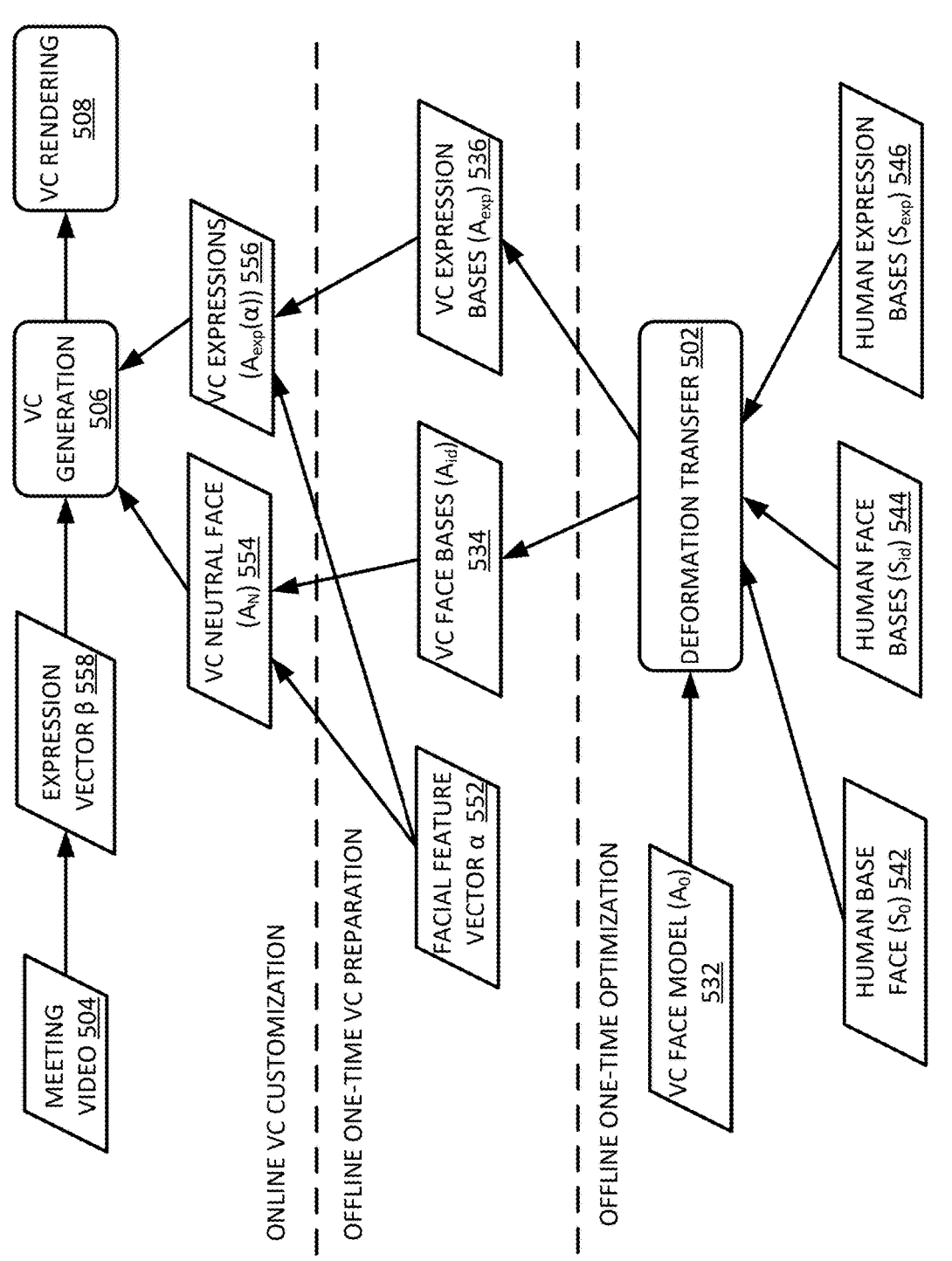
FIG. 5 shows an example of generating customized virtual characters for videoconferencing, according to certain aspects described herein.

Referring now to FIG. 5, FIG. 5 shows an example of generating a customized virtual character for a participant of a video conference based on a virtual character selection, according to certain aspects described herein. The example process shown in FIG. 5 involves actions performed in three phases: an offline one-time optimization, an offline one-time virtual character preparation, and an online virtual character customization. Assuming the participant has selected a virtual character represented by the virtual character face model $A_0$ 532. The offline one-time optimization may be performed by the virtual character base model generation system 412 and can involve a deformation transfer 502 to generate virtual character face bases $A_{id}$ 534 and virtual character expression bases $A_{exp}$ 536 for the virtual character face model $A_0$ 532.

The virtual character face bases $A_{id}$ 534 and the virtual character expression bases $A_{exp}$ 536 can be generated based on given models such as a human base face $S_0$ 542, a set of human face bases $S_{id}$ 544, and a set of human expression bases $S_{exp}$ 546. A human base face $S_0$ 542 is a 3D face model representing the basic features of a neutral human face in a standard shape, including the eyes, the mouth, the nose, etc. Each human face base in the set of human face bases $S_{id}$ 544 represents a particular type of face shape, such as a round face shape, a rectangular face shape, a pear-shaped face, etc. Each human expression base in the set of human expression bases 546 represents a particular type of facial expression, such as eye blinking, mouth opening, smiling, anger, etc.

FIG. 6 shows an example of the human base face $S_0$, a set of human face bases $S_{id}$, and a set of human expression bases $S_{exp}$. As shown in FIG. 6, the human base face $S_0$ is a neutral face with standard face shape and size. The human face bases $S_{id}$ in this example includes nine different human face bases, each of them representing different face shapes and sizes. The human expression bases $S_{exp}$ in this example includes nine different human facial expressions, such as yawning, blinking left eye, blinking right eye, smiling, etc.

Similar to human faces, each virtual character face base in the set of virtual character face bases $A_{id}$ 534 represents a particular type of face shape for a virtual character face model $A_0$. Each virtual character expression base in the set of virtual character expression bases $A_{exp}$ 536 represents a particular type of virtual character facial expression. FIG. 6 also shows an example of the virtual character base face $A_0$, a set of virtual character face bases $A_{id}$, and a set of virtual character expression bases $A_{exp}$. As shown in FIG. 6, the virtual character face model $A_0$ is a neutral face with standard face shape and size. The virtual character face bases $A_{id}$ 634 in this example includes nine different virtual character face bases, each of them representing different face shapes and sizes and corresponding to the nine different human face bases in $S_{id}$644. The virtual character expression bases $A_{exp}$ 636 in this example includes 9×9 different virtual character expression bases organized into nine groups each group corresponding to one virtual character face base and having nine different facial expressions matching to the nine human facial expressions in $S_{exp}$ 646. In other words, for each virtual character face basis in $A_{id}$ 634, there is a group of nine virtual character expression bases. Because there are nine different virtual character face bases in $A_{id}$ 634, there are nine group of virtual character expression bases in $A_{exp}$636.

Referring back to FIG. 5, for the selected virtual character face model 532, the virtual character base model generation system 412 can generate the set of virtual character face bases $A_{id}$ 534 based on the human base face $S_0$ 542 and the set of human face bases $S_{id}$ 544. By combining the human base face $S_0$ 542 with each of the set of the human face bases $S_{id}$ 544, differently shaped human faces can be generated. To generate virtual character face bases that represent different virtual character face shapes, the virtual character base model generation system 412 can perform a deformation transfer 502 on the virtual character face model 532 according to a deformation transfer that deforms the human base face $S_0$ 542 into the respectively shaped human faces.

Denoting the deformation transfer as $\tilde{A}=\mathcal{F}(A, S, \tilde{S})$, where A is the source virtual character model; $\tilde{A}$ is the target virtual character model; S is the source human face model and S is the target human face model. The deformation transfer $\tilde{A}=\mathcal{F}(A, S, \tilde{S})$ deforms the source virtual character model A into the target virtual character model $\tilde{A}$ in a way similar to how the source human face model S is deformed into the target human face model $\tilde{S}$.

For instance, the source human face model S can be the human base face model $S_0$ in the 3DMM, and the target human face model S can be a combination of the human base face model $S_0$ and a human face basis $$S_{id}^j$$

in the 3DMM, i.e., $$\tilde{S} = S_0 + s_{id}^j.$$

For a source virtual character model $A=A_0$, the deformation can generate a target virtual character $\tilde{A}^j$ and the 3D virtual character face basis (or virtual character PCA model)

$$A_{id}^j$$

can be derived as $$A_{id}^j = \tilde{A}^j - A.$$

As a result, the 3D virtual character face bases 534 (or virtual character PCA models)

$$A_{id} = \left[ A_{id}^1, A_{id}^2, \ldots, A_{id}^j, \ldots, A_{id}^{J_{id}} \right],$$

with $J_{id}$ being the number of human face PCA models in $S_{id}$, can be derived.

To derive the virtual character expression bases $A_{exp}$ 536, the source human face model S can be the combination of the human base face model $S_0$ and a human face basis $$S_{id}^j$$

in the 3DMM, i.e., $$S = S_0 + S_{id}^j.$$

The target human face model S can be a combination of the human base face model $S_0$, the human face basis $$S_{id}^j,$$

and a human expression basis $$S_{exp}^i$$

in the 3DMM, i.e., $$\tilde{S} = S_0 + S_{id}^j + S_{exp}^i.$$

For a source virtual character model $$A = A_0 + A_{id}^j,$$

the deformation can generate a target virtual character $\tilde{A}^{ij}$ and the 3D virtual character expression basis $$A_{exp}^{ij}$$

can be derived as $$A_{exp}^{ij} = \tilde{A}^{ij} - \left( A_{id}^j + A_0 \right).$$

As a result, the 3D virtual character expression bases 536

$$A_{exp} = \left[ A_{exp}^1; A_{exp}^2; \ldots; A_{exp}^i; \ldots, A_{exp}^I \right] = \left[ \left[ A_{exp}^{11}, A_{exp}^{12}, \ldots, A_{exp}^{1J} \right]; \right.$$
$$\left. \left[ A_{exp}^{21}, A_{exp}^{22}, \ldots, A_{exp}^{2J_{id}} \right]; \ldots \left[ A_{exp}^{I1}, A_{exp}^{I2}, \ldots, A_{exp}^{IJ_{id}} \right] \right]$$

can be derived, where $J_{id}$ is the number of human face PCA models and I is the number of human expression bases $S_{ex}$.

With the generated virtual character face bases $A_{id}$ 534 and virtual character expression bases $A_{exp}$ 536, the offline one-time virtual character preparation can be performed. This process may be performed by the client device 450 associated with the user and can involve generating the facial feature vector $\alpha$ for the participant and generating a virtual character neutral face $A_N$ 554 and virtual character expressions $A_{exp}(\alpha)$ 556 for the virtual character face model $A_0$ 532 and the participant.

As discussed above, the facial feature vector $\alpha$ can represent the shape of the face of the participant and can be extracted from an image of the participant. An example of generating the facial feature vector is described in U.S. Patent Application Publication 2023/0260184A1, the entirety of which is incorporated herein by reference. In some examples, the dimension of the facial feature vector $\alpha$ 552 is the same as the number of the virtual character face bases $A_{id}$ 534 and each value in the facial feature vector $\alpha$ 552 indicates the relative value of the corresponding virtual character face basis in contributing the face shape of the participant. As such, the facial feature vector $\alpha$ indicates the weights of respective virtual character face bases $A_{id}$ 434 in contributing to the user face shape. Based on the facial feature vector $\alpha$, the meeting client application 404 can generate a virtual character neutral face $A_N$ 554 by combining the virtual character face model $A_0$ 532 with the virtual character face bases $A_{id}$ 534 according to the facial feature vector $\alpha$, such as $$A_N = A_0 + \alpha A_{id} = A_0 + \sum_{j=1}^{J_{id}} \alpha_j A_{id}^j. \tag{X1}$$

The facial feature vector $\alpha$ can also be used to generate the virtual character expressions $A_{exp}(\alpha)$ 556 and each model in the $A_{exp}(\alpha)$ 556 can represent a facial expression for the face shape of the participant. For example, $$A_{exp}^i(\alpha) = \sum_{j=1}^{J_{id}} \alpha_j A_{exp}^{ij}. \tag{X2}$$

The generated virtual character neutral face $A_N$ 554 and virtual character expressions $A_{exp}(\alpha)$ 556 can be used during online meeting to generate customized virtual character for the participant with the selected virtual character face model $A_0$. For example, as the meeting is conducted, the meeting video 504 of the participant is captured, for example, by a camera of the client device 450. The client device 450 can further extract an expression vector $\beta$ 558 from the meeting video 504 by detecting the facial expression of the participant. An example of extracting an expression vector from a meeting video is described in U.S. Patent Application Publication 2023/0260184A1, the entirety of which is incorporated herein by reference. The client device 450 can perform the virtual character generation 506 using the expression feature vector $\beta$ 558 to incorporate the facial expression into the generated virtual character face model based on the facial expression of the participant. For example, the client device 450 can generate a customized virtual character $A_C$ during the virtual character generation 506 by:

$$A_C = A_0 + \alpha A_{id} + \beta A_{exp}(\alpha) = A_0 + \sum_{j=1}^{J_{id}} \alpha_j A_{id}^j + \sum_{i=1}^{I} \beta_i A_{exp}^i(\alpha) \tag{X3}$$

The generated virtual character $A_C$ can be rendered during the virtual character rendering 508 to generate the video of the participant for transmission to other participants of the meeting. Generating the expression vector $\beta$ 558, the virtual character generation 506, and the virtual character rendering 508 can be repeated periodically as the meeting is being conducted, such as every 40 milliseconds.

While the above example describes the process of generating the customized virtual character for one virtual character $A_0$, the same process can be performed for other virtual characters. For example, the virtual character base model generation system 412 can generate the virtual character face bases 434 and the virtual character expression bases 436 for different virtual character face bases 432 as described above. These different sets of virtual character face bases 434 and virtual character expression bases 436 can be transmitted to each client device 450. In this way, each user may choose to switch to a different virtual character face model $A_0$ during the meeting, and the corresponding customized virtual character can be generated and updated in real time or near real time.

Figure 7:
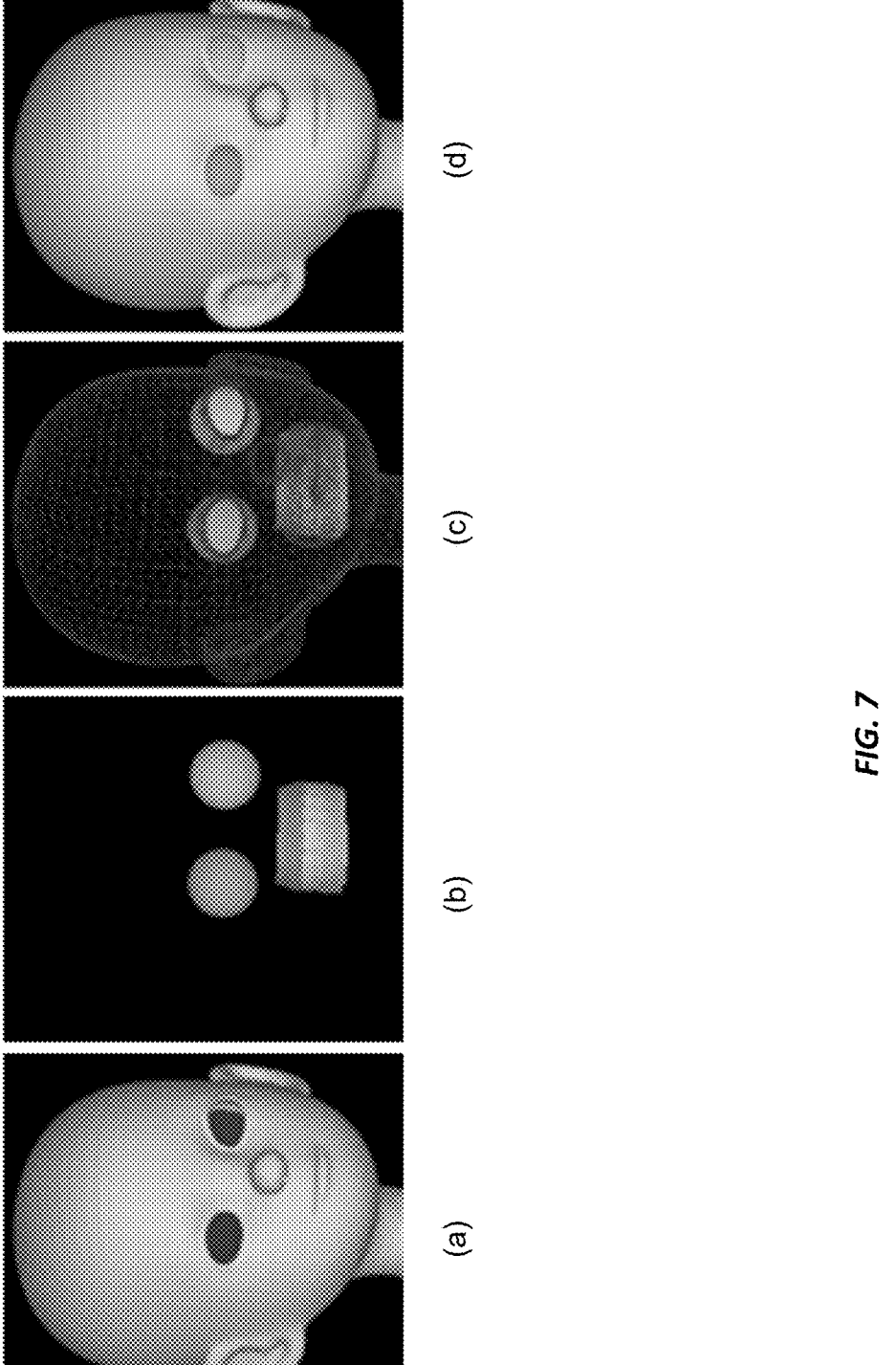
FIG. 7 shows examples of components of a virtual character, according to certain aspects described herein.

Referring now to FIG. 7, FIG. 7 shows examples of components of a virtual character $A_0$, according to certain aspects described herein. Sub-figure ($\alpha$) shows the main virtual character component of the virtual character (also referred to as the "main component" and denoted as $W_1(A_0)$) which includes the face, nose, mouth, ears, etc. Sub-figure (b) shows other components of the virtual character (denoted as $W_j(A_0)$, j>1), such as the left eyeball, the right eyeball, upper gum and upper teeth, lower gum and lower teeth, etc. Sub-figure (c) shows the other components $W_j(A_0)$, j>1 with the main virtual character component $W_1(A_0)$ shown in a wire frame. Sub-figure (d) shows all components W ($A_0$), j>1 of the virtual character $A_0$.

Figure 8:
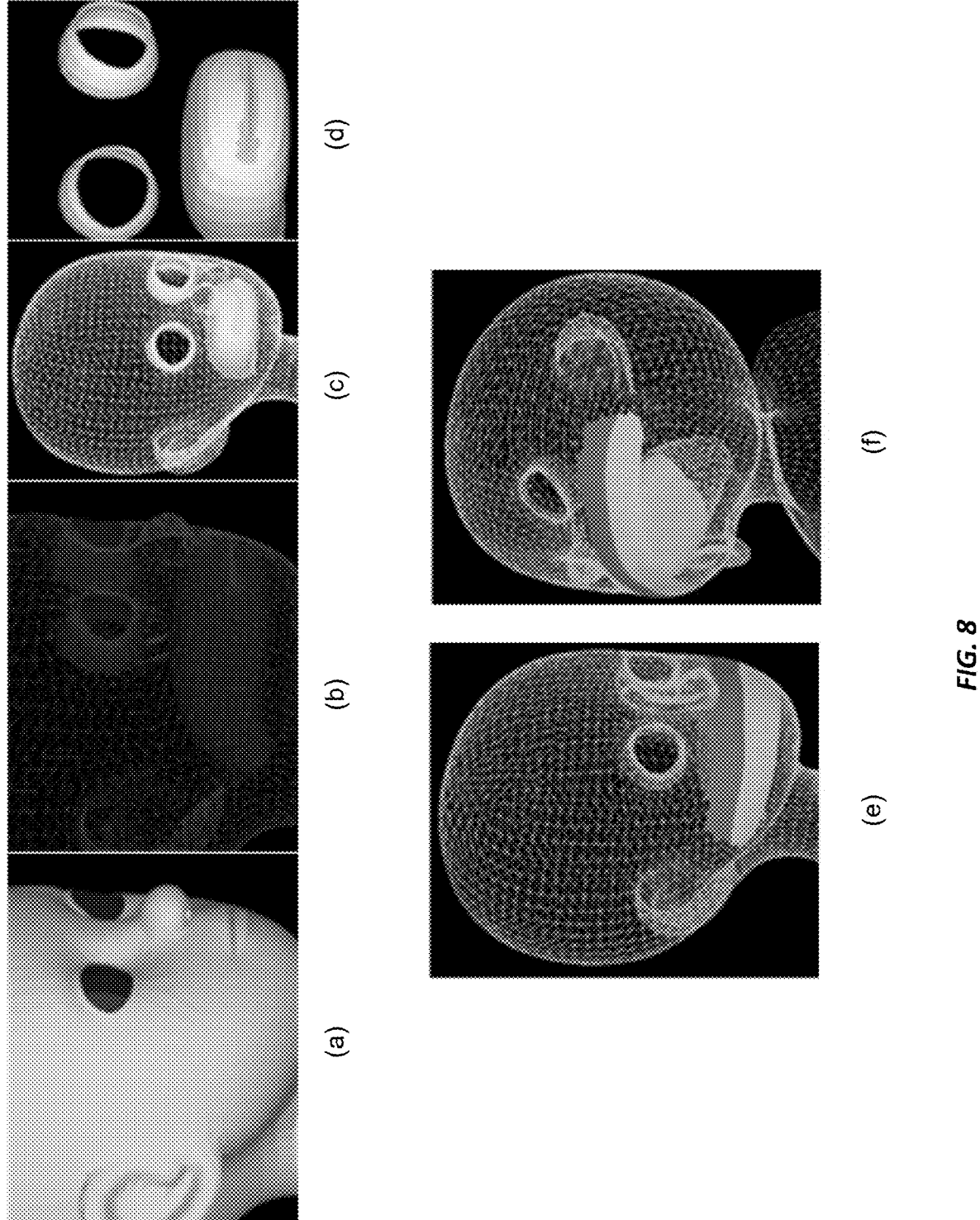
FIG. 8 shows examples of interior region separation on the main virtual character component, according to certain aspects of the present disclosure.

The main component $W_1(A_0)$ is the largest component overlapping with the face region. $W_1(A_0)$ may contain interior mouth and eye regions as shown in the wireframe of sub-figure (c). FIG. 8 shows the interior region separation on the main virtual character component $W_1(A_0)$. Sub-figure ($\alpha$) shows the external region in a surface form with the interior regions shown in blue. Sub-figure (b) shows the external region in a wireframe form with the interior regions shown in blue. Sub-figure (c) shows the external region in a wireframe form with the interior regions shown in a surface form. Sub-figure (d) shows the interior regions in a surface form. Sub-figures (e) and (f) of FIG. 8 further show an example of dividing the mouth of the virtual character into two regions: the mouth upper region $L_{upper}(A_0)$ in green and the mouth lower region $L_{lower}(A_0)$ in orange. As will be discussed later, dividing the mouth of the virtual character into the upper and lower regions can facilitate the deformation to avoid preventing the mouth opening in the deformed virtual character.

Because $W_1(A_0)$ may also contains interior structures such as the mouth and the eye socket as shown in FIG. 8, the main component $W_1(A_0)$ cannot be used as the face region of the virtual character to be deformed directly along with the human face model. In other words, the human face model does not have the interior structures and the deformation transfer generated using the human face models does not provide information on how to deform the interior structures. If the main component $W_1(A_0)$ is deformed directly by following the deformation of the human face model, only the face region will be deformed and the interior structures will remain unchanged, which may cause artifacts in the generated virtual character. As used herein, the face region of a virtual character face model (such as the virtual character face model 532) refers to a region including facial features such as noses and lips and excluding interior regions such as interior mouth and eye regions. The non-face regional refers to the remaining parts of the virtual character face model including the interior regions such as interior mouth and eye regions of the virtual character and other components W ($A_0$), j>1.

To allow the virtual character face model $A_0$ to be deformed properly, virtual triangles can be generated to connect the face region with the non-face region of the virtual character face model $A_0$ to propagate the deformation from the face region to the non-face region thereby allowing the non-face region to be deformed properly. Likewise, virtual triangles can also be generated between two components or regions within the non-face region of the virtual character to allow the deformation to be propagated to various components of the non-face region.

Denote the virtual triangles connecting one region $W_i$ to another region $W_j$ as $$V_t^1(W_i, W_j)$$

and initialize $$V_t^1(W_i, W_j) = \emptyset.$$

Determine a threshold $\delta(W_i, W_j)$ used for generating the virtual triangles as $$\delta(W_i, W_j) = d_{min}(W_i, W_j) + \delta_1(d_{max}(W_i, W_j) - d_{min}(W_i, W_j)) \qquad \text{(X4)}$$

Here, $\delta_1$ is a hyper parameter indicating the ratio for defining virtual triangles between two regions. $d_{min}(W_i, W_j)$, $d_{max}(W_i, W_j)$ are the min and max distances between surfaces of the two regions $W_i$, $W_j$ and can be calculated by $$d_{min}(W_i, W_j) = \min_{p \in V(W_i), F \in F(W_j)} d_{min}(p, F) \qquad \text{(X5)}$$

$$d_{max}(W_i, W_j) = \max_{p \in V(W_i), F \in F(W_j)} d_{max}(p, F). \qquad \text{(X6)}$$

Here, $d_{min}(p, F)$ and $d_{max}(p, F)$ are the minimum and maximum distances from one vertex p to a triangle $\Gamma$ with three vertices $(v_0, v_1, v_2)$, respectively, and can be defined as $$d_{min}(p, F) = \min_{\substack{(r_0, r_1, r_2) \\ r_0 + r_1 + r_2 = 1 \\ r_i \geq 0}} \left\| p - \sum_{i=0}^{2} r_i v_i \right\|, \qquad \text{(X7)}$$

$$d_{max}(p, F) = \max_{\substack{(r_0, r_1, r_2) \\ r_0 + r_1 + r_2 = 1 \\ r_i \geq 0}} \left\| p - \sum_{i=0}^{2} r_i v_i \right\|, \qquad \text{(X8)}$$

where $r_0, r_1, r_2$ is the barycentric coordinates of a vertex on F. $V(W_i)$ denotes the vertices of $W_i$ and $F(W_j)$ denotes the triangles of $W_j$.

For every vertex $p \in V(W_i)$ and every triangle $(v_0, v_1, v_2) \in F(W_j)$, if the vertex-triangle distance in Eq. (X7) is smaller than the threshold in Eq. (X4), i.e.

$$d_{min}(p, (v_0, v_1, v_2)) < \delta(W_i, W_j), \qquad \text{(X9)}$$

the following three triangles are added to $$V_t^1(W_i, W_j)$$

$$(p, v_1, v_2), (v_0, p, v_2), (v_0, v_1, p) \qquad \text{(X10)}$$

Note that the threshold in Eq. (X4) is adaptive to the size of the region. With $W_i$ fixed, the threshold for a larger $W_i$ is bigger. As a result, more virtual triangles will be generated. For example, if $W_1$ is the face region, $W_2$ is the pupil region, and $W_3$ is the interior mouth region, the number of virtual triangles from $W_3$ to $W_1$, i.e.

$$V_t^1(W_3, W_1),$$

will be larger than the number of virtual triangles from $W_2$ to $W_1$, i.e.

$$V_t^1(W_2, W_1).$$

FIG. 9 shows, in sub-figure ($\alpha$), virtual triangles (in yellow) between the non-face region, the interior mouth region in this example (in green), and the face region (in blue) from the viewpoint on top of the mouth.

The generated virtual triangles can be classified into two groups $G_{0,0}$ and $G_{0,1}$: if a virtual triangle connects the mouth upper region $L_{upper}(A_0)$ and mouth lower region $L_{lower}(A_0)$, the virtual triangle is put into $G_{0,0}$, otherwise, it is put into $G_{0,1}$. Each virtual triangle in $G_{0,0}$ satisfies either one of the following conditions: has one vertex on $L_{upper}(A_0)$ and two vertices on $L_{lower}(A_0)$ or has two vertices on $L_{upper}(A_0)$ and one vertex on $L_{lower}(A_0)$. Sub-figure (b) of FIG. 9 shows examples of virtual triangles in $G_{0,0}$ and $G_{0,1}$. In sub-figure (b), virtual triangles shown in blue are between the mouth upper region and the mouth lower region and thus they are put into $G_{0,0}$. The remaining virtual triangles are shown in yellow and thus are included in $G_{0,1}$.

To generate a target deformed virtual character, a two-stage process can be employed. The two-stage deformation transfer algorithm is formulated as follows:

Stage 1: deform the face region of the virtual character $\Delta = \delta(A_0)$ while other regions of $A_0$ are fixed:

$$\hat{A} = \mathcal{F}(A, S, \tilde{S}) \text{ s.t. } \tilde{A} - \Delta(\tilde{A}) = A - \Delta(A); \qquad \text{(X11)}$$

Stage 2: deform A while keeping its face region fixed as $$\tilde{A} = \mathcal{F}(\hat{A}, S, \tilde{S}) \text{ s.t. } \Delta(\tilde{A}) = \Delta(\hat{A}) \qquad \text{(X12)}$$

In some examples, the deformation transfer in Eq.(X11) and Eq.(X12) can be formulated as $$\hat{A} = \arg\min_{V(\hat{A})} E(\hat{A}) = \sum_{i \in C_F} \lambda_i E_i(\hat{A}) \qquad \text{(X13)}$$

-continued $$\text{s.t. } V_i(\hat{A}) = V_i(A), \quad \forall i \in L_v^{fix}(A) \cup \rho_v(\Delta, S_0, \tilde{S}) \cup \overline{K}_{\Delta,v}.$$

$$\hat{A} = \underset{V(\hat{A})}{\arg\min} \ E(\hat{A}) = \sum_{i \in C_{NF}} \lambda_i E_i(\hat{A}) \tag{X14}$$

$$\text{s.t. } V_i(\hat{A}) = V_i(A), \quad \forall i \in L_v^{fix}(A) \cup \rho_v(\Delta, S_0, \tilde{S}) \cup K_{\Delta,v}.$$

where $\lambda_i$ are hyper parameters for various terms in the loss function $E(\cdot)$ in Eq. (X13) and Eq. (X14). The loss function $E(\hat{A})$ and $E(\tilde{A})$ in Eq. (X13) and Eq. (X14) may also be referred to as objective functions and terms $E_i(\cdot)$ may be referred to as constraints. $K_{\alpha,v}$, are the vertices' indices of the face region and $\overline{K}_{\alpha,v}$, are the vertices' indices of the non-face region with $$\overline{K}_{\Delta,v} = \bigcup_j \overline{K}_{\Delta,v,j}. \tag{X15}$$

where $\overline{K}_{\alpha,v,j}$ includes vertices' indices of the non-face region on the j-th component $\{W_j(A)\}$.

$$L_v^{fix}(A)$$

represents the fixed vertices indicating vertices in the non-face region to fixed during deformation transfer $$L_v^{fix}(A) = \{L_{v,i}^{fix}(A_0)\}, \tag{X16}$$

where $$L_{v,i}^{fix}(A_0)$$

is the i-th fixed vertex. For example, vertices on the neck and back of the virtual character can be fixed vertices. These fixed vertices may be manually labelled. $\rho_v(\Delta, S, \tilde{S})$ is the set of fixed vertices in the face region $\Delta$ of the virtual character to be fixed during the deformation transfer. $C_\Gamma$ is a set containing the indices of constraints related to face region; and $C_{NF}$ is a set containing the indices of constraints related to non-face region. As will be discussed in more detail below, the minimization problem in Eq. (X13) (or Eq. (X14)) can be solved by reformulating the loss function to a linear form and solving it through a linear solver.

The constraints related to face region can include, for example, enforcing the difference between the deformation gradient of triangles in the stage-one deformed virtual character $T_j(A, \hat{A})$ and the deformation gradient of corresponding triangles in the human face model $T_j(S, \tilde{S})$ to be as small as possible. This constraint can be used to make sure the deformation of A into $\tilde{A}$ using the deformation gradient from S to $\tilde{S}$. The constraints can further include enforcing the triangles on A without any correspondence from the source model S to remain unchanged, i.e., having identity deformation gradient. Other constraints may also be used. Examples of the face region related constraints are discussed below in detail.

In some examples, the constraints related to non-face region $C_{NF}$ can include two constraints defined based on the virtual triangles. For example, the following two constraints can be defined:

$$E_{18} = \delta(L_{c,4}(\tilde{S}), L_{c,5}(\tilde{S})) \cdot \sum_{j \in G_{0,0}} \left\| T_j(\hat{A}, \tilde{A}) - I_3 \right\|^2 \tag{X17}$$

$$E_{19}(\tilde{A}) = \sum_{j \in G_{0,1}} \left\| T_j(\hat{A}, \tilde{A}) - I_3 \right\|^2 \tag{X18}$$

Here, $I_3$ is an identify matrix defined as $$I_3 = \begin{pmatrix} 1 & 0 & 0 \\ 0 & 1 & 0 \\ 0 & 0 & 1 \end{pmatrix}, \tag{X19}$$

and $T_j(\hat{A}, \tilde{A})$ is the deformation gradient from $\hat{A}$ to $\tilde{A}$ for triangle j.

As discussed above, $G_{0,0}$ contains virtual triangles connecting the mouth upper region $L_{upper}(A_0)$ of the virtual triangle and the mouth lower region $L_{lower}(A_0)$ of the virtual character. $G_{0,1}$ contains virtual triangles connecting two different regions other than those in $G_{0,0}$. $\delta(L_{c,4}(\tilde{S}), L_{c,5}(\tilde{S}))$ indicates whether the mouth is close or not with one indicating the mouth is closed and 0 otherwise. $\delta(L_{c,4}(\tilde{S}), L_{c,5}(\tilde{S}))$ will be discussed in detail later. During the second stage of the optimization process, $E_{18}(\tilde{A})$ or $E_{19}(\tilde{A})$ or both can be enabled by adjusting the value of corresponding hyperparameters $\lambda_{18}$ and $\lambda_{19}$.

Figure 10:
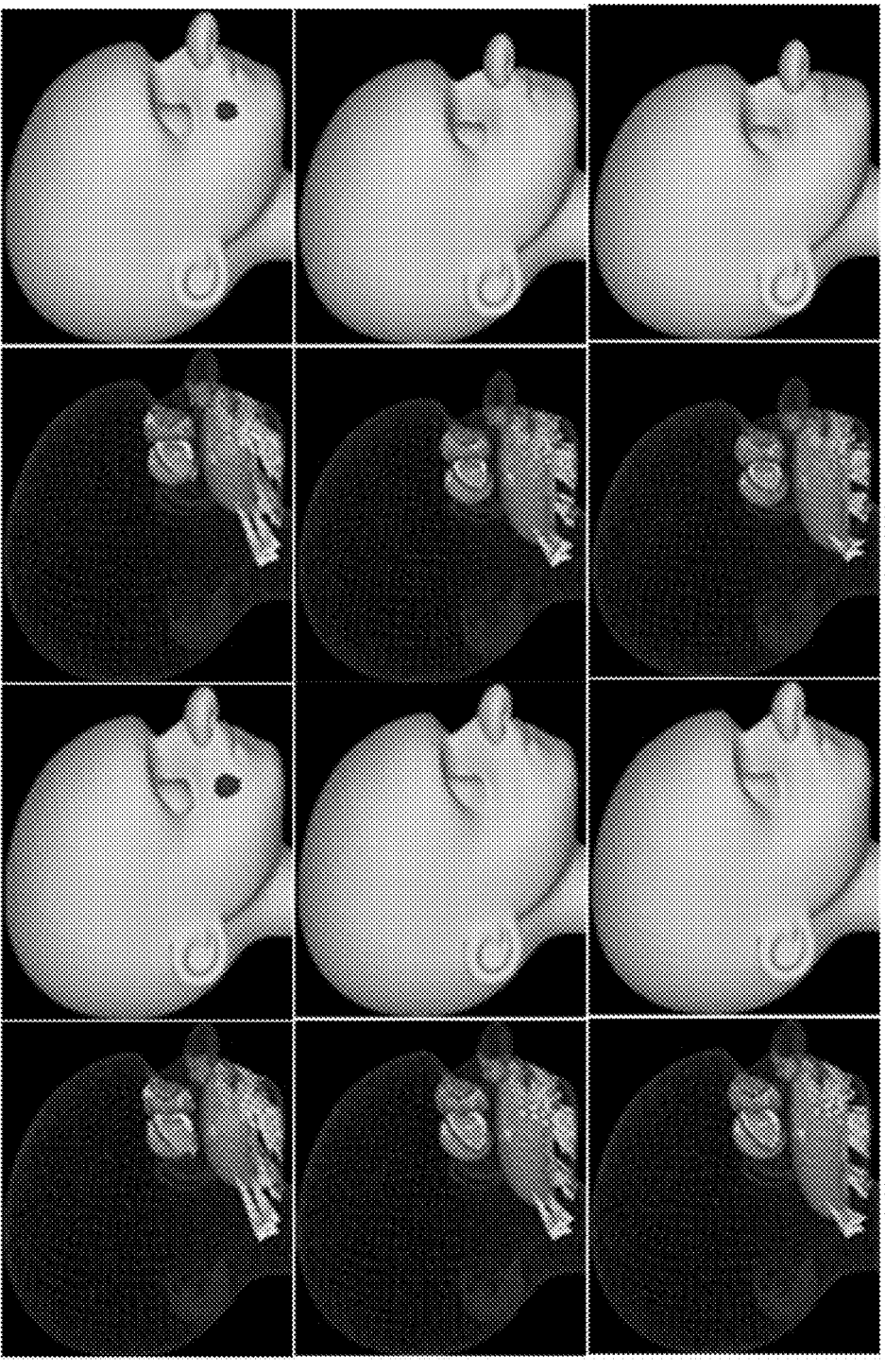
FIG. 10 shows examples of the deformation results for a virtual character with different values of the hyperparameters $\lambda_{18}$ and $\lambda_{19}$, according to certain aspects of the present disclosure.

FIG. 10 shows examples of the deformation results for a virtual character with different values of the hyperparameters $\lambda_8$ and $\lambda_{19}$. In FIG. 10, the virtual triangles between the eyeballs and the face region will drive the deformation of the eyeballs following the deformation of the face region. Without the terms in Eq.(X17) and Eq.(X18), the non-face regions connecting to the face region, such as the interior mouth region (the green region in (α) of FIG. 9), can deform without virtual triangles. In FIG. 9, the deformation gradient will propagate from the lip's regions to the interion mouth region via the red region. The interior mouth region may intersect with the face region (the blue region in FIG. 9). As such, a gap can be created between the face region and the non-face region before the virtual triangles are generated and before the deformation. As shown in FIG. 9, a gap is created between the green region and the blue region before the deformation. However, when the virtual character deforms without the terms in Eq.(X17) and Eq.(X18), the two regions may intersect with each other. With the terms in Eq.(X17) and Eq.(X18), the virtual triangles (yellow triangles in FIG. 9) maintain the gap between the two regions, thus eliminate the intersection between the two regions. The results in the first row of FIG. 10 are generated with a small weight $\lambda_{18} = \Delta_{19} = 0.01$. As can be seen from FIG. 10, a small value of $\lambda_{18}$ and $\lambda_{19}$ is unable to prevent the intersection (indicated as the black areas in the face region). As the weight $\lambda_{18} = \Delta_{19}$ increases, the interior regions are pushed away from the face region (the second and the third rows of FIG. 10). Besides increasing weights $\lambda_{18} = \Delta_{19}$, another way to prevent the self-intersection is increasing the hyper parameter $\delta_1$ to increase the number of virtual triangles.

As shown in sub-figure (b) of FIG. 9, virtual triangles in $G_{0,0}$ connect the upper region of the mouth to the lower region of the mouth as defined in sub-figure (e) and sub-figure (f) of FIG. 8. Forcing these triangles to remain unchanged during deformation will prevent the mouth from opening. Thus, if the mouth is open on the source virtual character, i.e. $\delta(L_{c,4}(\tilde{S}), L_{c,5}(\tilde{S}))=0$, virtual triangles in $G_{0,0}$ should be ignored (as formulated in Eq. (X17), and the correct result shown in (d) of FIG. 9 can be obtained. If $\delta(L_{c,4}(\tilde{S}), L_{c,5}(\tilde{S}))$ is removed and Eq.(X17) is replaced with the following:

$$E'_{18}(\tilde{A}) = \sum_{j \in G_{0,0}} \left\| T_j(\hat{A}, \tilde{A}) - I_3 \right\|^2. \qquad (X20)$$

Incorrect deformation results will be generated as shown in sub-figure (d) of FIG. 9. In sub-figure (d) of FIG. 9, virtual triangles in $G_{0,0}$ connecting upper teeth and lower teeth try to remain the original shape following Eq.(X20). As a result, the upper teeth are forced to connected to the lower teeth.

Alternative, or in addition to $E_{18}(\tilde{A})$ and $E_{19}(\tilde{A})$, other constraints may also be used in the second stage for the non-face region. For example, the two-stage deformation process can be performed without introducing the virtual triangles. Correspondence can be established between pairs of surfaces in the face region and non-face region. In other words, for a triangle surface in the face region, a triangle surface in the non-face region that is close to the face region can be identified. These pairs of corresponding surfaces can be utilized when deforming the non-face region in the second stage to enforce the deformation of the surface in the non-face region to be close to the deformation of the corresponding surface in the face region. In this way, the non-face region can be deformed similarly as the face region, thereby reducing the artifacts in the deformed virtual character. For example, a constraint can be added to the constraints related to non-face region $C_{NF}$ and be introduced by adding $E_{20}$ to Eq. (X14) to enable deformation of the non-face region following the deformation of the face region without using virtual triangles:

$$E_{20}(\tilde{A}) = \sum_{(i,j) \in G_3} \left\| T_j(A, \hat{A}) - T_i(\hat{A}, \tilde{A}) \right\|^2 \qquad (X21)$$

where $G_3$ contains pairs of the corresponding triangles between the face region and the non-face region. Additional examples of the non-face region related constraints are discussed below in detail.

Figure 11:
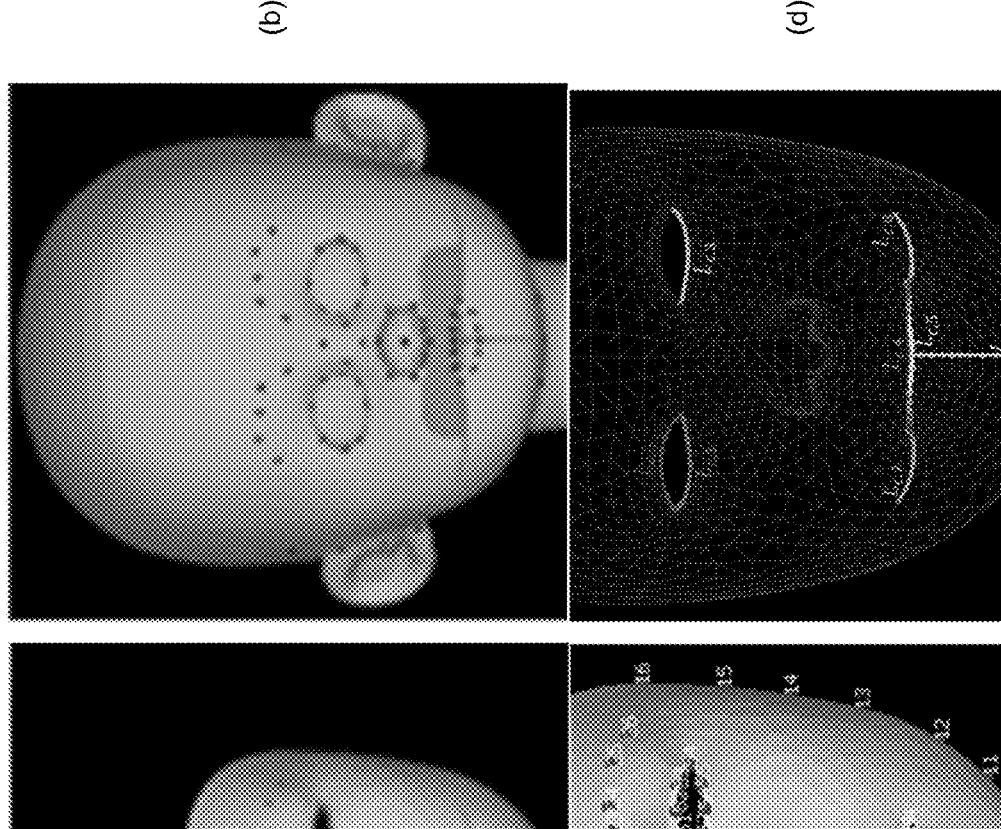
FIG. 11 shows an example of labelled input data including feature vertices, feature curves, and feature regions on the 3DMM base surface and the virtual character, according to certain aspects of the present disclosure.

Virtual characters are unreal characters and typically have facial features that are unproportional to other features. For example, the virtual character may have a wider face, larger eyes, a smaller mouth, and a longer nose than those in the human face. Deformation transfer derived from human face models may not lead to the proper deformation for those facial features. To address this problem, facial feature enhancement can be introduced as constraints in the deformation transfer process to ensure the desired facial features of the deformed virtual character to be obtained. To perform facial feature enhancement, feature points/vertices and feature curves on the human base face and the virtual character face model are utilized to define the various features of a face. FIG. 11 shows labelled input data including feature vertices, feature curves, and feature regions on the 3DMM base surface as shown in sub-figure ($\alpha$) and the corresponding feature vertices, feature curves, and feature regions on the virtual character shown in sub-figure (b). Sub-figures (c) and (d) shows the details of the feature vertices and feature curves which include 78 feature vertices (also referred to as "facial landmarks") and 9 feature curves defined on the facial landmarks of the 3DMM base surface. The nine feature curves include $L_{c,0}$ to $L_{c,8}$ defined over respective facial landmarks describing facial features such as right upper/lower eye lid, left upper/lower eye lid, upper mouth, lower mouth, and so on. For example, $\delta(L_{c,4}(\tilde{S}), L_{c,5}(\tilde{S}))$ in Eq. (X17) is defined using the feature curve $L_{c,4}$ describing the upper mouth and the feature curve $L_{c,5}$ describing the lower mouth.

Figure 12:
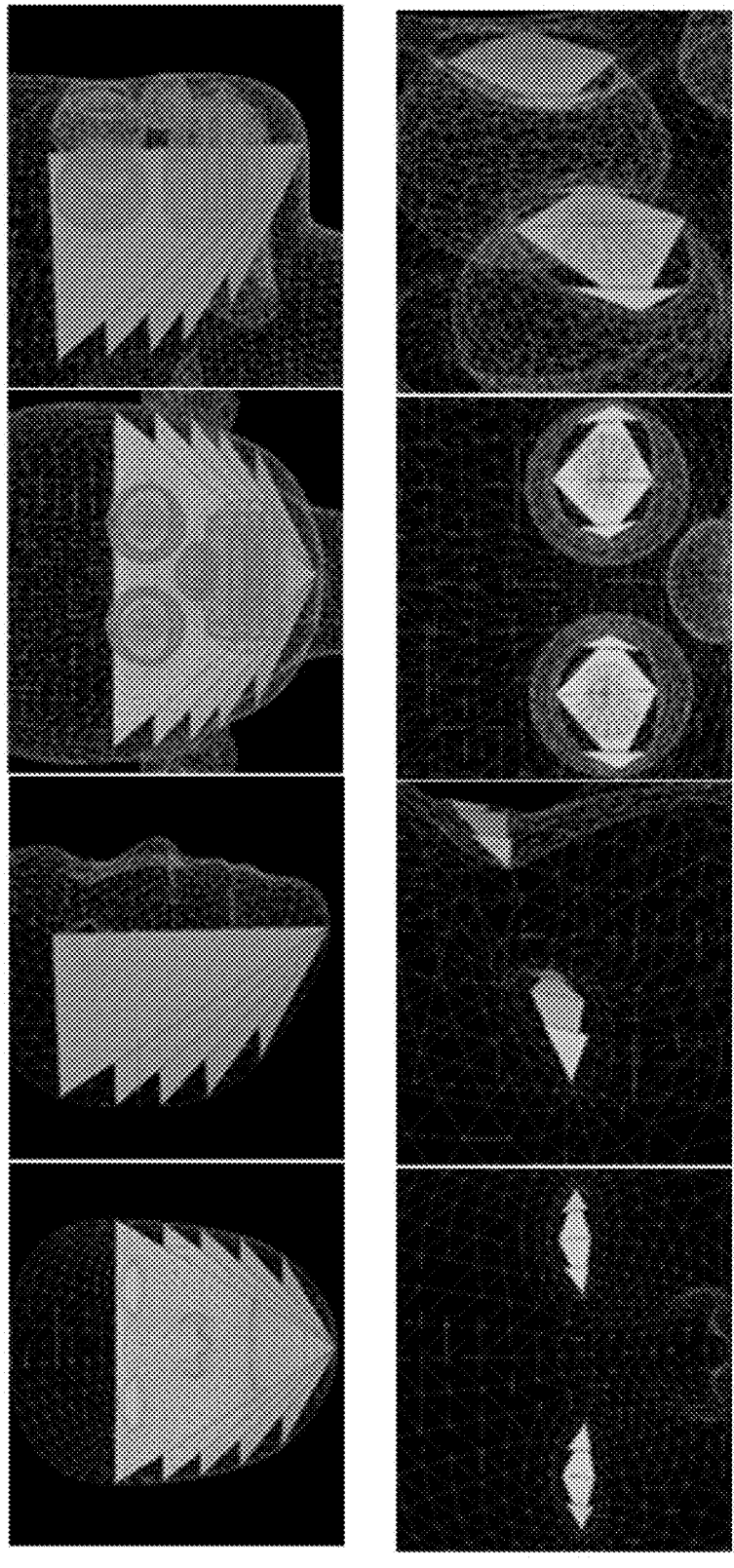
FIG. 12 shows examples of corresponding virtual feature triangles defined over feature vertices on the 3DMM model and a virtual character, according to certain aspects of the present disclosure.

The labelled feature vertices can be used to facilitate the feature enhancement by defining various auxiliary tools, such as virtual feature triangles. FIG. 12 shows examples of corresponding virtual feature triangles defined over feature vertices on the 3DMM model and a virtual character. The first row shows five virtual triangles on both the 3DMM based face and the virtual character base surface as $$(L_{v,16}, L_{v,0}, L_{v,8}), (L_{v,15}, L_{v,1}, L_{v,8}), \qquad (X22)$$

$$(L_{v,14}, L_{v,2}, L_{v,8}), (L_{v,13}, L_{v,3}, L_{v,8}), (L_{v,12}, L_{v,4}, L_{v,8})$$

Similarly, virtual feature triangles to enhance face features such as eyes, nose, and lips can also be defined. The second row of FIG. 12 shows eight virtual feature triangles that can be used to enhance the global deformation of the eye regions.

$$(L_{v,46}, L_{v,44}, L_{v,48}), (L_{v,46}, L_{v,45}, L_{v,47}), \qquad (X23)$$

$$(L_{v,42}, L_{v,48}, L_{v,44}), (L_{v,42}, L_{v,49}, L_{v,43})$$

$$(L_{v,54}, L_{v,52}, L_{v,56}), (L_{v,54}, L_{v,53}, L_{v,55}),$$

$$(L_{v,50}, L_{v,56}, L_{v,52}), (L_{v,50}, L_{v,57}, L_{v,51})$$

$L_{v,i}=0, \ldots, 77$ are the facial landmarks shown in FIG. 11.

For example, if a facial feature is to be enlarged or reduced, the deformation can be performed such that a difference between the deformation for a facial feature of the virtual character and a scaled (up or down) deformation for the corresponding facial feature in the human face is minimized. In some implementations, a constraint can be added to face region related constraint set $C_r$ to perform deformation gradient scaling by introducing $E_{12}$ to the objective function in Eq. (X13):

$$E_{12}(\hat{A}) = \sum_{(i,j,k,s_1,s_2,s_3) \in M_g} \left\| T_{(L_{v,i}(A),L_{v,j}(A),L_{v,k}(A))}(A, \hat{A}) - \right. \qquad (X24)$$

$$\left. E_{(s_1,s_2,s_3)}\left( T_{(L_{v,i}(S_0),L_{v,j}(S_0),L_{v,k}(S_0))}(S_0, \tilde{S}) \right) \right\|^2.$$

Here, $M_g$ is the scaling triangle data defined as:

$$(i_l,j_l,k_l,\eta_{l,x},\eta_{l,y},\eta_{l,z}) \in M_g(A_0)$$

with $i_l$, $j_l$, $k_l$ defining a virtual feature triangle using feature vertices $(L_{v,i_l}, L_{v,j_l}, L_{v,k_l})$ as corners, and $\eta_{l,x}, \eta_{l,y}, \eta_{l,z}$ being hyper parameters. The deformation gradient for the triangle $(L_{v,i_l}, L_{v,j_l}, L_{v,k_l})$ will be scaled by $\eta_{l,x}, \eta_{l,y}, \eta_{l,z}$ along x-, y-, z-axis, respectively. The virtual feature triangles in $M_g$ may include the virtual feature triangles in Eq. (X22) which can be used to enhance the face of the virtual character or the virtual feature triangles in Eq. (X23) which can be used to enhance the eye area of the virtual character. $T_{(L_{v,i},L_{v,j},L_{v,k})}$ is the deformation gradient of a triangle by i-th, j-th, and k-th landmarks. $E_{(s_1,s_2,s_3)}$ is a scaling operation on the deformation gradient which enhances the scaling along the i-th axis by $s_i$ with i being 1, 2, 3 representing x-, y-, or z-axis, respectively. Detail examples of $E_{(s_1, s_2, s_3)}$ will be presented later.

By setting the hyperparameter $\lambda_{12}$ for $E_{12}$ to be a non-zero positive value, the facial feature of the virtual character can be enhanced from the corresponding facial feature of the human face model. In some implementations, the hyperparameter $\lambda_{12}$ is set to be a non-zero positive value when generating the virtual character face bases 534 and is set to be zero when generating the virtual expression bases 536 because the deformation gradients for expressions do not need to be enhanced.

While some facial features of the virtual character need to be enhanced, there are certain facial features need to be preserved during the deformation transfer. For example, when performing deformation transfer to generate virtual character base expression models from human face expression models, facial features, such as closed mouth, closed eye, should be preserved. In other words, if the human facial expression has the mouth or an eye closed, the deformed virtual character base expression model should also have the mouth or eye closed. Other features, such as the shape of the mouth and eyes, the symmetry of the vertices, should also be preserved.

In some implementations, each feature preservation is introduced as a constraint or a loss term in the loss function to be minimized. For example, a set of virtual feature triangles can be generated based on vertices of a feature curve. A loss term can be defined based on the differences between deformation gradients of the set of virtual feature triangles and an identity deformation gradient so that the deformation of the region near the feature curve is minimized. For instance, a constraint can be added to the face region related constraints $C_\Gamma$ and a loss term $E_{11}$ can be added to the loss function in Eq. (X13). A constraint can be added to the non-face region related constraints $C_{NF}$ and a loss term $E_{16}$ can be added to the loss function in Eq. (X14). $E_{11}$ and $E_{16}$ can be defined as:

$$E_{11}(\hat{A}) = \sum_{j \in G_{1,0}} \left\| T_j(A, \hat{A}) - I_3 \right\|^2 \qquad \text{(X25)}$$

$$E_{16}(\hat{A}) = \sum_{j \in G_{1,1}} \left\| T_j(\hat{A}, \tilde{A}) - I_3 \right\|^2. \qquad \text{(X26)}$$

Figure 13:
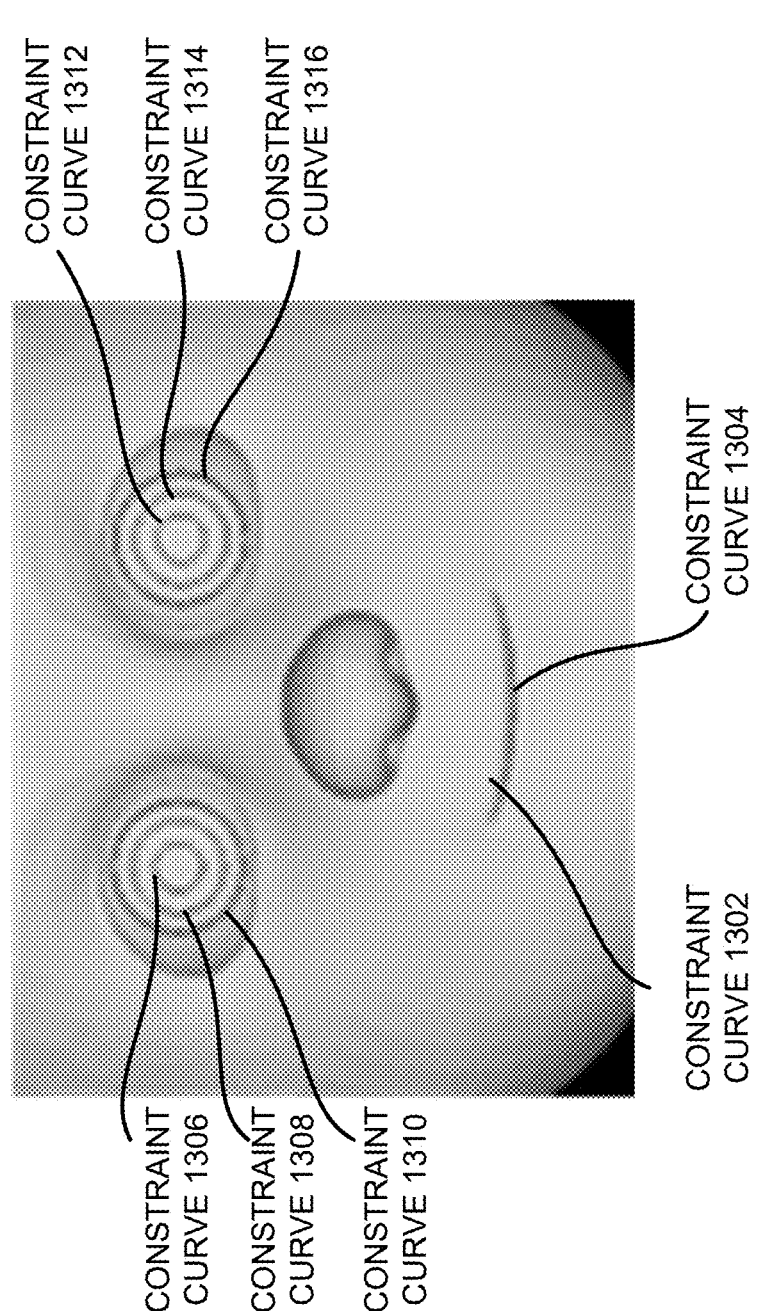
FIG. 13 shows examples of constraint curves, according to certain aspects of the present disclosure.

Here, $I_3$ is the identity matrix defined in Eq. (X19). $G_{1,0}$ and $G_{1,1}$ are virtual feature triangles defined along the constraint curves $$L_c^{fix} = \{L_{c,i}^{fix}\}, \text{ where } L_{c,i}^{fix}$$

is the i-th constraint curve. FIG. 13 shows examples of the constraint curves. In FIG. 13, there are two constraint curves $$L_{c,0}^{fix}$$

1302 and $$L_{c,1}^{fix}$$

1304 used to maintain the mouth shape. In some examples, $$L_{c,0}^{fix}$$

is set to be the feature curve $L_{c,4}$ and $$L_{c,1}^{fix}$$

is set to be the feature curve $L_{c,5}$ shown in FIG. 11. FIG. 13 also shows 3 constraint curves 1306-1310 and 1312-1316 for each pupil to keep the pupil in the circular shape.

The virtual feature triangles from a constraint curve can be generated as follows. Denote the constraint curve as $$L = [\, v_1 \quad v_2 \quad \ldots \quad v_i \quad \ldots \quad v_n \,] \qquad \text{(X27)}$$

where $v_1$ is the index of the vertex $v_{v_i}$ on the mesh, n=|L|, and $v_{v_i} v_{v_i}$ is an edge of the mesh. For the curve Lc(n−2) virtual feature triangles can be constructed with the i-th triangle as $(v_1 \ v_{1+1} \ v_{1+2})$ with i=1, . . . , n−2. When deforming a triangulated model from A to $\tilde{A}$, according to Eq.(X21), setting the deformation gradient for these virtual feature triangles as $I_3$, i.e.

$$T_{(v_i \ v_{i+1} \ v_{i+2})}(A, \tilde{A}) = I_3, \qquad \text{(X28)}$$

indicates that these triangles do not deform. Thus, the curve L will fix during the deformation.

$G_{1,0}$ and $G_{1,1}$ can be generated by diving $G_1$. $G_1$ can be initialized as an empty set. For each constraint curve $$L_{c,i}^{fix},$$

virtual feature triangles $$V_r^2(L_{c,i}^{fix})$$

can be generated as described above and be added to $G_1$ as $$G_1 = G_1 \cup V_r^2(L_{c,i}^{fix}). \qquad \text{(X29)}$$

For each virtual feature triangle in $G_1$, if all the vertices of the virtual triangle belong to the face region $\Delta$, this virtual feature triangle is added to $G_{1,0}$, otherwise, it is added to $G_{1,1}$.

For a closeness feature, the closeness of a facial feature can be defined by a first feature curve and a second feature curve being overlapped. The corresponding loss term can be defined based on a mapping distance between the first feature curve and the second feature curve so that the mapping distance is minimized (thus keeping the facial feature closed as much as possible). For example, a feature curve closing constraint can be added to the face region related constraints $C_F$. Loss term $E_{10}$ can be added to the loss function in Eq. (X13). $E_{10}$ can be defined as:

$$E_{10}(\hat{A}) = \sum_{(i,j)\in\{(0,1),(2,3),(4,5)\}} \left( \sum_{(a,b,c,d,e)\in N(L_{c,i}(H),L_{c,j}(H))} \|b \cdot V_c(\hat{A}) + \right. \tag{X30}$$
$$\left. d \cdot V_e(\hat{A}) - V_a(\hat{A})\| \right) \delta(L_{c,i}(\tilde{S}), L_{c,j}(\tilde{S}))$$

where $N(L_{c,i}(A), L_{c,j}(A))$ is the curve mapping, and $\delta(L_{c,i}(\tilde{S}), L_{c,j}(\tilde{S}))$ is a binary function indicating whether the curve $L_{c,i}(\tilde{S})$ overlaps with the curve $L_{c,j}(\tilde{S})$. $E_{10}$ adds constraints based on three curve pairs $L_{c,i}$, $L_{c,j}$ in FIG. 11 with $(i,j) \in \{ (0,1), (2,3), (4,5) \}$. Each curve pair controls the closing of a face feature: $L_{c,0}$, $L_{c,1}$ for the right eye closing; $L_{c,2}$, $L_{c,3}$ for the left eye closing; and $L_{c,4}$, $L_{c,5}$ for the mouth closing. Each closing constraint Eq. (X30) will be activated if and only if the corresponding feature is close on the source deformation, i.e., $\delta(L_{c,i}(\tilde{S}), L_{c,j}(\tilde{S}))=1$. Additional details about Eq. (X30) are provided later.

In addition to facial features, there are other features of the virtual character that need to be preserved, such as the symmetry of the vertices. For example, a constraint (constraint #13) can be added to the face region related constraints $C_F$ and another constraint (constraint #17) can be added to the non-face region related constraints $C_{NF}$ to enforce the symmetry of the vertices along the horizontal axis. Corresponding loss terms $E_{13}$ and $E_{17}$ can be added to the loss function in Eq. (X13) and Eq. (X14), respectively. $E_{13}$ and $E_{17}$ can be defined as:

$$E_{13}(\hat{A}) = \rho_s(S_0, \tilde{S}) \cdot \left( \sum_{\substack{(i,j)\in M_s(A_0) \\ i,j\in K_{\Delta,v}-L_v^{fix}(A)\cup\rho_v(A,S_0,\tilde{S})}} \left( \|E_x \cdot V_i(\hat{A}) - V_j(\hat{A})\|^2 \right) \right) \tag{X31}$$

$$E_{17}(\tilde{A}) = \rho_s(S_0, \tilde{S}) \cdot \left( \sum_{\substack{(i,j)\in M_s(A_0) \\ i,j\in \overline{K}_{\Delta,v}-L_v^{fix}(A)\cup\rho_v(A,S_0,\tilde{S})}} \left( \|E_x \cdot V_i(\tilde{A}) - V_j(\tilde{A})\|^2 \right) \right) \tag{X32}$$

Here, $\rho_s(S_0, \tilde{S})$ is a binary function used to check whether $\tilde{S}$ keeps the symmetric vertex pairs from $S_0$. $\rho_s(S_0, \tilde{S})$ is 1 if the symmetric vertex pairs are kept, and is 0 otherwise. $Ms(A_0)$ includes all symmetric pair of vertices from $A_0$. $E_x$ is a $3\times3$ symmetric matrix.

$$L_v^{fix}(A) \cup \rho_v(A, S_0, \tilde{S})$$

is the set of fixed vertices which include manually labelled vertices $$L_v^{fix}(A)$$

and fixed vertices identified from the deformation $\rho_v(A, S_0, \tilde{S})$. $K_{\alpha,f}$ includes indices of triangles in the face region and $\overline{K}_{\alpha,f}$ includes indices of triangles in the non-face region. In some implementations, symmetric constraints are not applied for the expressions that do not preserve the vertex symmetry, such as raising left eyebrow, blinking right eye. Symmetric constraints can be applied for expressions that preserve the vertex symmetry, such as the jaw opening.

Figure 14:
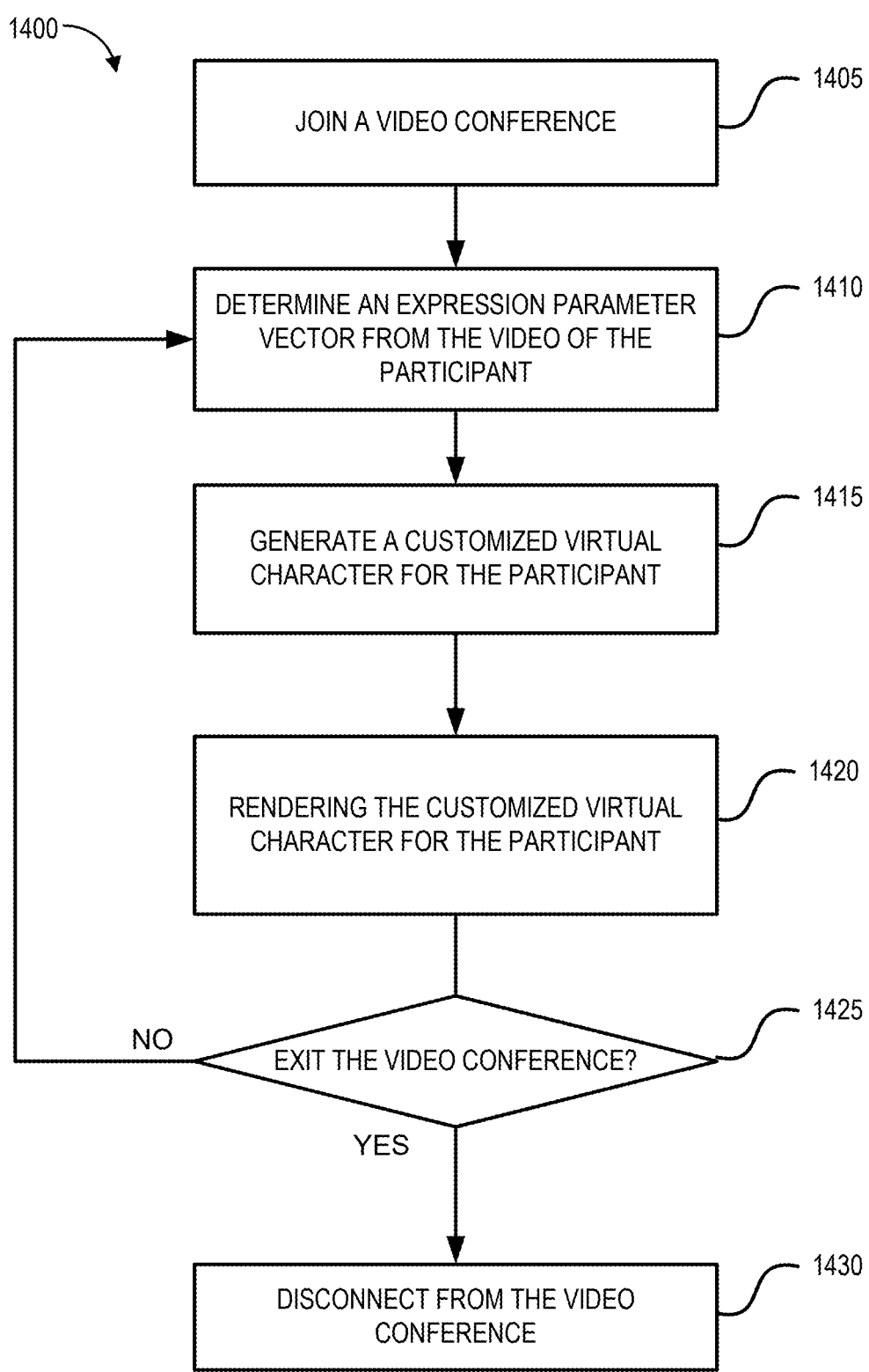
FIG. 14 shows a flowchart of an example process for generating a virtual character for a participant of a video conference, according to certain aspects of the present disclosure.

Referring now to FIG. 14, FIG. 14 shows a flowchart of an example process 1400 for generating a virtual character for a participant of a video conference, according to certain aspects of the present disclosure. The client device 450 can be configured to implement operations depicted in FIG. 14 by executing suitable program code (e.g., the meeting client application 404). The software or program code may be stored on a non-transitory storage medium (e.g., on a memory device). The process depicted in FIG. 14 and described below is intended to be illustrative and non-limiting. Although FIG. 14 depicts the various processing blocks occurring in a particular sequence or order, this is not intended to be limiting. In certain alternative embodiments, the blocks may be performed in some different order, or some blocks may also be performed in parallel. For illustrative purposes, the process 1400 is described with reference to certain examples depicted in the figures. Other implementations, however, are possible.

At block 1405, the process 1400 involves joining a video conference for a participant of the video conference. For example, the client device 450 associated with the participant can launch the meeting client application 404 to provide the functionality of the video conference as discussed above, including for example presenting a user interface to present a video of the participant. The participant may choose to use a virtual character to replace his/her face in the video. To do so, the meeting client application 404 may present a user interface allowing the participant to choose a virtual character face model from a set of available virtual character face models. The meeting client application 404 receives a user selection from the user interface and determines the selected virtual character face model as the virtual character face model 532. The meeting client application 404 may further identify the virtual character neutral face 554 and the virtual character expressions 556 for this participant that correspond to the selected virtual character face model. As discussed above, each of virtual character expressions 556 is customized for the participant and describes a facial expression of the virtual character customized for the participant. The virtual character expressions for the participant can be generated by combining a set of virtual character expression bases based on a facial feature vector of the participant extracted from an image of the participant. The virtual character neutral face 554 describes a neutral face of the virtual character customized for the participant. The virtual character neutral face model can be generated by combining a set of virtual character face bases according to the facial feature vector of the participant. The virtual character face bases are generated by applying a deformation transfer to the virtual character face model, a human base face, and a set of human face bases. The virtual character neutral face 554 and the virtual character expressions 556 can be generated offline before the video conference starts.

At block 1410, the process 1400 involves determining an expression parameter vector (such as the expression parameter vector $\beta$ 558) from the video of the participant. As discussed above with respect to FIG. 5, the expression parameter vector can be detected by determining the facial expression of the participant from the video of the participant. At block 1415, the process 1400 involves generating a customized virtual character for the participant. As discussed in detail above, the client device 450 can apply the expression parameter vector to the set of virtual character expressions 556 customized for the participant and further incorporate the virtual character neutral face 554 customized for the participant to generate the customized virtual character for the participant. The customized virtual character for the participant will have similar facial features as the participant and reflect the facial expressions of the participant in real time or near real time. At block 1420, the process 1400 involves rendering the customized virtual character for the participant to get a video sequence which is sent to other participants of the video conference in replace of the video of the participant captured by the camera of the client device 450.

At block 1425, the process 1400 involves determining whether the client device 450 should exit the video conference, such as the participant decides to leave the video conference, or the host of the video conference has ended the meeting. If not, the process 1400 continues to generate the customized virtual character for the participant by performing operations in blocks 1410-1420 as discussed above. If it is determined that the client device 450 should exit the meeting, the process 1400 involves disconnecting, at block 1430, from the video conference.

Referring now to FIG. 15, FIG. 15 shows a flowchart of an example process 1500 for generating a virtual character using virtual triangles, according to certain aspects of the present disclosure. The virtual character base model generation system 412 or another computing device can be configured to implement operations depicted in FIG. 15 by executing suitable program code. The software or program code may be stored on a non-transitory storage medium (e.g., on a memory device). The process depicted in FIG. 15 and described below is intended to be illustrative and non-limiting. Although FIG. 15 depicts the various processing blocks occurring in a particular sequence or order, this is not intended to be limiting. In certain alternative embodiments, the blocks may be performed in some different order, or some blocks may also be performed in parallel. For illustrative purposes, the process 1500 is described with reference to certain examples depicted in the figures. Other implementations, however, are possible.

At block 1505, the process 1500 involves accessing a source human face model, a target human face model, and a source virtual character model. The source virtual character model can include a face region and a non-face region. The non-face region can include, for example, an interior mouth region, an interior eye region, or an accessory of the virtual character. At block 1510, which includes blocks 1515-1525, the process 1500 involves deforming the source virtual character model based on the source human face model and the target human face model to generate a target virtual character model.

At block 1515, the process 1500 involves generating virtual triangles connecting the face region and the non-face region of the source virtual character model. For example, the virtual character base model generation system 412 can determine a threshold distance value for a surface in the face region and a surface in the non-face region and determine a vertex-triangle distance between each vertex of the surface in the face region and each triangle of the surface in the non-face region. As discussed above and will be discussed below in more detail, the threshold distance value can be determined based on a minimum distance and a maximum distance between the surface in the face region and the surface in the non-face region. The virtual character base model generation system 412 can generate virtual triangles connecting the surface in the face region and the surface in the non-face region, if at least one of the vertex-triangle distances is below the threshold distance value. The generated virtual triangles can include virtual triangles formed by a vertex of the surface in the face region and an edge of a triangle of the surface in the non-face region if the vertex-triangle distance between the vertex and the triangle is below the threshold distance value. In some examples, prior to generating the virtual triangles connecting the face region and the non-face region, the virtual character base model generation system 412 may create a gap on the source virtual character model between the face region and the non-face region. This can help to prevent degenerated virtual triangles to be generated.

At block 1520, the process 1500 involves deforming the source virtual character model with minimized deformation to the one or more virtual triangles to generate the target virtual character model. For example, the virtual character base model generation system 412 can first deform the face region by fixing the non-face region and removing the virtual triangles from the source virtual character model. Based on the deformed source virtual character model, the virtual character base model generation system 412 can add the virtual triangles back to the mode and deform the non-face region by fixing the deformed face region. The deformation can be performed by imposing a constraint to minimize the deformation to the virtual triangles. In this way, the non-face region can be deformed by propagating the deformation gradients from the face region to the non-face region through the virtual triangles.

After the deformation, the virtual triangles can be removed from the deformed model at block 1525. As discussed above and will be discussed in more detail below, additional constraints or processing may be applied before, during, or after the deformation to generate the target virtual character. At block 1530, the virtual character base model generation system 412 can render the generated target virtual character into images, videos, and so on. In some examples, the target virtual character may be used to generate the virtual character bases and the virtual expression bases which are further used to generate customized virtual character for a participant of a video conference.

Referring now to FIG. 16, FIG. 16 shows a flowchart of an example process 1600 for generating a virtual character with facial feature preservation, according to certain aspects of the present disclosure. The virtual character base model generation system 412 or another computing device can be configured to implement operations depicted in FIG. 16 by executing suitable program code. The software or program code may be stored on a non-transitory storage medium (e.g., on a memory device). The process depicted in FIG. 16 and described below is intended to be illustrative and non-limiting. Although FIG. 16 depicts the various processing blocks occurring in a particular sequence or order, this is not intended to be limiting. In certain alternative embodiments, the blocks may be performed in some different order, or some blocks may also be performed in parallel. For illustrative purposes, the process 1600 is described with reference to certain examples depicted in the figures. Other implementations, however, are possible.

At block 1605, the process 1600 involves accessing a source human face model, a target human face model, and a source virtual character face model as well as feature curves. In some examples, the feature curves are marked on the source face model and the source virtual character face model. One feature curve on the source face model has a corresponding feature curve on the source virtual character face model. Each feature curve is used to define one or more features of the source virtual character face model and can be used to preserve the one or more features during the deformation. For example, the features can include a local curve feature defined by a feature curve. The local curve feature can be a mouth curve feature or an eye curve feature. In another example, the features can include a closeness feature defined by two feature curves. For example, if the closeness feature is for the mouth, the two feature curves can include a feature curve defined over the upper lip of the mouth and another feature curve defined over the lower lip of the mouth. Likewise, if the closeness feature is for an eye, the two feature curves can include a feature curve defined over the upper lid of the eye and another feature curve defined over the lower lid of the eye. In some examples, the feature curves are defined based on landmark points on the source human face model and the corresponding landmark points on the source virtual character face model.

At block 1610, which includes blocks 1615 and 1620, the process 1600 involves deforming the source virtual character model based on the source human face model and the target human face model to generate a target virtual character model. At block 1615, the process 1600 involves determining a loss function based on the feature curves to preserve features of the source virtual character face model on the target virtual character face model. For example, if the features include the local curve feature defined by a feature curve, the virtual character base model generation system 412 can generate a set of virtual feature triangles based on vertices of the feature curve, such as by connecting three adjacent vertices to form a virtual feature triangle A term defined based on the set of virtual feature triangles can be included in the loss function. For instance, the term can include differences between deformation gradients of the set of virtual feature triangles and an identity deformation gradient so that the deformation gradients of the set of virtual feature triangles can be enforced to be closed to identity deformation (i.e., no deformation) as much as possible thereby preserving the local curve feature. If the feature to be preserved is a closeness feature, a term defined based on a mapping distance between the two feature curves defining the closeness can be added to the loss function as described above and will be discussed in more detail later. In a further example, the feature may be a symmetric feature and the loss function can include a term defined based on pairs of vertices in the source virtual character face model.

At block 1620, the process 1600 involves deforming the source virtual character model by minimizing the loss function. As discussed above and will be discussed in more detail below, additional constraints or processing may be applied before, during, or after the deformation to generate the target virtual character. At block 1630, the virtual character base model generation system 412 can render the generated target virtual character into images, videos, and so on. In some examples, the target virtual character may be used to generate the virtual character bases and the virtual expression bases which are further used to generate customized virtual character for a participant of a video conference.

Referring now to FIG. 17, FIG. 17 shows a flowchart of an example process 1700 for generating a virtual character with feature enhancement, according to certain aspects of the present disclosure. The virtual character base model generation system 412 or another computing device can be configured to implement operations depicted in FIG. 17 by executing suitable program code. The software or program code may be stored on a non-transitory storage medium (e.g., on a memory device). The process depicted in FIG. 17 and described below is intended to be illustrative and non-limiting. Although FIG. 17 depicts the various processing blocks occurring in a particular sequence or order, this is not intended to be limiting. In certain alternative embodiments, the blocks may be performed in some different order, or some blocks may also be performed in parallel. For illustrative purposes, the process 1700 is described with reference to certain examples depicted in the figures. Other implementations, however, are possible.

At block 1705, the process 1700 involve accessing a source human face model, a target human face model, and a source virtual character face model. At block 1710, the process 1700 involves accessing a virtual feature triangle marked on the source human face model and a corresponding virtual feature triangle marked on the source virtual character face model. The virtual feature triangle on the source human face model can be generated by connecting a set of three landmark points on the source human face model. Likewise, the virtual feature triangle on the source virtual character face model can be generated by connecting a set of three landmark points on the source virtual character face model that correspond to the set of three landmark points on the source human face model.

At block 1715, which includes blocks 1720 and 1725, the process 1700 involves deforming the source virtual character model based on the source human face model and the target human face model to generate a target virtual character face model. At block 1720, the process 1700 involves determining a loss function based on the virtual feature triangles to enhance certain features of the target virtual character face model. As discussed above and will be discussed in more detail later, if the feature to be enhanced is the size of the eye and the enhancement is to increase the size of the eye on the target virtual character face model, a term defined based on a set of virtual feature triangles on the source virtual character face model and a corresponding set of virtual feature triangles on the target virtual character face model can be included in the loss function. The term can include, for each pair of corresponding virtual feature triangles, a difference, or a function thereof, between the deformation gradient of the virtual feature triangle on the target virtual character face model and a scaled-up deformation gradient of the corresponding virtual feature triangle on the source virtual character face model. In this way, the deformation gradients of the set of virtual feature triangles on the target model can be enforced to be close to a scaled-up deformation of the source model as much as possible thereby enhancing the size of the eye. Similar terms can be introduced to the loss function for other features to be enhanced, such as the other eye, the nose, the mouth, etc.

At block 1725, the process 1700 involves deforming the source virtual character face model by minimizing the loss function. As discussed above and will be discussed in more detail below, additional constraints or processing may be applied before, during, or after the deformation to generate the target virtual character. At block 1730, the virtual character base model generation system 412 can render the generated target virtual character into images, videos, and so on. In some examples, the target virtual character may be used to generate the virtual character bases and the virtual expression bases which are further used to generate customized virtual character for a participant of a video conference.

Referring now to FIG. 18, FIG. 18 shows a flowchart of an example process 1800 for generating a virtual character via a two-stage process, according to certain aspects of the present disclosure. The virtual character base model generation system 412 or another computing device can be configured to implement operations depicted in FIG. 18 by executing suitable program code. The software or program code may be stored on a non-transitory storage medium (e.g., on a memory device). The process depicted in FIG. 18 and described below is intended to be illustrative and non-limiting. Although FIG. 18 depicts the various processing blocks occurring in a particular sequence or order, this is not intended to be limiting. In certain alternative embodiments, the blocks may be performed in some different order, or some blocks may also be performed in parallel. For illustrative purposes, the process 1800 is described with reference to certain examples depicted in the figures. Other implementations, however, are possible.

At block 1805, the process 1800 involve accessing a source human face model, a target human face model, and a source virtual character face model. At block 1810, which includes blocks 1815 and 1820, the process 1800 involves deforming the source virtual character model based on the source human face model and the target human face model to generate a target virtual character face model.

At block 1815, the process 1800 involves deforming the face region of the source virtual character face model by fixing the non-face region. As discussed above, a virtual character face model can include a face region, which has corresponding surfaces on the human face model, and a non-face region which does not have corresponding surfaces on the human face model. As such, the deformation at block 1815 can be performed for the face region of the virtual character face model according to the deformation from the source human face model to the target human face model. To do so, constraints or terms in the loss function that involve the non-face region can be disabled or removed from the loss function before minimizing the loss function to perform the deformation, such as Eqs. (17), (18), (20), (21), (26), and (32) as discussed above or will be discussed later in more detail.

At block 1820, the process 1800 involves deforming the non-face region of the source virtual character face model by fixing the face region. For example, constraints or terms in the loss function that do not involve the non-face region can be disabled or removed from the loss function before minimizing the loss function to perform the deformation, such as Eqs. (24), (25), (30), and (31) as discussed above or will be discussed later in more detail. At block 1830, the virtual character base model generation system 412 can render the generated target virtual character into images, videos, and so on. In some examples, the target virtual character may be used to generate the virtual character bases and the virtual expression bases which are further used to generate customized virtual character for a participant of a video conference.

While in the above examples, the deformation transfer is applied to the virtual character face model $A_0$, the same process can be applied to other types of virtual characters. For example, the system may allow a user to choose accessories, such as hair, beard, eye glasses, hat, and so on. The accessories can be attached to the virtual character face model to form a composite virtual character model H. This composite model can be deformed in a similar way as the virtual character face model $A_0$ (e.g., by treating the accessories as components of the virtual character face model and by building the virtual triangles) so that the accessories fit the deformed virtual character face.

An Example of Virtual Character Face Model Generation

In the following, a detailed example of generating a virtual character face model or a customized virtual character face model is described.

1 Introduction

This example describes details of a system for generating a virtual character face model and a customized virtual character face model. The virtual character is represented as a 3DMM model, which includes a base surface, face bases (PCAs), and expressions. The system uses a deformation transfer algorithm to transfer face bases (PCAs) and expressions from an existing human 3DMM model to the virtual character.

2 Preliminaries 2.1 Notations

Denote

|·|: the number of elements of a set or a vector.

$I_3$: the 3×3 identity matrix $$I_3 = \begin{pmatrix} 1 & 0 & 0 \\ 0 & 1 & 0 \\ 0 & 0 & 1 \end{pmatrix}. \tag{1}$$

$E_x$: the 3×3 symmetric matrix $$E_x = \begin{pmatrix} -1 & 0 & 0 \\ 0 & 1 & 0 \\ 0 & 0 & 1 \end{pmatrix}. \tag{2}$$

Given a 3D triangulated model H, its elements are denoted as

A vertex: a vector with 3 values as its coordinates

A triangle: a vector with 3 vertices' indices

A curve: a vector of vertices' indices, where i-th and (i+1)-th vertices is an edge of a triangle V(H): all vertices
$V_i(H) \in V(H)$: the i-th vertex
|V(H)|: number of vertices F(H): all triangles
$F_i(H) \in F(H)$: the i-th triangle
|F(H)|: number of triangles $\Theta_{v,i}(H)$: all adjacent triangles of the i-th vertex $V_i(H)$ $\Theta_{f,i}(H)$: all adjacent triangles of the i-th triangle $F_i(H)$ L(H): manually labelled data (detailed in section 4.2.1)
Lv(H)∈L (H): feature vertices
$L_{v,i}(H) \in L_v(H)$: the i-th feature vertex
Lc(H)∈L(H): feature curves
$L_{c,i}(H) \in L_c(H)$: the i-th feature curve
$L_v(H) \in L(H)$: feature regions
$L_{r,i}(H) \in L_r(H)$: the i-th feature region W(H): automatically extracted components, where a component is a 3D mesh consisting of one simply connected region (detailed in section 4.1.4).
$W_i(H) \in L(H)$: the i-th component
$W_1(H) \in L$ (H): the main component, which is the component including the face region. It may not contain facial features, such as the nose which may be a separated component. It may contain interior mouth and eye regions.

Δ(H): the face region, which is a region including facial features such as noses and lips and excluding interior regions such as interior mouth and eye regions (detailed in section 4.2.2).

G(H): virtual triangles

K(H): sets of vertices or triangles

M(H)={(i,j)}: symmetric pairs of vertices. For (i,j)∈Ms (H), $E_x V_i(H)=v_j(H)$. For (i, i)∈ $M_s$(H), the x-coordinate of $V_i(H)$ is zero (detailed in section 4.1.10)

Mg (H): manual defined virtual triangles based on feature vertices $L_v$(H),
$(i_l, j_l, k_l, \eta_{l,x}, \eta_{l,y}, \eta_{l,z}) \in$ Mg (H): the 1-th virtual triangle where the deformation gradient for the triangle $(L_{v,i_l},$ $L_{v,j_l}$, $L_{v,k_l}$) will be scaled by $\eta_{l,x}$, $\eta_{l,y}$, $\eta_{l,z}$ along x-,y-,z-axis (detailed in section 4.1.6).

Denote the following elements between two models as $T_j(H, \tilde{H})$: the deformation gradient for the i-th triangle $v_j(H)$ from the model H to its deformed model H (detailed in section 1).

$M_c(H_1, H_2)$: the triangle correspondence between the model $H_1$ and the model $H_2$ (detailed in section 2.5.2).

$|M_c(H_1, H_2)|$: number of triangle correspondences in $M_c(H_1, H_2)$.

$\rho_f(H, \tilde{H})$: the triangles that are fixed when deforming the model H to its deformed model $\tilde{H}$, i.e., $v_j(\tilde{H})=v_j(H)$ for $i \in \rho_f(H, \tilde{H})$, $j \in F_1(H)$:

Given the source model S, its deformation $\tilde{S}$, and the target model A, a deformation transfer $\mathcal{F}(A, S, \tilde{S})$ generates a deformed model $\tilde{A}$ for the model A as (detailed in section 2.5.3 and section 4.2.3)

$$\tilde{A} = \mathcal{F}(A, S, \tilde{S}) \qquad (3)$$

Given the source model S, its deformation $\tilde{S}$, the target model A, and the triangle correspondence $M_c(S, A)$, the fixed vertices on A is defined as (implemented in section 4.1.8)

$$\rho_v(A, S, \tilde{S}) \qquad (4)$$

Given the source model S, its deformation $\tilde{S}$, the symmetric switch for $\tilde{S}$ indicates whether $\tilde{S}$ remains symmetric vertex pairs from S as (implemented in section 4.1.10)

$$\rho_s(S, \tilde{S}) \qquad (5)$$

Given a deformation gradient $T_i$, the enhancement of its scaling along i-th axis by $s_i$ is deformed as (implemented in section 4.1.6)

$$E_{(s_1, s_2, s_3)}(T_i) \qquad (6)$$

Given 3D vertices, $p_0$, $p_1$, $p_2$, $p_3$, the following functions can be defined $$N_1(p_0, p_1, p_2) = p_0 + \frac{(p_2 - p_0) \times (p_1 - p_0)}{\sqrt{\|(p_2 - p_0) \times (p_1 - p_0)\|}} \qquad (7)$$

$$N_2(p_0, p_1, p_2, p_3) = ([p_1 - p_0, p_2 - p_0, p_3 - p_0]^{-1})^T \begin{pmatrix} -1 & 1 & 0 & 0 \\ -1 & 0 & 1 & 0 \\ -1 & 0 & 0 & 1 \end{pmatrix} \qquad (8)$$

Given two curves $L_1$ and $L_2$, curve mapping and curve overlapping are denoted as (detailed in section 4.1.7)

$$N(L_1, L_2), \delta(L_1, L_2) \qquad (9)$$

Given virtual character data $A_0$, $\{H^{i,j}\}$, virtual character data pre-processing is denoted as (detailed in section 4.2.2)

$$H = \Omega_1(A_0, \{H^{i,j}\}) \qquad (10)$$

A rigid transformation is used to transfer H to the same space as $S_0$ $$\Gamma = \Gamma(H, S_0) \qquad (11)$$

Given a deformed model H of the pre-processed model H, virtual character data post-processing is denoted as (detailed in section 4.2.2)

$$\tilde{A}_0, \{\tilde{H}^{i,j}\} = \Omega_2(\tilde{H}) \qquad (12)$$

2.2 Barycentric Coordinates

Given a triangle $\Gamma$ with three vertices ($v_0$, $v_1$, $v_2$), any vertex q on this triangle can be represented as $$q = \sum_{i=0}^{2} r_i v_i \qquad (13)$$

where $r_0$, $r_1$, $r_2$ is the barycentric coordinates of q on F, with $r_0+r_1+r_2=1$, $r_i \geq 0$.

2.3 Curve Parameterization

On a mesh H with vertices V=V(H), a curve L consists of a set of indices as $$L = [\, v_1 \quad v_2 \quad \dots \quad v_i \quad \dots \quad v_n \,] \qquad (14)$$

where $v_i$ is the index of the vertex on the mesh, n=|L|, and $V_{v_i} V_{v_{i+1}}$ is an edge of the mesh. The curve can be parameterized as $$L(t) = [\, t_1 \quad t_2 \quad \dots \quad t_i \quad \dots \quad t_n \,] = \qquad (15)$$

$$\begin{cases} V_{v_i} & t = t_i \\ \frac{t_{i+1} - t}{t_{i+1} - t_i} V_{v_i} + \frac{t - t_i}{t_{i+1} - t_i} V_{v_{i+1}} & t \in [t_i, t_{i+1}] \end{cases}$$

where each vertex $V_{v_i}$ is parameterized as $L(t_i)=V_{v_i}$ with $$t_i = \begin{cases} 0 & i = 1 \\ \frac{\sum_{j=1}^{i-1} \|V_{v_j} V_{v_{j+1}}\|}{\sum_{j=1}^{n-1} \|V_{v_j} V_{v_{j+1}}\|} & 1 < i < n \\ 1 & i = n \end{cases} \qquad (16)$$

2.4 3DMM Models

A neural network, such as a FaceTrackNet described in in U.S. Patent Application Publication 2023/0260184A1, the entirety of which is incorporated herein by reference, derives the 3DMM parameters ($\alpha$, $\beta$, R, T, s) from an input human facial image. 3DMM parameters include a pose vector (R, T, s), a facial feature vector $\alpha$, and an expression vector $\beta$.

41

Given a facial feature vector $\alpha$ and expression l, the human facial model in 3DMM form is $$S = S_0 + S_{id} \cdot \alpha + S_{exp} \cdot \beta \qquad (17)$$

where $S_0$ is the base surface, $S_{id}$ is the PCA shape basis, and $S_{exp}$ is the expression basis. A pose, denoted as (R, T, s)=(R, $t_x$, $t_y$, s), is defined as R: rotation $t_x$, $t_y$: translation, with $T=(t_x, t_y, 0)^T$ s: scaling Given a viewport of height h and width w, the projection matrix corresponding to the pose (R, T, s) is $$\Phi = \begin{bmatrix} \frac{w}{2} & 0 & 0 & \frac{w}{2} \\ 0 & -\frac{h}{2} & 0 & \frac{h}{2} \\ 0 & 0 & 1 & 0 \\ 0 & 0 & 0 & 1 \end{bmatrix} \begin{bmatrix} \frac{2s}{w} & 0 & 0 & -1 \\ 0 & \frac{2s}{h} & 0 & -1 \\ 0 & 0 & -1 & 0 \\ 0 & 0 & 0 & 1 \end{bmatrix} \begin{bmatrix} R & T \\ 0 & 1 \end{bmatrix} = \qquad (18)$$

$$\begin{bmatrix} s & 0 & 0 & 0 \\ 0 & -s & 0 & h \\ 0 & 0 & -1 & 0 \\ 0 & 0 & 0 & 1 \end{bmatrix} \begin{bmatrix} R & T \\ 0 & 1 \end{bmatrix}$$

The projection matrix projects a 3D point, P, into the 3D viewport as $$\begin{bmatrix} s(R_0 P + t_x) \\ h - s(R_1 P + t_y) \\ -R_2 P \end{bmatrix} \qquad (19)$$

Given a pose (R, T, s), the SOP (scaled orthographic projection), $\Pi$, projects a 3D point, P, into a 2D point linearly as $$\prod(P) = \prod_{R,T,s}(P) = \begin{bmatrix} s & 0 & 0 \\ 0 & -s & 0 & h \end{bmatrix} \begin{bmatrix} R & T \\ 0 & 1 \end{bmatrix} \begin{bmatrix} P \\ 1 \end{bmatrix} \qquad (20)$$

$$= \begin{bmatrix} sR_0 & st_x \\ -sR_1 & h - st_y \end{bmatrix} \begin{bmatrix} P \\ 1 \end{bmatrix}$$

$$= \begin{bmatrix} s(R_0 P + t_x) \\ h - s(R_1 P + t_y) \end{bmatrix}$$

2.5 Deformation Transfer Algorithm 2.5.1. Deformation Gradient

Given a 3D triangulated model H and its deformed model H, the i-th vertex of each model is $$v_i = V_i(H), \tilde{v}_i = V_i(\tilde{H}).$$

For the i-th triangle of each model, $$F_i(H) = F_i(\tilde{H}) = (i_0, i_1, i_2),$$

42 add the fourth vertex as $$v_{i_3} = N_1(v_{i_0}, v_{i_1}, v_{i_2}), \tilde{v}_{i_3} = N_1(\tilde{v}_{i_0}, \tilde{v}_{i_1}, \tilde{v}_{i_2})$$

where $N_1$ is defined in Eq.(7). The deformation gradient for the i-th triangle $F_i$ from H to $\tilde{H}$ is $$T_i(H, \tilde{H}) = T_{(i_0, i_1, i_2)}(H, \tilde{H}) = \qquad (21)$$

$$[\tilde{v}_{i_1} - \tilde{v}_{i_0}, \tilde{v}_{i_2} - \tilde{v}_{i_0}, \tilde{v}_{i_3} - \tilde{v}_{i_0}] \cdot [v_{i_1} - v_{i_0}, v_{i_2} - v_{i_0}, v_{i_3} - v_{i_0}]^{-1},$$

which can be rewritten in matrix form as $$(T_i(H, \tilde{H}))^T =$$

$$([v_{i_1} - v_{i_0}, v_{i_2} - v_{i_0}, v_{i_3} - v_{i_0}]^{-1})^T \cdot [\tilde{v}_{i_1} - \tilde{v}_{i_0}, \tilde{v}_{i_2} - \tilde{v}_{i_0}, \tilde{v}_{i_3} - \tilde{v}_{i_0}]^T =$$

$$([v_{i_1} - v_{i_0}, v_{i_2} - v_{i_0}, v_{i_3} - v_{i_0}]^{-1})^T \cdot \begin{pmatrix} \tilde{v}_{i_1}^T - \tilde{v}_{i_0}^T \\ \tilde{v}_{i_2}^T - \tilde{v}_{i_0}^T \\ \tilde{v}_{i_3}^T - \tilde{v}_{i_0}^T \end{pmatrix} =$$

$$([v_{i_1} - v_{i_0}, v_{i_2} - v_{i_0}, v_{i_3} - v_{i_0}]^{-1})^T \begin{pmatrix} -1 & 1 & 0 & 0 \\ -1 & 0 & 1 & 0 \\ -1 & 0 & 0 & 1 \end{pmatrix} \begin{pmatrix} \tilde{v}_{i_0}^T \\ \tilde{v}_{i_1}^T \\ \tilde{v}_{i_2}^T \\ \tilde{v}_{i_3}^T \end{pmatrix} =$$

$$N_2(v_{i_0}, v_{i_1}, v_{i_2}, v_{i_3}) \begin{pmatrix} \tilde{v}_{i_0}^T \\ \tilde{v}_{i_1}^T \\ \tilde{v}_{i_2}^T \\ \tilde{v}_{i_3}^T \end{pmatrix}$$

where 2 is defined in q.

2.5.2. Triangle Correspondence Using Non-Rigid Registration

Given source model S and target model A, non-rigid registration is to deform S into $\tilde{S}$, such that all vertices $V(\tilde{S})$ are close to the model A. The non-rigid registration is achieved via solving the following optimization problem $$\min_{V(\tilde{S})} E(\tilde{S}) = E(V(\tilde{S})) = \lambda_0 E_0 + \lambda_1 E_1 + \lambda_2 E_2 \qquad (22)$$

$$\text{s.t. } V_k(\tilde{S}) = m_k, k \in K.$$

where

K is a set of markers on the target model A $\lambda_0, \lambda_1, \lambda_2$ are hyper parameters $E_0$ is the smoothness term defined as $$E_0(\tilde{S}) = \sum_{i=1}^{|F(S)|} \sum_{j \in \Theta_{f,i}(S)} \|T_i(S, \tilde{S}) - T_j(S, \tilde{S})\|^2 \qquad (23)$$

where $\Theta_{f,i}(S)$ is the set of adjacent triangles to the i-th triangle.

$E_1$ is the registration identity term defined as $$E_1(\tilde{S}) = \sum_{i=1}^{|F(S)|} \left\| T_i(S, \tilde{S}) - I_3 \right\|^2. \tag{24}$$

$E_2$ is the closest valid point term defined as $$E_2(\tilde{S}) = \sum_{i=1}^{|V(S)|} \left\| V_i(\tilde{S}) - c_i \right\|^2 \tag{25}$$

where $c_i$ is the closest valid point for $V_i(\tilde{S})$ on A.

After non-rigid registration, the triangle correspondence between S and A can be set up by comparing the centroids of $F(\tilde{S})$ and $F(A)$. A triangle pair (i,j) is selected if the centroid of the i-th triangle $F_i(\tilde{S})$ and the centroid of the j-th triangle $F_j(A)$ are close enough (such as closer than a pre-determined threshold) and the angle between their normals is less than 90°. The triangle correspondence between S and A can be denoted as $$M_c(S, A) = \left\{ (i_1, j_1), (i_2, j_2), \dots, \left(i_{|M_c(S,A)|}, j_{|M_c(S,A)|}\right) \right\} \tag{26}$$

2.5.3. Deformation Transfer

Given the source model S, its deformation $\tilde{S}$, the target model A, and the triangle correspondence M(S, A), deformation transfer $\tilde{A} = \mathcal{F}(A, S, \tilde{S})$ in Eq.(3) is to deform A into $\tilde{A}$ using the deformation gradient from S to $\tilde{S}$. The deformation from A to $\tilde{A}$ contains an affine transformation for each triangle as $$\{(T_j, d_j)\}_{j=1,2,\dots,|F(A)|} \tag{27}$$

where $T_j$ is a 3×3 matrix and $d_j$ is a translation satisfying $$F_j(\tilde{A}) = T_j \cdot F_j(A) + d_j \tag{28}$$

Assume $\Theta_{v,i}(A)$ is the set of adjacent triangles to the i-th vertex $V_i(A)$. The affine transformation for these triangles should transform the vertex $V_i(A)$ to the same location, i.e.

$$T_j \cdot V_i(A) + d_j = T_k \cdot V_i(A) + d_j, \forall j, k \in \Theta_{v,i}(A). \tag{29}$$

For each triangle pair $(i, j) \in M_c(S, A)$, the j-th triangle of A should deform using the deformation gradient of the i-th triangle of S, i.e.

$$T_j(A, \tilde{A}) = T_i(S, \tilde{S}) \tag{30}$$

As such, the deformation transfer is achieved via optimizing the following problem $$\min_{V(\tilde{A})} E(\tilde{A}) = E(V(\tilde{A})) = \lambda_3 E_3 + \lambda_4 E_4 \tag{31}$$

$$\text{s.t. } T_j(A, \tilde{A}) V_i(A) + d_j = T_k(A, \tilde{A}) V_i(A) + d_j, \forall i, \forall j, k \in \Theta_{v,i}(A).$$

where $\lambda_3$, $\lambda_4$ are hyper parameters $E_3$ is the correspondence term defined by Eq.(30) as $$E_3(\tilde{A}) = \sum_{(i,j) \in M_c(S,A)} \left\| T_i(S, \tilde{S}) - T_j(A, \tilde{A}) \right\|^2 \tag{32}$$

where $M_c(S, A)$ is the triangle correspondence between S and A defined in Eq.(26).

$E_4$ is the deformation identity term defined as $$E_4(\tilde{A}) = \sum_{(i,j) \in \overline{M_c}(S,A)} \left\| T_j(A, \tilde{A}) - I_3 \right\|^2 \tag{33}$$

where $I_3$ is defined in Eq.(X19) and $\overline{M_c}(S,A) = \{1, 2, \dots, |F(A)|\} - \{j | (i, j) \in M_c(S,A)\}$ is the set of triangles on A without any correspondence from the source model S.

$\Theta_{v,i}(A)$ is the set of adjacent triangles to the i-th vertex $V_i(A)$

3 Virtual Character Customization

An overview for the virtual character customization framework is shown in FIG. 5. This section will introduce how a virtual character is customized based on user's input based on virtual character data form deformation transfer.

3.1 Virtual Character Resources

To enable virtual character customization, the following data are required $A_0$: virtual character's base surface $\{H^i\}$: virtual character's assets with $H^i = \{H_{i,j}\}$, $H^1 = \{H^{1,j}\}$: different 3D hair models $H^2 = \{H^{2,j}\}$: different 3D beard models $H^3 =$ different 3D eyebrow models $H^4 = \{H^{4,j}\}$: different 3D eyelash models The Process Will Output $A_{id}$: PCAs for $A_0$ $A_{exp}$: bilinear expression basis for $A_0$ $H_{id}^{ij}$: PCAs for $H^{ij}$ $H_{exp}^{ij}$: bilinear expression basis for $H^{ij}$ The technology presented herein works for different types of virtual characters.

3.2 Offline One-Time Virtual Character Customization

To customize a virtual character, the following is used a facial image, from which the facial feature vector $\alpha$ is constructed.

Assets selected by users from the UI. The user's choices are denoted as $$J = \{j_1, j_2, j_3, \dots\} \tag{34}$$

where $j_i=0$ indicates no asset selected from $H^i$ $j_i>0$ indicates the $j_i$-th asset from $H^i$, i.e., $H^{i,j_i}$.

Note that Eq.(34) can also be automatically generated from the provided facial image using a classification network. Based on these inputs, offline one-time virtual character customization phase in FIG. 5 generates two customized data to support online meeting, including $$H_{exp}^J(\alpha):$$

the customized virtual character expression basis, and $$H_{id}^J(\alpha):$$

the customized neutral virtual character model.

During an online meeting in FIG. 5, the user's pose and user's expression can be inferred from each video frame. User's pose and user's expression are retargeted to virtual character pose (R, T, s) and virtual character expression f. The virtual character is animated into $$H = H_{id}^J(\alpha) + H_{exp}^J(\alpha) \cdot \beta \qquad (35)$$

The animated virtual character is rendered based on the projection matrix in Eq.(18) constructed using the virtual character pose (R, T, s).

3.3 Representation of the Customized Virtual Character

As presented in Eq. (35), the customized virtual character is represented in 3DMM form. The base shape of the virtual character according to users' customization in Eq. (34) is $$H_0^J = \begin{pmatrix} A_0 \\ H^{1,j_1} \\ H^{2,j_2} \\ \vdots \end{pmatrix} \qquad (1)$$

The neutral shape of the customized virtual character without expressions is $$H_{id}^J(\alpha) = \begin{pmatrix} A_{id}(\alpha) \\ H_{id}^{1,j_1}(\alpha) \\ H_{id}^{2,j_2}(\alpha) \\ \vdots \end{pmatrix} = H_0^J + \begin{pmatrix} A_{id} \\ H_{id}^{1,j_1} \\ H_{id}^{2,j_2} \\ \vdots \end{pmatrix} \cdot \alpha = H_0^J + H_{id}^J \cdot \alpha \qquad (2)$$

where $A_{id}(\alpha)$, $$H_{id}^{i,j_i}(\alpha)$$

are $$A_{id}(\alpha) = A_0 + A_{id} \cdot \alpha \qquad (3)$$

$$H_{id}^{i,j_i}(\alpha) = H^{i,j_i} + H_{id}^{i,j_i}\alpha \qquad (4)$$

and $$H_{id}^J$$

is the PCA basis for the customized virtual character with its i-th column as the i-th PCA.

$$H_{id}^J = \begin{pmatrix} A_{id} \\ H_{id}^{1,j_1} \\ H_{id}^{2,j_2} \\ \vdots \end{pmatrix} \qquad (5)$$

The expression basis for the customized virtual character is $$H_{exp}^J(\alpha) = \begin{pmatrix} A_{exp}(\alpha) \\ H_{exp}^{1,j_1}(\alpha) \\ H_{exp}^{2,j_2}(\alpha) \\ \vdots \end{pmatrix} \qquad (6)$$

The customized expression basis $$H_{exp}^J$$

is designed to be a bilinear expression basis of dimensions $|\alpha| \times |\beta| \times 3v$ as $$H_{exp}^J = \begin{pmatrix} B_1 \\ \vdots \\ B_{|\alpha|} \end{pmatrix} = \begin{pmatrix} B_{1,1} & \cdots & B_{1,|\beta|} \\ \vdots & \ddots & \vdots \\ B_{|\alpha|,1} & \cdots & B_{|\alpha|,|\beta|} \end{pmatrix} \qquad (7)$$

where $v=|V(H_0)|$ is the number of vertices for the customized virtual character $|\alpha|$ is the size of the facial feature vector $\alpha$ $|\beta|$ is the size of the expression vector $\beta$ $B_{i,j}$ is a vector of size $3v$, representing the j-th expression for the i-th PCA of $$H_{id}^J$$

$B_i$ is an expression basis for the i-th PCA of $$H_{id}^J$$

as $$B_i = (B_{i,1} B_{i,2} \cdots B_{i,|\beta|}) \qquad (8)$$

Given a facial feature vector $\alpha=(\alpha_1, \alpha_2, \ldots, \alpha_{|\alpha|})$, the bilinear model generates an expression basis $$H_{exp}^{J}(\alpha) = \sum_{i=1}^{|\alpha|} \alpha_i B_i = \left( \sum_{i=1}^{|\alpha|} \alpha_i B_{i,1} \; \sum_{i=1}^{|\alpha|} \alpha_i B_{i,2} \; \cdots \; \sum_{i=1}^{|\alpha|} \alpha_i B_{i,|\beta|} \right) \qquad (9)$$

3.4 Objectives

The objective is to allow a customized virtual character to be generated for a user based on an input image of the user and the choices of assets in Eq.(34). The generated virtual character should deform following users' expressions as presented in Eq.(35). In the backend, the customized virtual character is built based on data $$\left( H_0^J, H_{id}^J, H_{exp}^J \right)$$

in Eq.(36), Eq.(40) and Eq.(41), which rely on $A_0$, $A_{id}$, $A_{exp}$, $H^{ij}$, $$H_{id}^{ij}, \text{ and } H_{exp}^{ij}$$

as presented in section 3.1. It will be time consuming and challenging for designers to model all these data. With the proposed technology, the designer only needs to model $A_0$ and $H^{ij}$. The optimization algorithm based on deformation transfer will generate $A_{id}$, $A_{exp}$, $$H_{id}^{ij}, \text{ and } H_{exp}^{ij}$$

based on $S_0$, $S_{id}$, $S_{exp}$, $A_0$ and $H^{ij}$ (see FIG. 6).

4 Deformation Transfer Algorithm

The virtual character customization is based on virtual character data from deformation transfer. This section will introduce deformation transfer techniques to generate virtual character PCA basis, i.e., $A_{id}$ and $$H_{id}^{ij},$$

and virtual character expression basis, i.e., $A_{exp}$ and $$H_{exp}^{ij}.$$

4.1 Data and Functions

4.1.1 Input and Output Data

The input data includes the 3DMM model data including
$S_0$: 3DMM base surface
$S_{id}$: 3DMM PCAs
$S_{exp}$: 3DMM expressions and virtual character data $A_0$, $H^{ij}$ (detailed in section 3.1). The optimization algorithm will output $A_{id}$, $A_{exp}$, $$H_{id}^{ij}, \text{ and } H_{exp}^{ij}.$$

4.1.2 Hyper Parameters $E_1$: threshold for removing triangles in section 4.2.2.3.
$E_2$: threshold for feature curve closing in section 4.1.7.

$\varepsilon_3$: threshold for deformation gradient scaling in section 4.1.6.

$\delta_1$: ratio for defining virtual triangles between two regions in section 3.

$\lambda_*$: weights of an energy term in the objective function.

$\gamma_1$: number of vertices during nearest neighbor searching in section 4.2.2.4.

$\gamma_2$: distance threshold during nearest neighbor searching section 4.2.2.4.

$\eta_{l,x}$, $\eta_{l,y}$, $\eta_{l,z}$: scaling factor for the 1-th virtual triangle.

4.1.3 Vertex Projection

The distances from one vertex p to a triangle $\Gamma$ with three vertices ($v_0$, $v_1$, $v_2$) is $$d_{min}(p, F) = \min_{\substack{(r_0, r_1, r_2) \\ r_0 + r_1 + r_2 = 1 \\ r_i \geq 0}} \left\| p - \sum_{i=0}^{2} r_i v_i \right\|, \qquad (45)$$

$$d_{max}(p, F) = \max_{\substack{(r_0, r_1, r_2) \\ r_0 + r_1 + r_2 = 1 \\ r_i \geq 0}} \left\| p - \sum_{i=0}^{2} r_i v_i \right\|, \qquad (46)$$

where $r_0$, $r_1$, $r_2$ is the barycentric coordinates of a vertex on $\Gamma$ defined in Eq.(13). The distances from one vertex p to a surface W is $$d_{min}(p, W) = \min_{F \in F(W)} d_{min}(p, F), \qquad (47)$$

$$d_{max}(p, W) = \max_{F \in F(W)} d_{max}(p, F), \qquad (48)$$

The projection of one vertex p to a surface W is $$r_0 v_0 + r_1 v_1 + r_2 v_2 \qquad (49)$$

where $$(v_0, v_1, v_2) = \underset{(v_0, v_1, v_2) \in F(W)}{\text{argmin}} \; d_{min}(p, (v_0, v_1, v_2))$$

$$(r_0, r_1, r_2) = \underset{\substack{(r_0, r_1, r_2) \\ r_0 + r_1 + r_2 = 1 \\ r_i \geq 0}}{\text{argmin}} \left\| p - \sum_{i=0}^{2} r_i v_i \right\|$$

The distances between two surface $W_1$, $W_2$ is $$d_{min}(W_1, W_2) = \min_{p \in V(W_1), F \in F(W_2)} d_{min}(p, F), \qquad (50)$$

$$d_{max}(W_1, W_2) = \max_{p \in V(W_1), F \in F(W_2)} d_{max}(p, F), \qquad (51)$$

4.1.4 Face Region

The deformation transfer algorithm is used to transfer deformations of the 3DMM base surface $S_0$ to the virtual character model (see FIG. 6). The virtual character model contains more regions than the 3DMM base surface $S_0$. Thus, a connected face region $\Delta(A_0)$ needs to be extracted from the virtual character base surface $A_0$ corresponding to the 3DMM base surface $S_0$, i.e., with facial features such as nose and lips, and without interior mouth and interior eye regions.

A component is a 3D mesh consisting of one connected region. The 3DMM base surface $S_0$ contains only one component, but there may be multiple components on the virtual character base surface $A_0$, denoted as $\{W_i(A_0)\}$ with $W_1(A_0)$ as the main component (FIG. 7). $W_1(A_0)$ is the largest component overlapping with the face region. It may not contain facial features such as nose, which may be separated components. It may contain interior mouth and eye regions (see the wireframe of FIG. 7(c)). The main component $W_1(A_0)$ cannot be used as A $(A_0)$ for two reasons:

Similar to 3DMM base surface $S_0$, $\Delta(A_0)$ should contains face features such as nose and lips. In some virtual character models, face features, such as the nose, may be missing from the main virtual character component $W_1(A_0)$.

The main component $W_1(A_0)$ may also contains additional interior structures such as the mouth and the eye socket (also called orbit). These structures should not exist in $\Delta(A_0)$.

In this disclosure, the data pre-processing step will automatically extract the face region $\Delta(A_0)$. Note that $\Delta(A_0)$ will also contains additional geometric information such as the ears and the back side of the head, which will not affect the deformation algorithm.

4.1.5 Virtual Triangles

Virtual triangles are added to support the deformation transfer, but are not added to the final virtual character models. These virtual triangles are designed for three purposes:

To propagate deformation gradients from face region $\Delta(A_0)$ to other regions To prevent self-intersections, To preserve local shape feature along a curve The face region $\Delta(A_0)$ can deform using the deformation gradient from the 3DMM base surface $S_0$. Beside the face region $\Delta(A_0)$, the virtual character model contains more regions that are not exist on the 3DMM base surface $S_0$, such as the interior mouth/eye regions and the all the assets $H^{ij}$. As such, the virtual triangles are set up to link these regions to $\Delta(A_0)$ to propagate the deformation gradient. Moreover, virtual triangles also can help preventing self-intersections during the deformation, especially the intersections between the interior mouth/eye regions and the face region $\Delta(A_0)$. In another situation, to preserve the shape feature of a local region, such as the mouth region, the region can be marked with a curve and virtual triangles can be added along this curve. The virtual triangles used to preserve features are also referred to as "virtual feature triangles."

To achieve the above objectives, two types of virtual triangles are constructed:

Virtual triangles from a region $W_i$ to another region $W_j$ (to be detailed in section 3)

$$V_t^1(W_i, W_j) \qquad (52)$$

Virtual triangles from a curve L (to be detailed in section 4.1.5.2)

$$V_t^2(L) \qquad (53)$$

4.1.5.1. Virtual Triangle Generation Between Two Regions

This section details how the data in Eq.(52) is generated. First, initialize $$V_t^1(W_i, W_j) = \phi$$

Then, calculate a threshold as $$\delta(W_i, W_j) = d_{min}(W_i, W_j) + \delta_1(d_{max}(W_i, W_j) - d_{min}(W_i, W_j)) \qquad (54)$$

where $d_{min}(W_i, W_j), d_{max}(W_i, W_j)$ are the min and max distances in Eq.(50) and Eq.(51)

$\delta_1$ is a hyper parameter defined in section 4.1.2.

For every vertex $p \in V(W_j)$ and every triangle $(v_0, v_1, v_2) \in F$ $(W_j)$, if the vertex-triangle distance in Eq.(X7) is smaller than the threshold in Eq.(X4), i.e., $$d_{min}(p, (v_0, v_1, v_2)) < \delta(W_i, W_j),$$

the following three triangles are added to $$V_t^1(W_i, W_j)$$

$$(p, v_1, v_2), (v_0, p, v_2), (v_0, v_1, p)$$

Note that the threshold in Eq.(X4) is adaptive to the size of the region. With W fixed, the threshold for a larger $W_i$ is bigger. As a result, more virtual triangles will be generated. For example, if $W_1$ is the face region, $W_2$ is the pupil region, and $W_3$ is the interior mouth region, the number of virtual triangles from $W_3$ to $W_1$, i.e.

$$V_t^1(W_3, W_1),$$

will be larger than the number of virtual triangles from $W_2$ to $W_1$, i.e.

$$V_t^1(W_2, W_1).$$

4.1.5.2. Virtual triangles from a constraint curve

This section details how to generate the virtual triangles in Eq.(53). Given a curve in Eq.(X27), (n−2) virtual triangles with the i-th triangle can be constructed as $$( \; v_i \quad v_{i+1} \quad v_{i+2} \; )$$

When deforming a triangulated model from H to H, according to Eq.(21), setting the deformation gradient for these virtual triangles as $I_3$ (see in Eq.(X19)), i.e., $$T_{(v_i\, v_{i+1}\, v_{i+2})}(H, \bar{H}) = I_3, \tag{55}$$

indicates that these triangles do not deform. Thus, the curve L will fix during the deformation (to be detailed in section 4.2.3.8)

4.1.6. Deformation Gradient Scaling

Each deformation gradient $T_i$ in Eq.(21) is a 3×3 matrix $$T_i = (T_{i,1}\ T_{i,2}\ T_{i,3}), \tag{56}$$

where $T_{i,j}$ is its j-th column. Decompose $T_i$ as the product of a rotation matrix and a scaling matrix as $$T_i = \left(\frac{T_{i,1}}{\|T_{i,1}\|}\ \frac{T_{i,2}}{\|T_{i,2}\|}\ \frac{T_{i,3}}{\|T_{i,3}\|}\right)\begin{pmatrix}\|T_{i,1}\| & 0 & 0 \\ 0 & \|T_{i,2}\| & 0 \\ 0 & 0 & \|T_{i,3}\|\end{pmatrix}, \tag{57}$$

where $\|T_{i,j}\|$ is the scaling factor along the j-axis.

The scaling along the j-th axis can be enhanced by $s_j$, i.e., change its scaling of the j-th axis from $\|T_{i,j}\|$ to $1+(\|T_{i,j}\|-1)s_j$. To prevent the new scaling from being too small or being negative, it is limited to be above the hyper parameter as $$1 + (\|T_{i,j}\| - 1)s_j > \varepsilon_3 \tag{30}$$

As such, the new deformation gradient can be formulated as (to be detailed in section 4.2.3.5)

$$E_{(s_1, s_2, s_3)}(T_i) = \left(\frac{T_{i,1}}{\|T_{i,1}\|}\ \frac{T_{i,2}}{\|T_{i,2}\|}\ \frac{T_{i,3}}{\|T_{i,3}\|}\right)$$
$$\begin{pmatrix}\min(1 + (\|T_{i,1}\| - 1)_{s_1,\varepsilon_3}) & 0 & 0 \\ 0 & \min(1 + (\|T_{i,2}\| - 1)_{s_2,\varepsilon_3}) & 0 \\ 0 & 0 & \min(1 + (\|T_{i,3}\| - 1)_{s_3,\varepsilon_3})\end{pmatrix}$$

Equivalently $$E_{(s_1, s_2, s_3)}(T_i) =$$
$$T_i\begin{pmatrix}\dfrac{\min(1 + (\|T_{i,1}\| - 1)s_1, \varepsilon_3)}{\|T_{i,1}\|} & 0 & 0 \\[2ex] 0 & \dfrac{\min(1 + (\|T_{i,2}\| - 1)s_2, \varepsilon_3)}{\|T_{i,2}\|} & 0 \\[2ex] 0 & 0 & \dfrac{\min(1 + (\|T_{i,3}\| - 1)s_3, \varepsilon_3)}{\|T_{i,3}\|}\end{pmatrix}$$

4.1.7. Curve Mapping

This section implements Eq.(9). On a mesh H with vertices V=V(H), denote two curves $L_1$ and $L_2$ following Eq.(X27) as $$L_k = \begin{bmatrix} v_{k,1} & v_{k,2} & \cdots & v_{k,|L_k|} \end{bmatrix}, k = 1, 2$$

and parameterize them following Eq.(15) as $$L_k(t) = \begin{bmatrix} t_{k,1} & t_{k,2} & \cdots & t_{k,|L_k|} \end{bmatrix}.$$

For each vertex $v_{1,i}$ with parameter $t_{1,i}$ on curve $L_1$, i.e., $L_1(t_{1,i})\ v_{1,i}$, its corresponding point on the curve $L_2$ is $$L_2(t_{1,i}) = \frac{t_{2,j+1} - t_{1,i}}{t_{2,j+1} - t_{2,j}} V_{v_{2,j}} + \frac{t_{1,i} - t_{2,j}}{t_{2,j+1} - t_{2,j}} V_{v_{2,j+1}}, t_{1,i} \in [t_{2,j}, t_{2,j+1}] \tag{59}$$

which is on the j-th edge of the curve $L_2$.

Curve mapping from $L_1$ and $L_2$ is the mapping from $v_{1,i}$ to $L_2(t_1)$.

$$N(L_1, L_2) = \left\{ \left( v_{1,i}, \frac{t_{2,j+1} - t_{1,i}}{t_{2,j+1} - t_{2,j}}, v_{2,j}, \frac{t_{1,i} - t_{2,j}}{t_{2,j+1} - t_{2,j}}, v_{2,j+1} \right) \right\}_{i=1,2,\ldots,|L_1|} \tag{60}$$

where j is derived in Eq.(59).

The mapping distance from $L_1$ and $L_2$ is $$D(L_1, L_2) = \frac{1}{|L_1|} \sum_{(a,b,c,d,e)\in N(L_1,L_2)} \|bV_c + dV_e - V_a\| \tag{61}$$

The curve overlapping from $L_1$ and $L_2$ is $$\tag{58}$$

$$60$$

$$\delta(L_1, L_2) = \begin{cases} 0 & D(L_1, L_2) > \varepsilon_2 \\ 1 & \text{else} \end{cases} \tag{62}$$

4.1.8. Fix Vertices During Deformation

Given the source model S, its deformation S̃, the target model A, and the triangle correspondence $M_c(S, A)$, this section introduces how to identify the fixed vertices on A in Eq. (4).

Step 1: calculate $\rho_f(S, \tilde{S})$ as the triangles that are fixed when deforming S into S̃.

$$i \in \rho_f(S, \tilde{S}), \text{ if } V_j(\tilde{S}) = V_j(S) \text{ for } j \in F_i(S) \qquad (10)$$

Step 2: identify fixed triangles on A according to the triangle correspondence $M_c(S, A)$. A triangle on A is fixed if its corresponding triangle on S is fixed, i.e.

$$\rho_f(A, S, \tilde{S}) = \{j \mid (i, j) \in M_c, i \in \rho_f(S, \tilde{S})\} \qquad (11)$$

Step 3: identify a fixed vertex $V_j(A)$ if it belongs to a triangle in $\rho_f(A, S, \tilde{S})$, i.e.

$$\rho_v(A, S, \tilde{S}) = \{j \mid j \in T, T \in \rho_f(A, S, \tilde{S})\} \qquad (12)$$

A triangle containing at least one non-fixed vertex will deform during the deformation transfer.

4.1.9. Linear Solver

An optimization problem in this disclosure can be formulated as $$\min_{X} \|A \cdot X - B\| \qquad (66)$$
$$\text{s.t. } X_i = x_i, \forall i \in I^{fix}.$$

where A, B, $x_i$ are constant; $X_i$ is the i-th row of X; $I^{fix}$ indices the fixed rows of X.

Denote $$A = [A^{opt}, A^{fix}], X = \begin{bmatrix} X^{opt} \\ X^{fix} \end{bmatrix} \qquad (67)$$

where $A^{fix}$ includes columns of A filtered by $I^{fix}$
$A^{opt}$ includes the remaining columns of A
$X^{fix}$ uses $x_i$ as a row
$X^{opt}$ is the non-fixed rows to be optimized
The solution to Eq.(66) is given by $$A^{opt} X^{opt} = B - A^{fix} X^{fix} \qquad (68)$$

4.1.10. Symmetric Setup

This section introduces how to setup the symmetric pairs of vertices $M_s(H)$ for a given model H and how to derive the symmetric switch $\rho_s(H, \tilde{H})$ in Eq. (5) given the source model H and deform model H̃. In the setup, the virtual character base surface $A_0$ and the 3DMM base surface $S_0$ are x-symmetric. The symmetric pairs of vertices $M_s(H)$ can be denoted as $$M_s(H) = \{(i, j) \mid E_x V_i(H) = V_j(H)\} \qquad (13)$$

For each vertex $V_i(H)=(x, y, z)$, if its x=0, add $\{(i, i)\}$ to $M_s(H)$. Otherwise, if x<0, find the index j such that $V_j(H)=(-x, y, z)$, and add $\{(i, j)\}$ to $M_s(H)$. For (i, j)∈$M_s(H)$, $E_x V_i(H)=V_j(H)$, where $E_x$ is defined in Eq. (2). For (i, i)∈$M_s(H)$, the x-coordinate of $V_i(H)$ is zero.

During the deformation transfer, each pair of vertices on the deformed virtual character model are kept symmetric to each other (see section 4.2.3.7). Otherwise, the deformed virtual character may be incorrect. For the 3DMM base surface $S_0$, the symmetric pairs of vertices is $M_s$ ($S_0$)

$$M_s(S_0) = \{(i, j) \mid E_x V_i(S_0) = V_j(S_0)\} \qquad (70)$$

For a deformed model S̃ of $S_0$, it is symmetric if an only if it keeps all the symmetric pairs, i.e.

$$M_s(\tilde{S}) = M_s(S_0) \qquad (71)$$

Thus, the symmetricity of the deformed model S can be check by $$\rho_s(S_0, \tilde{S}) = \begin{cases} 1 & E_x V_i(\tilde{S}) = V_j(\tilde{S}), \forall (i, j) \in M_s(S_0) \\ 0 & \text{otherwise} \end{cases} \qquad (72)$$

4.2. Workflows

Given $S_0$, $S_{id}$, $S_{exp}$, $A_0$, $H^{ij}$, the optimization algorithm will generate $A_{id}$, $A_{exp}$, $$H_{id}^{ij}, \text{ and } H_{exp}^{ij}$$

following these steps.

Input data labelling (to be detailed in section 4.2.1) labels the data on the 3DMM base surface $S_0$ and the virtual character base surface $A_0$ to support the deformation transfer. These data includes Corresponding data on both models, including vertices $L_v(S_0)$, $L_v(A_0)$, curves $L_c(S_0)$, $L_c(A_0)$, and regions $L_v(S_0)$, $L_v(A_0)$.

Additional data on the virtual character base surface, including vertices $$L_v^{fix}(A_0),$$

curves $$L_c^{fix}(A_0),$$

triangles $M_g$ ($A_0$), and regions $L_{upper}(A_0)$, $L_{lower}(A_0)$

Model pre-processing $\Omega_1(\cdot)$ (to be detailed in section 4.2.2) automatically generates a new virtual character model from input data and the labelled data as $$H = \Omega_1\left(A_0, \{H^{i,j}\}\right) \tag{73}$$

$$= \left\{M_s(A_0), \Gamma, \{\Gamma \cdot H^{i,j}\}, A_1, \{K_k\}_{k=1}^3, C_1, \Delta, K_\Delta, \{G_k\}_{k=0}^2, M_c, \bar{M}_c\right\}$$

where $M_s(A_0)$: pairs of symmetric vertices from $A_0$(derived following Eq.(69))

$$M_s(A_0) = \{(i, j)\} \tag{74}$$

$\Gamma$: a rigid transformation from $A_0$ to $S_0$(to be detailed in section 4.2.2.1)

$A_1$: a refined model of $\Gamma \cdot A_0$ by (to be detailed in section 4.2.2.2)

removing triangles $K_3$, adding new triangles $K_2$, and adding new vertices $K_1$ with parameters $C_1=\{C_{1,k}\}$ as $$C_{1,k} = (c_{1,k,1}, c_{1,k,2}, c_{1,k,3}, c_{1,k,4}, c_{1,k,5}, c_{1,k,6}, c_{1,k,7}) \tag{75}$$

where $c_{l,k,1} \in K_1$ is an index of a new vertex $c_{1,k,5}$, $c_{1,k,6}$, $c_{1,k,7}$ are vertices' indices in $A_0$ and $A_1$ $c_{1,k,2}$, $c_{1,k,3}$, $c_{1,k,4}$ are barycentric coordinates satisfying $$V_{c_{1,k,1}}(A_1) = c_{1,k,2}V_{c_{1,k,5}}(A_1) + c_{1,k,3}V_{c_{1,k,6}}(A_1) + c_{1,k,4}V_{c_{1,k,7}}(A_1) \tag{76}$$

$\Delta$: the face region of the virtual character model (to be detailed in section 4.2.2.3)

$\{G_k\}$: virtual triangles including (to be detailed in section 4.2.2.3)

$G_0=\{G_{0,0}, G_{0,1}\}$: virtual triangles among different regions of $A_1$ $G_1=\{G_{1,0}, G_{1,1}\}$: virtual triangles for feature preserving $G_2=\{G_{2,i,j}\}$: virtual triangles between the face region $\Delta$ and virtual character's assets $\Gamma \cdot H^{i,j}$ $M_c$: triangle correspondence between $A_0$ and $S_0$(to be detailed in section 4.2.2.4)

$$M_c = M_c(S_0, A_0) = M_c(S_0, \Delta(A_0)) = \{(i, j)|i \in F(S_0), j \in F(A_0)\}. \tag{77}$$

$V(H)$: all vertices from $A_1$ and $\{\Gamma \cdot H^{i,j}\}$ $$V(H) = V(A_1) \bigcup_{i,j} \Gamma\left(V\left(H^{i,j}\right)\right) \tag{78}$$

$F(H)$: all triangles from $A_1$ and $\{\Gamma \cdot H^{i,j}\}$ $$F(H) = F(A_1) \bigcup_{i,j} F\left(H^{i,j}\right) \tag{79}$$

$K_\Delta$ defines indices of the face and non-face regions on the model H as $$K_\Delta = \left\{K_{\Delta,v}, K_{\Delta,f}, \bar{K}_{\Delta,v}, \bar{K}_{\Delta,f}\right\} \tag{80}$$

where $K_{\alpha,v}$: vertices' indices of the face region $K_{\alpha,f}$: triangles' indices of the face region $\bar{K}_{\alpha,v}$: vertices' indices of the non-face region with $$\bar{K}_{\Delta,v} = \bigcup_j \bar{K}_{\Delta,v,j}. \tag{81}$$

where $\bar{K}_{\alpha,v,j}$ includes vertices' indices of the non-face region on the j-th component $\{W(H)\}$.

$\bar{K}_{\alpha,f}$: triangles' indices of the non-face region $\bar{M}_c$: triangles from face region $\Delta(A_0)$ that do not have any correspondence with $S_0$ $$\bar{M}_c = \{i|i \in F(\Delta(A_0))|\} - \{i|(j, i) \in M_c\}. \tag{82}$$

Deformation transfer $\mathcal{F}(\cdot)$ (to be detailed in section 4.2.3) generates the deformed models for the model H in Eq.(73) as $$H_{id,k} = \mathcal{F}(H, S_0, S_0 + S_{id,k}) - H \tag{83}$$

$$H_{exp,k,l} = \mathcal{F}(H + H_{id,k}, S_0 + S_{id,k}, S_0 + S_{id,k} + S_{exp,l}) - (H + H_{id,k})$$

Model post-processing $\Omega_2(\cdot)$ (to be detailed in section 4.2.4) reconstruct the desired output data from deformed model $\tilde{H} \in \{H_{id,k}\} \cup \{H_{exp,k,l}\}$ as $$A_{id,k}, H_{id,k}^{ij} = \Omega_2(H_{id,k}) \tag{84}$$

$$A_{exp,k,l}, H_{exp,k,l}^{ij} = \Omega_2(H_{exp,k,l})$$

4.2.1. Input Data Labelling

To generate the desired outputs, the following data can be labelled on both the 3DMM base surface $S_0$ and the virtual character base surface $A_0$ $L_v(\cdot)$: feature vertices including $L_v(S_0)$ on the 3DMM base surface $S_0$ (red points in FIGS. 11(a) and (c)), and $L_v(A_0)$ on the virtual character base surface $A_0$ (blue points in FIG. 11(b)).

$L_{v,i}(\cdot) \in L_v(\cdot)$: the i-th feature vertex, such that $L_{v,i}(S_0)$ corresponds to $L_{v,i}(A_0)$ $L_{v,71}, L_{v,72}, L_{v,73}$ are on the upper lip, while $L_{v,75}, L_{v,76}, L_{v,77}$ are on the lower lip.

$L_c(\cdot)$: feature curves including $L_c(S_0)$ on the 3DMM base surface $S_0$ (curves in FIGS. 11(a) and (d)), and $L_c(A_0)$ on the virtual character base surface $A_0$ (red curves in FIG. 11(b))

$L_{c,i}(\cdot) \in L_c(\cdot)$: the i-th feature curve, such that $L_{c,i}(S_0)$ will be projected into $L_{c,i}(A_0)$, thus $L_{c,i}(A_0)$ should be equal or larger than $L_{c,i}(S_0)$.

$L_{c,4}$ is on the upper lip, while $L_{c,5}$ is on the lower lip.

$L_r(\cdot)$: feature regions including $L_r(S_0)$ on the 3DMM base surface $S_0$ (bronze regions in FIG. 11(*a*)), and $L_r(A_0)$ on the virtual character base surface $A_0$ (purple regions in FIG. 11(*b*))

$L_{r,i}(\cdot) \in L_r(\cdot)$: the i-th feature region, such that $L_{r,i}(S_0)$ will be projected into $L_{r,i}(A_0)$, thus $L_{r,i}(A_0)$ should be larger than $L_{r,i}(S_0)$, i.e., the purple regions in FIG. 11(*b*) are larger than bronze regions in FIG. 11(*a*).

A set of triangles $M_g$ can also be labelled to control the global deformation, where the-th virtual triangle is $$(i_l, j_l, k_l, \eta_{l,x}, \eta_{l,y}\eta_{l,z}) \in M_g(A_0) \tag{14}$$

where $i_l$, $j_l$, $k_l$ defines a triangle using feature vertices as corners: $(L_{v,i_l}, L_{v,j_l}, L_{v,k_l})$.

$\eta_{l,x}$, $\eta_{l,y}$, $\eta_{l,z}$ are hyper parameters, and the deformation gradient for the triangle $(L_{v,i_l}, L_{v,j_l}, L_{v,k_l})$ will be scaled by $\eta_{l,x}$, $\eta_{l,y}$, $\eta_{l,z}$ along x-,y-,z-axis.

FIG. 12 shows five virtual triangles (virtual feature triangles) on both the 3DMM based face and the virtual character base surface as $$(L_{v,16}, L_{v,0}, L_{v,8}), (L_{v,15}, L_{v,1}, L_{v,8}), \tag{15}$$

$$(L_{v,14}, L_{v,2}, L_{v,8}), (L_{v,13}, L_{v,3}, L_{v,8}), (L_{v,12}, L_{v,4}, L_{v,8})$$

Similarly, virtual triangles can also be defined to enhance face features such as eyes, nose, and lips. FIG. 12 shows additional eight virtual triangles (virtual feature triangles) to enhance the global deformation of the eye regions.

$$(L_{v,46}, L_{v,44}, L_{v,48}), (L_{v,46}, L_{v,45}, L_{v,47}), \tag{16}$$

$$(L_{v,42}, L_{v,48}, L_{v,44}), (L_{v,42}, L_{v,49}, L_{v,43}), (L_{v,54}, L_{v,52}, L_{v,56}),$$

$$(L_{v,54}, L_{v,53}, L_{v,55}), (L_{v,50}, L_{v,56}, L_{v,52}), (L_{v,50}, L_{v,57}, L_{v,51})$$

On the virtual character base surface $A_0$, the following can also be labeled:

The mouth upper region $L_{upper}(A_0)$ and mouth lower region $L_{lower}(A_0)$ (see FIG. 8). The mouth region of the virtual character includes exterior regions such as lips, and interior regions such as teeth, gums, and tongue. To generate virtual character expressions with correct mouth opening, two regions $L_{upper}(A_0)$ and $L_{lower}(A_0)$ will separate when the mouth open. As such, upper teeth and upper gum belongs to $L_{upper}(A_0)$, and lower teeth, lower gum and tongue belongs to $L_{lower}(A_0)$.

The fixed vertices $$L_v^{fix}(A_0),$$

indicating vertices to fixed during deformation transfer $$L_v^{fix}(A_0) = \{L_{v,i}^{fix}(A_0)\} \tag{88}$$

where $$L_{v,i}^{fix}(A_0)$$

is the i-th fixed vertex. For example, vertices on virtual character's neck and back can be fixed vertices.

The constraint curves $$L_c^{fix}(A_0) = \{L_{c,i}^{fix}(A_0)\}, \text{ where } L_{v,i}^{fix}(A_0)$$

is the i-th constraint curve. The algorithm will minimize the deformation for each constraint curve, and keep this curve remain its shape during the deformation. In this disclosure, as an example, two constraint curves are defined to maintain the mouth shape, and 3 constraint curves are defined for each pupil to keep it in the circular shape (FIG. 13).

4.2.2. Model Pre-Processing

This section details how to perform virtual character model pre-processing $\Omega_1(\cdot)$ in Eq.(73). The main objective of virtual character model pre-processing is to extract face region $\Delta(A_0)$ from the virtual character base surface $A_0$ capturing the face features similar to the 3DMM base surface $S_0$, create virtual triangles to enhance the deformation transfer, setup triangle correspondence between virtual character base surface $A_0$ and 3D1MM base surface $S_0$.

The data in Eq.(73) are generated as follows:

$\Gamma$: a rigid transformation from $A_0$ to $S_0$(to be detailed in section 4.2.2.1).

Model merging data (to be detailed in section 4.2.2.2)

$$\{A_1, K_1, K_2, K_3, C_1\} \tag{89}$$

where $A_1$: a new virtual character base surface after merging the external components of $A_0$, such as the nose and the lips, onto the main virtual character component $W_1(A_0)$.

$K_1$: vertices of $A_1$ that are not belongs to $A_0$, i.e., $V_i(A_1) \in V(A_0)$, $i \in K_1$.

$K_2$: triangles of $A_1$ that are not belongs to $A_0$, i.e., $F_i(A_1) \in F(A_0)$, $i \in K_2$.

$K_3$: triangles of $A_0$ that are not belongs to $A_1$, i.e., $F_i(A_0) \in F(A_1)$, $i \in K_3$.

$C_1 = \{C_1, k\}$: defined in Eq.(75) and Eq.(76).

Model trimming data (to be detailed in section 4.2.2.3)

$$\{A_2, K_4, \{G_k\}\} \tag{90}$$

where $A_2$: a new virtual character base surface after removing triangles $K_4$ from the main virtual character component $W_1(A_1)$ along the first six feature curves $L_{c,i}$, i=0,1, . . . ,5 (FIG. 11(*d*)). As such, the virtual character's face region becomes a main component $\Delta$ $(A_0) = W_1(A_2)$.

$K_4$: triangles of $A_1$ that are not belongs to $A_2$, i.e., $F_i(A_1) \in F(A_2)$, $i \in K_4$.

$\{G_k\}$: virtual triangles, where $G_0 = \{G_{0,0}, G_{0,1}\}$: virtual triangles among different components $\{W_i(A_2)\}$, where $G_{0,0}$: virtual triangles between the mouth upper region $L_{upper}(A_0)$ and mouth lower region $L_{lower}$ $(A_0)$ (see FIG. 8(e)(f)).

$G_{0,1}$: normal virtual triangles.

$G_1 = \{G_{1,0}, G_{1,1}\}$: virtual triangles from constraint curves, where $G_{1,0}$ are virtual triangle for the face region $\Delta$.

$G_2 = \{G_{2,i,j}\}$: virtual triangles between the main virtual character component $W_1(A_2)$ and virtual character's assets, where $G_{2,i,j}$ is a set of virtual triangles between the main virtual character component $W_1(A_2)$ and virtual character's assets $\Gamma \cdot H^{i,j}$.

$M_c = M_c(S_0, A_0)$: triangle correspondence between $A_0$ and $S_0$ (to be detailed in section 4.2.2.4)

4.2.2.1. Rigid Transformation

This section introduces how to create the rigid transformation $\Gamma$ in Eq. (73). Both the virtual character model and the 3DMM model are symmetrically modelled, i.e., its left and right parts is symmetric along x-axis. However, they may not be in the same coordinate system. Assume that $\Gamma$ is the transformation from $A_0$ to $S_0$. As discussed in section 4.1.10, each symmetric pair $(i, j) \in M_s(A_0)$ needs to remain symmetric after transformation, i.e., $$E_x V_i = V_j \qquad (17)$$

$$E_x \Gamma V_i = \Gamma V_j$$

Combining the above two equations gives $$E_x \Gamma = \Gamma E_x \qquad (18)$$

This means that $\Gamma$'s rotation matrix should be a rotation along x-axis, and $\Gamma$'s translation along x-axis should be zero. If Eq. (92) is not satisfied, it will generate incorrect results. The transformation $\Gamma$ can be calculated based on the landmarks $L_v(S_0)$ and $L_v(A_0)$ labelled in section 4.2.1 as $$\Gamma = \operatorname{argmin} \sum_i \| \Gamma \cdot L_{v,i}(A_0) - L_{v,i}(S_0) \|^2 \qquad (19)$$
$$\text{s.t. } E_x \Gamma = \Gamma E_x$$

In the proposed system, different virtual character models are all transformed and aligned to $S_0$, and the parameters in section 4.1.2 are fine-tuned under $S_0$'s coordinate system. As such, different virtual character models can use the same set of hyper parameters. Instead, if the transformation is from $S_0$ to $A_0$, Eq. (92) needs to be kept as well. However, if the virtual character model is changed to another virtual character model with different sizes, the hyperparameters in section 4.1.2, especially the distance parameters, need to be fine-tuned again.

4.2.2.2. External Surface Merging

This section details how to generate the data in Eq.(89). First, initialize $$A_1 = \Gamma A_0, K_1 = K_2 = K_3 = C_1 = \emptyset \qquad (94)$$

where $\Gamma$ is the rigid transformation in Eq.(93). As shown in FIG. 7, if the external facial features of $A_0$, such as the nose, are all geometrically connected to the main face, Eq.(94) can be used. Otherwise (e.g., the nose is separated from the main face), separated facial features need to be merged onto the main face $W_1(A_0)$. For example, if the nose model is separated from the main face $W_1(A_0)$ but intersects with the main face $W_1(A_0)$. The following steps can be used:

Step 1. Update $K_3$: Add the indices of the intersecting triangles between the nose and the main face $W_1(A_0)$ to the $K_3$.

Step 2. Update $K_1$: Calculate the intersecting curve between the nose X and the main face Y. The intersection curve cuts them into interior regions $X_0$, $Y_0$ and exterior regions $X_1$, $Y_1$. Create three copies of the intersection curves: one for $X_0$, one for $Y_0$, and the last one as the boundary connecting $X_1$ and $Y_1$. As such, the two exterior regions are connected in the new model, and the two interior regions are disconnected from the external surface. Calculate the intersecting vertices from each intersecting curve. Add these vertices to $A_1$, and add their indices to $K_1$.

Step 3. Update $C_1$: Each new vertex is the intersection point between an edge from the nose (or the main face $W_1(A_0)$) and a triangle from the main face $W_1(A_0)$ (or the nose). Thus, each new vertex lies on at least one triangle in $K_3$. If an intersecting vertex in $K_1$ lies on a triangle in $K_3$, $C_{1,k}$ in Eq.(75) can be constructed as follows and added to $C_1$.

$c_{1,k,1} \in K_1$: the index of the intersecting vertex, $[c_{1,k,5}, c_{1,k,6}, c_{1,k,7}]$: vertices of the triangle where the intersecting vertex lies on $[c_{1,k,2}, c_{1,k,3}, c_{1,k,4}]$: barycentric coordinates of the intersecting vertex on the triangle such that Eq.(76) holds.

Step 4. Update $K_2$: Use the intersecting vertices in $K_1$ to refine the triangles in $K_3$. Remove triangles in $K_3$ from $A_1$. Add the new refined triangles to $A_1$, and add their indices to $K_2$.

Triangles $K_2$ from $A_1$ are refined from triangles $K_3$ from $A_0$. Thus, $A_0$ and $A_1$ are representing the same 3D shape. $A_0$ from $A_1$ can be reconstructed via removing $K_1$, $K_2$ from $A_1$ and adding triangles $K_3$ as $$A_0 = A_1 - K_1 - K_2 + K_3 \qquad (95)$$

Denote $\tilde{A}_1$: the deformed model of $A_1$.

$\tilde{A}_0$: the deformed model of $A_0$

Following Eq.(95), given $\tilde{A}_1$, $\tilde{A}_0$ from $\tilde{A}_1$ can be constructed via removing $K_1$, $K_2$ from $\tilde{A}_1$ and adding triangles $K_3$. Furthermore, if $\tilde{A}_1$ satisfies conditions similar to Eq.(76) as $$V_{c_{1,k,1}}(\tilde{A}_1) = c_{1,k,2} V_{c_{1,k,5}}(\tilde{A}_1) + c_{1,k,6} V_{c_{1,k,2}}(\tilde{A}_1) + c_{1,k,4} V_{c_{1,k,7}}(\tilde{A}_1) \qquad (96)$$

Triangles $K_2$ from $\tilde{A}_1$ and triangles $K_3$ from $\tilde{A}_0$ are representing the same shape. Thus, $\tilde{A}_0$ and $\tilde{A}_1$ are representing the same 3D shape. Note that data $K_1$, $K_2$ do not exist on the original virtual character model, and they do not have material properties or skeleton binding. Thus, $K_1$, $K_2$ need to be removed from the virtual character model to avoid affecting the virtual character's design.

4.2.2.3. Interior Regions Separation

This section details how to generate the data in Eq.(90). First, initialize $$A_2 = A_1, K_4 = G_0 = G_1 = G_2 = \emptyset. \tag{97}$$

Then, update these data in the following steps:

Step 1. Trimming: trim the main virtual character component $W_1(A_2)$ (FIG. 7(a)) using the first six feature curves $L_{c,i}(A_2)$, i=0,1, . . . ,5 FIG. 11(d)). This will separate the interior mouth/eye regions (the blue regions in FIG. 8(a)(b)) from the external region (white region in FIG. 8(a) and the wireframe in FIG. 8(c)).

Step 2. Update $K_4$: for each triangle from the interior mouth/eye regions, if the distance from its centre to the nearest feature curve is smaller than the threshold $E_1$, add it to $K_4$ and remove it from $A_2$. The hyper parameter $E_1$ is defined in section 4.1.2.

Step 3. Construct components $W_j(A_2)$. The region corresponding to $K_4$ is removed from $A_2$ (the orange regions in FIG. 8(d)). As a result, the interior mouth/eye regions are geometrically separated from the main face component $W_1(A_2)$. The face region $\Delta(A_0)=W_1(A_2)$ becomes a single component like the 3DMM base surface (FIG. 11(a)), with only the external face including the nose and the lip.

Step 4. Update $G_0=\{G_{0,0}, G_{0,1}\}$:

For every component $W_i(A_2)$ except $\Delta(A_0)$, generate virtual triangles using Eq.(52) as (see FIG. 9)

$$V_t^1(W_i(A_2), W_1(A_2)) = V_t^1(W_i(A_2), \Delta(A_0)) \tag{98}$$

For every two components $W_i(A_2)$ and $W_j(A_2)$ except $\Delta(A_0)$, generate virtual triangles using Eq.(52) as $$V_t^1(W_i(A_2), W_j(A_2)) \tag{99}$$

Classify all virtual triangles from Eq.(98) and Eq.(99) into two groups $G_{0,0}$ and $G_{0,1}$: if a virtual triangle connects the mouth upper region $L_{upper}(A_0)$ and mouth lower region $L_{lower}(A_0)$ (see FIGS. 8(e) and (f)), add it to $G_{0,0}$, otherwise, add it to $G_{0,1}$. Each virtual triangle in $G_{0,0}$ satisfies either one of the following conditions (see FIG. 9(b))

has one vertex on $L_{upper}(A_0)$ and two vertices on $L_{lower}(A_0)$.

has two vertices on $L_{upper}(A_0)$ and one vertex on $L_{lower}(A_0)$.

Step 5. Update $G_1$: for each constraint curve $$L_{c,i}^{fix}(A_2), \tag{65}$$

generate virtual triangles using Eq.(53) and add them to $G_1$ as $$G_1 = G_1 \cup V_t^2(L_{c,i}^{fix}(A_2)) \tag{100}$$

Classify all virtual triangles in $G_1$ into two groups $G_{1,0}$ and $G_{1,1}$: all vertices of a virtual triangle belong to the face region A, add it to $G_{1,0}$, otherwise, add it to $G_{1,1}$.

Step 6. Update $G_2$: for each asset $H^j$, generate virtual triangles $G_{2,i,j}$ using Eq.(52) as follow and add them to $G_2$ $$G_{2,i,j} = V_t^1(\Gamma \cdot H^{i,j}, W_1(A_2)) \tag{101}$$

Step 7. Construct $G_3$:

For every component $W_i(A_2)$ except $\Delta(A_0)$, generate triangle correspondence between them as $$M_{c,i} = M_{c,i}(W_i(A_2), \Delta(A_0)) \tag{102}$$

A triangle pair $(i,j) \in M_{c,i}(W_i(A_2), \Delta(A_0))$ is selected for triangle i on $W_i(A_2)$ and triangle j on $\Delta(A_0)$. If the distance between the centroid of the triangle i and the centroid of the triangle j is smaller than $\delta(W_i, W_j)$ defined in Eq.(X4).

Construct $$G_3 = \bigcup_i M_{c,i}(W_i(A_2), \Delta(A_0)) \tag{103}$$

4.2.2.4. Correspondence Setup

As presented in Eq. (32), the deformation transfer algorithm relies on the triangle correspondence in Eq. (26). This section introduces how to setup the correspondence $M_c(S_0, A_0)$ in Eq. (77) with the following assumptions:

face region $\Delta(A_0)$ of the virtual character is transferred by the rigid transformation I in Eq. (73), such that $S_0$ and $\Delta(A_0)$ are of the same scale and under the same coordinate system.

The correspondence is setup based on the face region of the virtual character, i.e., $M_c(S_0, A_0)=M_c(S_0, \Delta(A_0))$ The correspondence $M_c(S_0, \Delta(A_0))$ in Eq. (77) is setup in two steps:

Step 1: as introduced in section 2.5.2, a non-rigid registration is applied to deform the 3DMM base surface $S_0$ into $\tilde{S}$, such that all vertices $V(\tilde{S})$ are close to the virtual character's face region $\Delta(A_0)$.

Step 2: the correspondence in Eq. (77) becomes the correspondence between $\tilde{S}$ and $\Delta(A_0)$, i.e. $M_c(S_0, \Delta(A_0))=M_c(\tilde{S}, \Delta(A_0))$.

In Step 1, $\tilde{S}$ is solved interactively. With $\tilde{S}_0=S_0$, the l-th iteration generates $\tilde{S}_l$ by deforming $\tilde{S}_{l-1}$. Accordingly, $E_0$ in Eq. (23), $E_1$ in Eq. (24) and $E_2$ in Eq. (25) can be rewritten as:

$$E_0(\tilde{S}_l) = \sum_{i=1}^{|F(S)|} \sum_{j \in \Theta_{f,i}(S)} \left\| T_i(\tilde{S}_{l-1}, \tilde{S}_l) - T_j(\tilde{S}_{l-1}, \tilde{S}_l) \right\|^2 \tag{20}$$

-continued $$E_1(\tilde{S}_l) = \sum_{i=1}^{|F(S)|} \left\| T_i(\tilde{S}_{l-1}, \tilde{S}_l) - I_3 \right\|^2$$

$$E_2(\tilde{S}_l) = \sum_{i=1}^{|V(S)|} \left\| V_i(\tilde{S}_l) - c_i \right\|^2$$

In each iteration, the feature correspondence between $\tilde{S}$ and $A$ ($A_0$) can be enforced via adding the constraints on the closest valid point $c_i$, i.e.

$\tilde{S}_i$'s feature vertices $L_v(\tilde{S}_1)$ should deform to be $\Delta(A_0)$'s feature vertices $L_v(A_0)$, $$L_{v,k}(\tilde{S}_l) = L_{v,k}(A_0), k = 1, 2, \ldots, |L_v(A_0)| \tag{21}$$

$\tilde{S}_i$'s feature curves $L_c(\tilde{S}_1)$ should deform into $\Delta(A_0)$'s feature curves $L_c(A_0)$, i.e., for any vertex $V_i(\tilde{S}_1)$ on a feature curve $L_{c,k}(\tilde{S}_l)$, its closest valid point $c_i$ should be on the corresponding feature curve $L_{c,k}(A_0)$ $$c_i \in L_{c,k}(A_0), \text{ if } V_i(\tilde{S}_l) \in L_{c,k}(\tilde{S}_l) \tag{22}$$

$\tilde{S}_i$'s feature regions $L_r(\tilde{S}_1)$ should deform into $\Delta(A_0)$'s feature regions $L_r(A_0)$, i.e., for any vertex $V_i(\tilde{S}_1)$ from the region $L_{r,k}(\tilde{S}_l)$, its closest valid point $c_i$ should be from the corresponding region $L_{r,k}(A_0)$ $$c_i \in L_{r,k}(A_0), \text{ if } V_i(\tilde{S}_l) \in L_{r,k}(\tilde{S}_l) \tag{23}$$

Following Eq. (22), the l-th iteration can be formulated as:

$$\tilde{S}_l = \underset{V(\tilde{S}_l)}{\operatorname{argmin}} \quad E(\tilde{S}_l) = E(V(\tilde{S}_l)) = \lambda_0 \cdot E_0(\tilde{S}_l) + \lambda_1 \cdot E_1(\tilde{S}_l) + \lambda_2 \cdot E_2(\tilde{S}_l) + \lambda_5 \cdot E_5$$

$$\text{s.t. } L_{v,k}(\tilde{S}_l) = L_{v,k}(A_0), \ k = 1, 2, \ldots, |L_v(A_0)|.$$

$$c_i \in L_{c,k}(A_0), \text{ if } V_i(\tilde{S}_l) \in L_{c,k}(\tilde{S}_l)$$

$$c_i \in L_{r,k}(A_0), \text{ if } V_i(\tilde{S}_l) \in L_{r,k}(\tilde{S}_l)$$

where $\lambda_i$ are hyper parameters defined in section 4.1.2.

$L_{v,k}(\cdot), L_{c,k}(\cdot), L_{r,k}(\cdot)$ are manually labelled data defined in section 4.2.1.

$c_i$ is the closest valid point for $V_i(\tilde{S}_l)$ on the face region $\Delta(A_0)$ used in Eq. (25)

$E_0(\tilde{S}_l), E_1(\tilde{S}_l), E_2(\tilde{S}_l)$ are defined in Eq. (104).

$E_5$ is the vertex symmetric constraint $$E_5(\tilde{S}_l) = \sum_{(i,j) \in M_s(S_0)} \left( \left\| E_x \cdot V_i(\tilde{S}_l) - V_j(\tilde{S}_l) \right\|^2 \right) \tag{25}$$

where $M_s(S_0)$ is the set of symmetric pairs in Eq. (70). Eq. (108) can be linearly reformulated as follow and solved following section 4.1.9.

$$\tilde{S}_l = \underset{V(\tilde{S}_l)}{\operatorname{argmin}} \quad E(\tilde{S}_l) = \left\| A_{x,0} \cdot V_x(\tilde{S}_l) - b_{x,0} \right\| + \left\| A_{yz,0} \cdot V_{yz}(\tilde{S}_l) - b_{yz,0} \right\| \tag{26}$$

$$\text{s.t. } L_{v,k}(\tilde{S}_l) = L_{v,k}(A_0), k = 1, 2, \ldots, |L_v(A_0)|.$$

$$c_i \in L_{c,k}(A_0), \text{ if } V_i(\tilde{S}_l) \in L_{c,k}(\tilde{S}_l)$$

$$c_i \in L_{r,k}(A_0), \text{ if } V_i(\tilde{S}_l) \in L_{r,k}(\tilde{S}_l)$$

where $V_x$ is the x-component of V $V_{yz}$ is the y-component and z-component of V $A_{x,0}$ and $A_{yz,0}$ are matrices with $|V(S_0)|$ columns. $A_{x,0} \neq A_{yz,0}$ due to Eq. (127) and Eq. (128)

$b_{x,0}$ and $b_{yz,0}$ are matrices of the same number of rows as $A_{x,0}$ and $A_{yz,0}$ Increasing $\lambda_2$ after each iteration may produce better results. The optimization will stop when $\tilde{S}_l$ converge, i.e., $\|\tilde{S}_l - \tilde{S}_{l-1}\|$ is small enough (e.g., smaller than a threshold value). If a vertex $V_i(\tilde{S}_l)$ is not a feature vertex, the closest valid point $c_i$ cannot be limited to be a vertex of $\Delta(A_0)$; otherwise, $\tilde{S}$ may contain lots of irregular triangles. In general, if a vertex $V_i(\tilde{S}_l)$ is not a feature vertex in Eq. (105), it is assumed that $c_i$ locates on an edge of $\Delta(A_0)$ or within a triangle of $\Delta(A_0)$.

In Step 2, a triangle pair $(i,j) \in M_c(S_0, A_0) = M_c (\tilde{S}, \Delta(A_0))$ is selected if the centroid of the j-th triangle $F_j(\tilde{S})$ and the i-th triangle $F_i(\Delta(A_0))$ are close enough (e.g., having a distance smaller than a threshold value) and the angle between their normals is less than 90°. The feature correspondence between $\tilde{S}$ and $\Delta(A_0)$ help preventing wrong triangle pairs.

4.2.3. Deformation Transfer

This section introduces how deformation transfer $\mathcal{F}(\cdot)$ in Eq. (83) generates the deformed models $H_{id,k}$ and $H_{exp,k,l}$ from the model H in Eq. (73). To better illustrate the results, the deformed expression model is denoted as $H_{expression\_name}$ instead of $H_{exp,k,l}$ as (24)

$$H_{expression\_name} = \mathcal{F}(H, S_0, S_{expression\_name}) \tag{27}$$

where $S_{expression\_name}$ is l-th 3DMM expression as $S_{expression\_name} = S_0 + S_{exp,l}$. Deformation transfer $\tilde{H} = \mathcal{F}(H, S_0, \tilde{S})$ is to deform H into $\tilde{H}$ using the deformation gradient from $S_0$ to $\tilde{S}$. Given a set of deformation constraints, the one-step deformation transfer that directly deforming the whole model H into $\tilde{H}$ may not generate desired results, because the deformation constraints for the non-face regions will affect the deformation of the face region. A new solution is proposed to deform two regions of H separately, i.e., face region $\Delta(A_0)$ and non-face region $H - \Delta(A_0)$. A two-stage deformation transfer is implemented to first fix the non-face region $H - \Delta(A_0)$ and deform only the face region $\Delta(A_0)$ into $\tilde{\Delta}$, then fix the deformed face region $\tilde{\Delta}$ and deform only the non-face region $H - \tilde{\Delta}$ into $\tilde{H}$. Compared to the one-stage algorithm, the two-stage algorithm can generate more accurate deformation for the face region, as the deformation constraints for the non-face region will not affect the face region but affect only the non-face region.

The two-stage deformation transfer algorithm is formulated as follows

Step 1: deform the face region of the virtual character $\Delta=\Delta(A_0)$ while other regions of H are fixed $$\hat{H} = \mathcal{F}(H, S_0, \tilde{S}) \text{ s.t. } \hat{H} - \Delta(\hat{H}) = H - \Delta(H) \quad (28)$$

Step 2: deform $\hat{H}$ while keeping its face region fixed as $$\bar{H} = \mathcal{F}(\hat{H}, S_0, \tilde{S}) \text{ s.t. } \Delta(\bar{H}) = \Delta(\hat{H}) \quad (29)$$

According to Eq. (31), the deformation transfer in Eq. (112) and Eq. (113) can be formulated into $$\hat{H} = \underset{V(\hat{H})}{\arg\min} E(\hat{H}) = \sum_{i=6}^{13} \lambda_i E_i(\hat{H}) \quad (30)$$

$$\text{s.t. } V_i(\hat{H}) = V_i(H), \forall i \in L_v^{fix}(H) \cup \rho_v(\Delta, S_0, \tilde{S}) \cup \bar{K}_{\Delta,v}.$$

$$\bar{H} = \underset{V(\bar{H})}{\arg\min} E(\bar{H}) = \sum_{i=14}^{20} \lambda_i E_i(\bar{H}) \quad (31)$$

$$\text{s.t. } V_i(\bar{H}) = V_i(\hat{H}), \forall i \in L_v^{fix}(H) \cup \rho_v(\Delta, S_0, \tilde{S}) \cup \bar{K}_{\Delta,v}.$$

where $\lambda_i$ are hyper parameters defined in section 4.1.2

$\bar{K}_{\Delta,v}$ and $K_{\Delta,v}$ are vertices' indices defined in Eq. (80)

The fixed vertex constraint (be detailed in section 4.2.3.1)

$$V_i(\hat{H}) = V_i(H), \forall i \in L_v^{fix}(H) \cup \rho_v(H, S_0, \tilde{S}) \quad (32)$$

is defined by the manual labelled vertices $$L_v^{fix}(H)$$

in Eq. (88), and the fixed vertices identified from the deformation $\rho_v(H, S_0, \tilde{S})$ in Eq. (4) (implemented in section 4.1.8).

$E_6$ is reformulated from Eq. (32) as $$E_6(\hat{H}) = \sum_{(i,j)\in M_c} \|T_j(H, \hat{H}) - T_i(S_0, \tilde{S})\|^2 \quad (33)$$

where $M_c$ is triangle correspondence defined in Eq. (77).

$E_7$ and $E_{14}$ are reformulated from Eq. (33) as $$E_7(\hat{H}) = \sum_{j\in \bar{M}_c} \|T_j(H, \hat{H}) - I_3\|^2 \quad (34)$$

$$E_{14}(\bar{H}) = \sum_{j\in \bar{K}_{\Delta,f}} \|T_j(\hat{H}, \bar{H}) - I_3\|^2 \quad (35)$$

where $I_3$ is defined in Eq. (1), $\bar{K}_{\Delta,f}$ is defined in Eq. (81), and $\bar{M}_c$ is defined in Eq. (82).

66

$E_8$ is the trimming curve constraint (be detailed in section 4.2.3.2)

$$E_8(\hat{H}) = \sum_{(a,b,c,d,e,f,g)\in C_1} \|bV_e(\hat{H}) + cV_f(\hat{H}) + dV_g(\hat{H}) - V_a(\hat{H})\|^2 \quad (36)$$

where $C_1$ is defined in Eq. (75).

$E_9$ and $E_{15}$ are the Laplacian constraints (be detailed in section 4.2.3.3)

$$E_9(\hat{H}) = \sum_{i\in K_{\Delta,v}} \|\mathcal{L}(V_i(\hat{H})) - \mathcal{L}(V_i(H))\|^2 \quad (37)$$

$$E_{15}(\bar{H}) = \sum_j \lambda_{13,j} \sum_{i\in \bar{K}_{\Delta,v,j}} \|\mathcal{L}(V_i(\bar{H})) - \mathcal{L}(V_i(H))\|^2 \quad (38)$$

where $\mathcal{L}$ is the Laplacian operator.

$\bar{K}_{\Delta,v,j}$ is the set of non-face vertices from the j-th component in Eq. (81).

$\lambda_{13,j}$ are hyper parameters.

$E_{10}$ is the feature curve closing constraint (be detailed in section 4.2.3.4)

$$E_{10}(\hat{H}) = \quad (39)$$
$$\sum_{(i,j)\in\{(0,1),(2,3),(4,5)\}} \left( \sum_{(a,b,c,d,e)\in N(L_{c,i}(H),L_{c,j}(H))} \|b\cdot V_c(\hat{H}) + d\cdot V_e(\hat{H}) - V_a(\hat{H})\| \right) \delta(L_{c,i}(\tilde{S}), L_{c,j}(\tilde{S}))$$

where N $(L_{c,i}(H), L_{c,j}(H))$ is the curve mapping, and $\delta$ $(L_{c,i}(\tilde{S}), L_{c,j}(\tilde{S}))$ is curve overlapping defined in Eq. (9) (implemented in section 4.1.7).

$E_{11}$ and $E_{16}$ enable feature preserving (be detailed in section 4.2.3.8)

$$E_{11}(\hat{H}) = \sum_{j\in G_{1,0}} \|T_j(H, \hat{H}) - I_3\|^2 \quad (40)$$

$$E_{16}(\bar{H}) = \sum_{j\in G_{1,1}} \|T_j(\hat{H}, \bar{H}) - I_3\|^2 \quad (41)$$

where $G_{1,0}$ and $G_{1,1}$ are virtual triangles in Eq. (73)

$I_3$ is defined in Eq. (1).

$E_{12}$ is to enable axis-align deformation gradient scaling (be detailed in section 4.2.3.5)

$$E_{12}(\hat{H}) = \tag{42}$$

$$\sum_{(i,j,k,s_1,s_2,s_3)\in M_g} \left\| T_{(L_{v,i}(H),L_{v,j}(H),L_{v,k}(H))}(H,\hat{H}) - E_{(s_1,s_2,s_3)}\left(T_{(L_{v,i}(S_0),L_{v,j}(S_0),L_{v,k}(S_0))}(S_0,\tilde{S})\right) \right\|^2$$

where $M_g$: scaling triangle data defined in Eq. (85).

$T(L_{v,i},L_{v,j},L_{v,k})$: deformation gradient of a triangle by i-th, j-th, and k-th landmarks.

$E_{(s_1,s_2,s_3)}$: scaling operation on the deformation gradient defined in Eq. (6) (implemented as Eq. (58) in section 4.1.6).

$E_{13}$ and $E_{17}$ are the vertex symmetric constraints (be detailed in section 4.2.3.7)

$$E_{13}(\hat{H}) = \rho_s(S_0,\tilde{S})\cdot\left(\sum_{\substack{(i,j)\in M_s(A_0)\\ i,j\in K_{\Delta,v}-L_v^{fix}(H)\cup\rho_v(H,S_0,\tilde{S})}}\left(\|E_x\cdot V_i(\hat{H})-V_j(\hat{H})\|^2\right)\right) \tag{43}$$

$$E_{17}(\tilde{H}) = \rho_s(S_0,\tilde{S})\cdot\left(\sum_{\substack{(i,j)\in M_s(A_0)\\ i,j\in \overline{K}_{\Delta,v}-L_v^{fix}(H)\cup\rho_v(H,S_0,\tilde{S})}}\left(\|E_x\cdot V_i(\tilde{H})-V_j(\tilde{H})\|^2\right)\right) \tag{44}$$

where $\rho_s(S_0,\tilde{S})$ is defined in Eq. (72) to check whether S keeps the symmetric vertex pairs from $S_0$.

$M_s(A_0)$ includes all symmetric pairs of vertices defined in Eq. (74).

$E_x$ is defined in Eq. (2).

$$L_v^{fix}(H)\cup\rho_v(H,S_0,\tilde{S})$$

is the set of fixed vertices from Eq. (116).

$K_{\Delta,f}$ and $\overline{K}_{\Delta,f}$ are defined in Eq. (81).

$E_{18}$ and $E_{19}$ enables gradient propagation and self-intersection avoidant (be detailed in section 4.2.3.6)

$$E_{18}(\tilde{H}) = \delta(L_{c,4}(\tilde{S}),L_{c,5}(\tilde{S}))\cdot\sum_{j\in G_{0,0}}\left\|T_j(\hat{H},\tilde{H})-I_3\right\|^2 \tag{45}$$

$$E_{19}(\tilde{H}) = \sum_{j\in G_{0,1}\cup G_2}\left\|T_j(\hat{H},\tilde{H})-I_3\right\|^2 \tag{46}$$

where $G_{0,0}$, $G_{0,1}$ and $G_2$ are virtual triangles in Eq. (73).

$I_3$ is defined in Eq. (1).

$\delta(L_{c,4}(\tilde{S}),L_{c,5}(\tilde{S}))$ indicates whether the mouth is close or not in Eq. (62).

$E_{20}$ enables deformation of the non-facial region following the deformation of the facial region $$E_{20}(\tilde{H}) = \sum_{(i,j)\in G_3}\left\|T_j(H,\hat{H})-T_i(\hat{H},\tilde{H})\right\|^2 \tag{47}$$

where $G_3$ is defined in Eq. (103).

Eq.(X13) and Eq.(X14) can be linearly reformulated as follows and solved according to section 4.1.9.

$$\hat{H} = \arg\min_{V(\hat{H})} E(\hat{H}) = \left\|A_{x,1}\cdot V_x(\hat{H})-b_{x,1}\right\| + \left\|A_{yz,1}\cdot V_{yz}(\hat{H})-b_{yz,1}\right\| \tag{132}$$

s. t. $V_i(\hat{H}) = V_i(H), \forall\, i \in L_v^{fix}(H)\cup\rho_v(\Delta,S_0,\tilde{S})\cup\overline{K}_{\Delta,v}$.

$$\tilde{H} = \arg\min_{V(\tilde{H})} E(\tilde{H}) = \left\|A_{x,2}\cdot V_x(\tilde{H})-b_{x,2}\right\| + \left\|A_{yz,2}\cdot V_{yz}(\tilde{H})-b_{yz,2}\right\| \tag{133}$$

s. t. $V_i(\tilde{H}) = V_i(\hat{H}), \forall\, i \in L_v^{fix}(\hat{H})\cup\rho_v(\Delta,S_0,\tilde{S})\cup K_{\Delta,v}$.

where $V_x$ is the x-component of V.

$V_{yz}$ is the y-component and z-component of V.

$A_{x,i}$ and $A_{yz,i}$ are matrices with $|V(H)|$ columns. $A_{x,i}\neq A_{yz,i}$ due to Eq.(X31) and Eq.(X32).

$b_{x,i}$ and $b_{yzi}$ are matrices of the same number of rows as $A_{x,i}$ and $A_{yz,i}$.

Notes:

Eq.(X31) and Eq.(X32) add different constraints to x, and yz components, i.e. x values opposite and yz values remain the same for each symmetric vertex pair. Eq. (X31) and Eq.(X32) can be linearly reformatted into the following form: $E_k=\|A_{k,x}\cdot V_x-b_{k,x}\|+\|A_{k,yz}\cdot V_{yz}-b_{k,yz}\|$ Except for Eq.(X31) and Eq.(X32), each of the other energy term adds the same constraints to x,y,z components. It can be linearly reformulated into $E_k=\|A_k\cdot V_{xyz}-b_k\|$, where $A_k$ is a matrix with $|V(H)|$ columns, $V_{xyz}$ is of shape $|V(H)|\times3$, and $b_k$ is a matrix with 3 columns. To work with Eq.(X31) and Eq.(X32), $E_k$ can be reformulated into $E_k=\|A_k\cdot V_{xyz}-b_k\|=\|A_{k,x}\cdot V_x-b_{k,x}\|+\|A_{k,yz}\cdot V_{yz}-b_{k,yz}\|$ with $A_{k,x}=A_{k,yz}=A_k$ In Eq. (132) and (133), $A_{x,i}$, $A_{yz,i}$, $b_{x,i}$, $b_{yz,j}$ is the vertical concatenation of all $\lambda_k A_{k,x}$, $\lambda_k A_{k,yz}$, $\lambda_k b_{k,x}$, and $\lambda_k b_{k,yz}$, respectively. According to Eq.(114), k=6,7, . . . ,13 for i=1. According to Eq.(115), k=14,15, . . . ,20 for i=2.

4.2.3.1. Fixed Vertex Constraint

The fixed vertex constraint in Eq.(116) contains two parts: manual labelled vertices $$L_v^{fix}(H)$$

in Eq.(X16), and the fixed vertices identified from the deformation $\rho_v(\Delta,S_0,\tilde{S})$ in Eq.(4) (implemented in section 4.1.8). For globally deformed models S such as some PCAs, all triangles of $S_0$ deform into $\tilde{S}$, and no fixed vertex will be identified, i.e., $\rho_v(\Delta,S_0,\tilde{S})=\emptyset$. For local deformed models $\tilde{S}$, such as the $S_{eye\_blink\_L}$, fixed vertices will be identified, i.e., $\rho_v(\Delta,S_0,\tilde{S})\neq\emptyset$.

4.2.3.2. Trimming Curve Constraint

The term in Eq.(120) tries to maintain the same vertices' relationship following Eq.(76), such that the post-processing $\Omega_2(\cdot)$ in Eq.(84) can extract the correct deformed virtual character model. The deformed model consists of two parts:

the virtual character face model $\tilde{A}_1$ and the asset $\tilde{H}^{i,j}$. The term in Eq.(120) adds the following constraint $$V_{c_1,k,1}(\tilde{A}_1) = c_{1,k,2}V_{c_1,k,5}(\tilde{A}_1) + c_{1,k,3}V_{c_1,k,6}(\tilde{A}_1) + c_{1,k,4}V_{c_1,k,7}(\tilde{A}_1) \quad (134)$$

where $c_{i,k,1}$ are defined in Eq.(75). According to section 4.2.2.2, the topology of $\tilde{A}_1$ may be different from the original virtual character face model $A_0$, but $\tilde{A}_0$ can be constructed from $\tilde{A}_1$ such that $\tilde{A}_0$ has the same topology as $A_0$ as $$\bar{A}_0 = \tilde{A}_1 - K_1 - K_2 + K_3 \quad (135)$$

$$\tilde{A}_0 = \Gamma^{-1}\bar{A}_0$$

The term in Eq.(120) and Eq.(134) will make sure that $\tilde{A}_0$ and $\tilde{A}_1$ are of the same shape, as such $\tilde{A}_0$ become a deformed model of $A_0$

4.2.3.3. Laplacian Constraint

The terms Eq.(121) and Eq.(122) add smoothness constraint to the deformation. The term Eq.(122) also help removing irregular deformations. The virtual triangles $G_{0,0}$ in Eq.(X18) connects the non-face region to the face region. The non-face region's vertices connecting to the virtual triangles $G_{0,0}$ in Eq.(X18) deform following the connected vertices from the face region. The neighboring triangles of these vertices is constrained by the term in Eq.(119). Without the term Eq.(122), it may generate irregular deformation. The Laplacian term can remove the irregular deformation and improve the smoothness of the teeth region. However, the weight for the Laplacian cannot be too large, as it will limit the desired deformation.

4.2.3.4. Feature Curve Closing Constraint

The term in Eq. (123) add constraints based on three curve pairs $L_{c,i}$, $L_{c,j}$ in FIG. 11(*d*) with (i, j)∈ {(0,1), (2,3), (4,5)}. Each curve pair controls the closing of a face feature $L_{c,0}$, $L_{c,1}$ for the right eye closing.

$L_{c,2}$, $L_{c,3}$ for the left eye closing.

$L_{c,4}$, $L_{c,5}$ for the mouth closing

As defined in Eq. (62), the output of the curve overlapping $\delta(\cdot)$ is a binary. Thus, each closing constraint Eq. (123) will be activated if and only if the corresponding feature is close on the source deformation, i.e. $\delta(L_{c,i}(\tilde{S}), L_{c,j}(\tilde{S}))=1$. For example, $S_{eye\_blink\_L}$'s right eye is open while the left eye and the mouth are close, i.e.

$$\delta(L_{c,0}(S_{eye\_blink\_L})L_{c,1}(S_{eye\_blink\_L})) = 0$$

$$\delta(L_{c,2}(S_{eye\_blink\_L})L_{c,3}(S_{eye\_blink\_L})) = 1$$

$$\delta(L_{c,4}(S_{eye\_blink\_L})L_{c,5}(S_{eye\_blink\_L})) = 1$$

$S_{eye\_blink\_R}$'s right eye and mouth are close while the left eye is open, i.e.

$$\delta(L_{c,0}(S_{eye\_blink\_R})L_{c,1}(S_{eye\_blink\_R})) = 1$$

$$\delta(L_{c,2}(S_{eye\_blink\_R})L_{c,3}(S_{eye\_blink\_R})) = 0$$

$$\delta(L_{c,4}(S_{eye\_blink\_R})L_{c,5}(S_{eye\_blink\_R})) = 1$$

$S_{jaw\_open}$'s eyes and mouth are open, i.e.

$$\delta(L_{c,0}(S_{jaw\_open}), L_{c,1}(S_{jaw\_open})) = 0$$

$$\delta(L_{c,2}(S_{jaw\_open}), L_{c,3}(S_{jaw\_open})) = 0$$

$$\delta(L_{c,4}(S_{jaw\_open}), L_{c,5}(S_{jaw\_open})) = 0$$

In general, if a face feature, the eye or the mouth, on the source deformation is close, the corresponding face feature on the target virtual character model should be also close, i.e.

$$\delta(L_{c,i}(\hat{H}), L_{c,j}(\hat{H})) = 1, \quad \text{if } \delta(L_{c,i}(\tilde{S}), L_{c,j}(\tilde{S})) = 1 \quad (48)$$

According to Eq. (61) and Eq. (62), $\delta(L_{c,i}(\hat{H}), L_{c,j}(\hat{H}))=1$ can be achieved by $$\min \sum_{(a,b,c,d,e)\in N(L_{c,i}(H),L_{c,j}(H))} \|b\cdot V_c(\hat{H}) + d\cdot V_e(\hat{H}) - V_a(\hat{H})\|^2 \quad (49)$$

Combining Eq. (136) and Eq. (137) gives Eq. (123).

4.2.3.5. Axis-Align Deformation Gradient Scaling

This section details the term in Eq.(X24), which is to enhance the deformation gradients. Note that $\lambda_{12}$ will be set to 0 for expressions, and $\lambda_{12}>0$ for PCAs, as deformation gradients do not need to be enhanced for expressions.

For all $(i,j)\in M_c$ in Eq.(117), j-th triangle of the virtual character model tries to keep the same deformation gradient as the i-th triangle of the 3DMM base surface. However, in most of the cases, $T_j(H, \hat{H})\neq T_i(S_0, \tilde{S})$ in the deformed virtual character. In other words, the gap may be minimized, but not eliminated. As a result, the deformation of virtual character's local and global features may be compromised. As such, the virtual character's global and local features need be enhanced, for example, The virtual character mode $A_0$ may be wider than the 3DMM base surface $S_0$ horizontally. The virtual character thus needs to be deformed more horizontally. If $\tilde{S}$ shrinks horizontally by 2%, the virtual character $\tilde{A}_0$ can shrink horizontally by 3%.

The local face features, such as the eyes, the mouth, and the nose may be enhanced. Such enhancement can generate bigger virtual character eyes, longer virtual character nose, etc.

Such enhancement is difficult to achieve using existing triangles from the virtual character model. Virtual feature triangles with scaling parameters in Eq.(85) can be introduced to achieve such enhancement. With $\eta_x=1$, the term in Eq.(X24) helps to keep the global deformation. With $\eta_x>1$, the term in Eq.(X24) helps to enhance the global deformation. As $\eta_x$ increase from 1 to 5, the virtual character model receives more deformation gradient horizontally. The term in Eq.(X24) can also help to keep or enhance the local face features.

4.2.3.6. Gradient Propagation and Self-Intersection Avoidant

This section will detail the terms in Eq.(X17) and Eq. (X18). Without these two terms, the non-face regions disconnecting from the face region, such as eyeballs in FIG. 10 first column and all assets H$^i$, will not deform due to the following three facts.

Deformation transfer $\tilde{H}=\mathcal{F}(H, S_0, \tilde{S})$ deforms H into H using the deformation gradient from $S_0$ to $\tilde{S}$. The deformation gradient from $S_0$ to $\tilde{S}$ is transferred based on the on the triangle correspondence in Eq.(77). During the optimization, the deformation gradient from $S_0$ to $\tilde{S}$ only affect the face region in Eq.(117) and Eq.(X24).

The term in Eq.(119) tries to fix all triangles from the non-face region.

The term in Eq.(122) tries to fix the Laplacian coordinates for the non-face region, i.e., tries to maintain the original shape.

The virtual triangles $G_0 \cup G_2$ in Eq.(X17) and Eq.(X18) connect the non-face region to the face region, as such, when the face region deforms, the non-face region will deform accordingly. In FIG. 10 first column, the virtual triangles between the eyeballs and the face region will drive the deformation of the eyeballs following the deformation of the face region.

Without the terms in Eq.(X17) and Eq.(X18), the non-face regions connecting to the face region, such as the interior mouth region (the green region in FIG. 9(a)), can deform without virtual triangles. In FIG. 9(a), the deformation gradient will propagate from the lip's regions to the interior mouth region via $K_4$ region. The interior mouth region may intersect with the face region (the blue region in FIG. 9(a)). In FIG. 9(a), there is a gap between the green region and the blue region before the deformation. However, when the virtual character deforms without the terms in Eq.(X17) and Eq.(X18), the two regions may intersect with each other. With the terms in Eq.(X17) and Eq.(X18), the virtual triangles (yellow triangles in FIG. 9(a)) maintain the gap between the two regions, thus eliminate the intersection between the two regions. In FIG. 10 first column, a small weight $\lambda_{18}=\lambda_{19}=0.01$ is unable to prevent the intersection (the first row of FIG. 10). As the weight $\lambda_{18}=\lambda_{19}$ increases, the interior regions are pushed away from the face region (the second and the third rows of FIG. 10). Besides increasing weights $\lambda_{18}=\lambda_{19}$, another way to prevent the self-intersection is increasing the hyper parameter $\delta_1$ to increase the number of virtual triangles.

Noted that the set of virtual triangles $G_0$ is separated into $G_{0,1}$ and $G_{0,0}$(FIG. 9(b)). Virtual triangles in $G_{0,0}$ connect the upper region of the mouth to the lower region of the mouth (FIG. 8(e)(f)). Forcing these triangles to remain unchanged during deformation will prevent the mouth from opening. Thus, if the mouth is open on the source deformation, i.e. $\delta(L_{c,4}(\tilde{S}),\ L_{c,5}(\tilde{S}))=0$, virtual triangles in $G_{0,0}$ should be ignored (as formulated in Eq.(X17), and see the correct result in FIG. 9(c)). Instead, replacing Eq.(X17) with $$E_{18}(\hat{H}) = \sum_{j \in G_{0,0}} \left\| T_j(\hat{H}, \hat{H}) - I_3 \right\|^2 \tag{138}$$

generates the wrong deformation results in FIG. 9(d). In FIG. 9(d), triangles $G_{0,0}$ connecting upper teeth and lower teeth try to remain the original shape following Eq.(X20). As a result, the upper teeth are forced to connected to the lower teeth.

4.2.3.7. Vertex Symmetric Constraint

This section details the symmetric constraints in Eq.(X31) and Eq.(X32). According to Eq.(72), $\rho_s(S_0,\ \tilde{S})$ is a binary, and is non-zero if an only if the deformation S remains symmetric as $S_0$. As such the symmetric constraints are applied for PCAs and some expressions. Assume $$\rho_{expression} = \rho_s(S_0,\ S_{expression}), \tag{139}$$

the switches for some expressions are $$\rho_{eye\_blink\_L} = \rho_{eye\_blink\_R} = \rho_{mouth\_left} = \rho_{mouth\_right} = \rho_{jaw\_left} = \rho_{jaw\_right} = 0$$

$$\rho_{jaw\_open} = \rho_{cheek\_puff} = 1.$$

If $\rho_s(S_0,\ \tilde{S})=1$, for each symmetric pair $(i,j) \in M_s$, the symmetric constraint is applied if and only if both vertices are not fixed, i.e.

$$i,\ j \notin L_v^{fix}(H) \cup \rho_v(H,\ S_0,\ \tilde{S}).$$

Without using the vertex symmetric constraint in Eq. (X31), the deformation result may be incorrect, especially when using a large scaling value for the axis-align deformation gradient scaling term in Eq.(X24).

4.2.3.8. Feature Preserving Constraint

In this section, customized virtual characters reconstructed based on Eq.(37) will be used to illustrate the effects of the terms Eq.(124) and Eq.(125). Both terms try to fix the triangles from $G_1=\{G_{1,0},\ G_{1,1}\}$. According to section 4.1.5.2, these triangles are constructed along the feature curve, and both terms try to achieve Eq.(X28), which tries to fix the all triangles along the curve thus fix the whole feature curve.

It is demonstrated how to preserve the features shown in FIG. 13, i.e., Eq.(124) for preserving the mouth shape and Eq.(125) for preserving the pupil shape. Since virtual character's mouth should deform for expressions such as $H_{jaw\_open}$, $H_{mouth\_left}$, and $H_{mouth\_right}$, $\lambda_{11}=0$ is set to disable Eq.(124) for these expressions. This can be achieved by checking whether the mouth region overlaps the deformed region. For other expressions and PCAs, $\lambda_{11}>0$ is used. Setting $\lambda_{11}=0$ for PCAs generates different mouth shapes for different customized virtual characters. Similarly, $A_{16}$ controls the term Eq.(125). With $\lambda_{16}=0$, the original circular pupils in the mean virtual character model may become oval shapes. With $\lambda_{16}=3$, the pupils can maintain the circular shapes.

4.2.4. Model Post-Processing

According to Eq.(78) and Eq.(79), a deformed model of H can be formulated as $$\hat{H} = \Omega_1(H) = \{\tilde{A}_1,\ \{\Gamma(\hat{H}^{i,j})\}\}, \tag{140}$$

where $\tilde{A}_1$ is the deformed model of $\tilde{A}_1$, and $\Gamma(\hat{H}^{i,j})$ is the deformed model of $\Gamma(H^{i,j})$. The models can be constructed as $$\tilde{A}_0, \hat{H}^{i,j} = \Omega_2(\hat{H}), \tag{141}$$

where $\Omega_2$ is the post-processing to extract $\tilde{A}_0$ following Eq.(135) and $\hat{H}^{i,j}$ as a deformed model of $H^{i,j}$. As discussed in section 4.2.3.2, $\tilde{A}_0$ is a deformed model of $A_0$. As such, Eq.(84) gives the desired outputs for virtual character customization.

Example Computing Device

Figure 19:
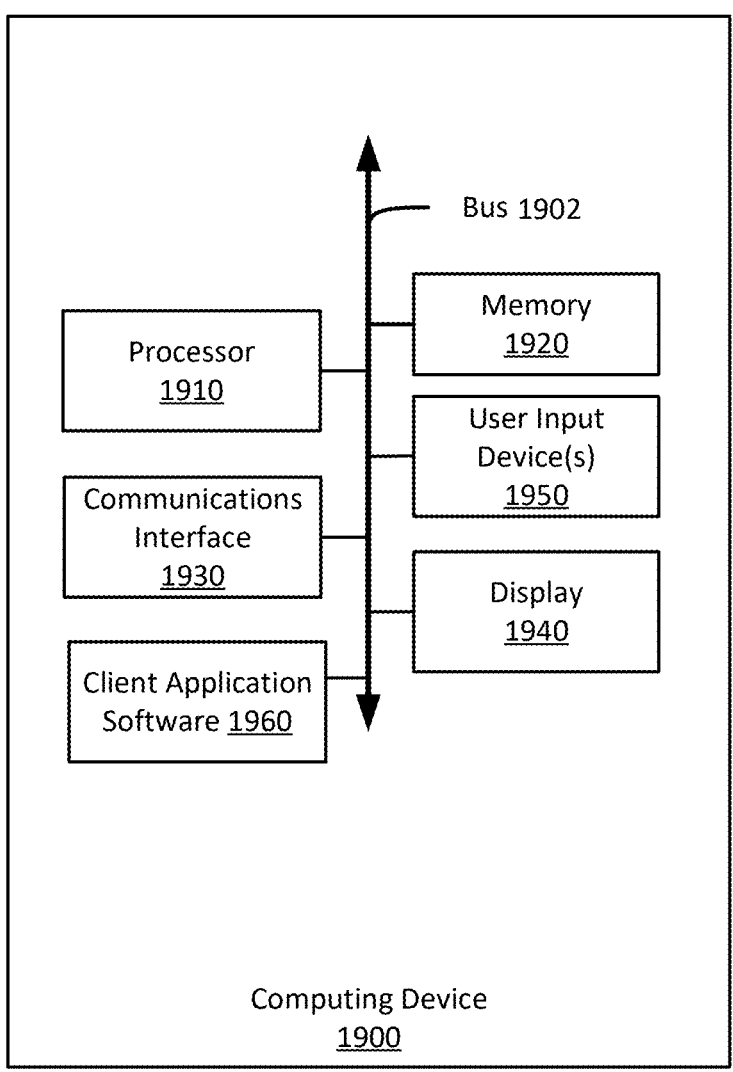
FIG. 19 shows an example computing device suitable for performing certain aspects of the present disclosure.

Referring now to FIG. 19, FIG. 19 shows an example computing device 1900 suitable for performing certain aspects of the present disclosure. The example computing device 1900 includes a processor 1910 which is in communication with the memory 1920 and other components of the computing device 1900 using one or more communications buses 1902. The processor 1910 is configured to execute processor-executable instructions stored in the memory 1920 to perform one or more processes for enriching meeting assets for video conferencing, such as part or all of the example processes 1400-1800 described above with respect to FIGS. 14-18. For example, the client application software 1960 provided on the computing device 1900 may provide instructions for performing one or more steps of the processes 1400-1800 for generating virtual characters. The computing device, in this example, also includes one or more user input devices 1950, such as a keyboard, mouse, touchscreen, video input device (e.g., one or more cameras), microphone, etc., to accept user input. The computing device 1900 also includes a display 1940 to provide visual output to a user.

The computing device 1900 also includes a communications interface 1930. In some examples, the communications interface 1930 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, which may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

These illustrative examples are mentioned not to limit or define the scope of this disclosure, but rather to provide examples to aid understanding thereof. Illustrative examples are discussed above in the Detailed Description, which provides further description. Advantages offered by various examples may be further understood by examining this specification.

As used below, any reference to a series of examples is to be understood as a reference to each of those examples disjunctively (e.g., "Examples 1-4" is to be understood as "Examples 1, 2, 3, or 4").

Example #1: A computer implemented method for generating a virtual character, the method comprising: accessing a source human face model, a target human face model, and a source virtual character face model; accessing one or more feature curves marked on the source human face model and the source virtual character face model; deforming the source virtual character face model based on the source human face model and the target human face model to generate a target virtual character face model, wherein deforming the source virtual character face model comprises: minimizing a loss function comprising one or more terms defined based on the one or more feature curves to preserve one or more features of the source virtual character face model on the target virtual character face model; and rendering the target virtual character face model.

Example #2: The method of Example #1, wherein: the one or more features comprise a local curve feature defined by a feature curve of the one or more feature curves; deforming the source virtual character face model comprises generating a set of virtual triangles based on vertices of the feature curve; and the one or more terms comprise a term defined based on the set of virtual triangles.

Example #3: The method of Examples #1-2, wherein the term defined based on the set of virtual triangles comprises differences between deformation gradients of the set of virtual triangles and an identity deformation gradient.

Example #4: The method of Examples #1-3, wherein the local curve feature is one or more of a mouth curve feature or an eye curve feature.

Example #5: The method of Examples #1-4, wherein the one or more features comprise a closeness feature defined by a first feature curve and a second feature curve of the one or more feature curves, and the one or more terms comprise a term defined based on a mapping distance between the first feature curve and the second feature curve.

Example #6: The method of Examples #1-5, wherein the closeness feature is associated with one or more a mouth or an eye of the virtual character.

Example #7: The method of Examples #1-6, wherein the loss function further comprises a term defined based on symmetric pairs of vertices in the source virtual character face model.

Example #8: The method of Examples #1-7, wherein the one or more feature curves are defined based on landmark points on the source human face model.

Example #9: A system comprising: a non-transitory computer-readable medium; and a processor communicatively coupled to the non-transitory computer-readable medium, the processor configured to execute processor-executable instructions stored in the non-transitory computer-readable medium to: access a source human face model, a target human face model, and a source virtual character face model; access one or more feature curves marked on the source human face model and the source virtual character face model; deform the source virtual character face model based on the source human face model and the target human face model to generate a target virtual character face model, wherein deforming the source virtual character face model comprises: minimizing a loss function comprising one or more terms defined based on the one or more feature curves to preserve one or more features of the source virtual character face model on the target virtual character face model; and render the target virtual character face model.

Example #10: The system of Example #9, wherein: the one or more features comprise a local curve feature defined by a feature curve of the one or more feature curves; deforming the source virtual character face model comprises generating a set of virtual triangles based on vertices of the feature curve; and the one or more terms comprise a term defined based on the set of virtual triangles.

Example #11: The system of Examples #9-10, wherein the term defined based on the set of virtual triangles comprises differences between deformation gradients of the set of virtual triangles and an identity deformation gradient.

Example #12: The system of Examples #9-11, wherein the local curve feature is one or more of a mouth curve feature or an eye curve feature.

Example #13: The system of Examples #9-12, wherein the one or more features comprise a closeness feature defined by a first feature curve and a second feature curve of the one or more feature curves, and the one or more terms comprise a term defined based on a mapping distance between the first feature curve and the second feature curve.

Example #14: The system of Examples #9-13, wherein the closeness feature is associated with one or more a mouth or an eye of the virtual character.

Example #15: The system of Examples #9-14, wherein the loss function further comprises a term defined based on symmetric pairs of vertices in the source virtual character face model.

Example #16: A non-transitory computer-readable medium comprising processor-executable instructions configured to cause one or more processors to: access a source human face model, a target human face model, and a source virtual character face model; access one or more feature curves marked on the source human face model and the source virtual character face model; deform the source virtual character face model based on the source human face model and the target human face model to generate a target virtual character face model, wherein deforming the source virtual character face model comprises: minimizing a loss function comprising one or more terms defined based on the one or more feature curves to preserve one or more features of the source virtual character face model on the target virtual character face model; and render the target virtual character face model.

Example #17: The non-transitory computer-readable medium of Example #16, wherein: the one or more features comprise a local curve feature defined by a feature curve of the one or more feature curves; deforming the source virtual character face model comprises generating a set of virtual triangles based on vertices of the feature curve; and the one or more terms comprise a term defined based on the set of virtual triangles.

Example #18: The non-transitory computer-readable medium of Examples #16-17, wherein the term defined based on the set of virtual triangles comprises differences between deformation gradients of the set of virtual triangles and an identity deformation gradient.

Example #19: The non-transitory computer-readable medium of Examples #16-18, wherein the local curve feature is one or more of a mouth curve feature or an eye curve feature.

Example #20: The non-transitory computer-readable medium of Examples #16-19, wherein the one or more features comprise a closeness feature defined by a first feature curve and a second feature curve of the one or more feature curves, and the one or more terms comprise a term defined based on a mapping distance between the first feature curve and the second feature curve.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

The invention claimed is:

1. A computer implemented method for generating a virtual character, the method comprising:
   accessing a source human face model, a target human face model, and a source virtual character face model;
   accessing one or more feature curves marked on the source human face model and the source virtual character face model;
   deforming the source virtual character face model based on the source human face model and the target human face model to generate a target virtual character face model, wherein deforming the source virtual character face model comprises:

generating a set of virtual triangles based on vertices of a feature curve of the one or more feature curves;

obtaining a loss function comprising one or more terms, wherein the one or more terms comprise a term defined based on the set of virtual triangles, and wherein the term comprises differences between deformation gradients of the set of virtual triangles and an identity deformation gradient; and minimizing the loss function to preserve one or more features of the source virtual character face model on the target virtual character face model, wherein the one or more features comprise a local curve feature defined by the feature curve of the one or more feature curves; and rendering the target virtual character face model.

2. The method of claim 1, wherein the local curve feature is one or more of a mouth curve feature or an eye curve feature.

3. The method of claim 1, wherein the one or more features comprise a closeness feature defined by a first feature curve and a second feature curve of the one or more feature curves, and the one or more terms comprise a term defined based on a mapping distance between the first feature curve and the second feature curve.

4. The method of claim 3, wherein the closeness feature is associated with a mouth or an eye of the virtual character.

5. The method of claim 1, wherein the loss function further comprises a term defined based on symmetric pairs of vertices in the source virtual character face model.

6. The method of claim 1, wherein the one or more feature curves are defined based on landmark points on the source human face model.

7. A system comprising:

a non-transitory computer-readable medium; and a processor communicatively coupled to the non-transitory computer-readable medium, the processor configured to execute processor-executable instructions stored in the non-transitory computer-readable medium to:

access a source human face model, a target human face model, and a source virtual character face model;

access one or more feature curves marked on the source human face model and the source virtual character face model;

deform the source virtual character face model based on the source human face model and the target human face model to generate a target virtual character face model, wherein deforming the source virtual character face model comprises:

generating a set of virtual triangles based on vertices of a feature curve of the one or more feature curves;

obtaining a loss function comprising one or more terms, wherein the one or more terms comprise a term defined based on the set of virtual triangles, and wherein the term comprises differences between deformation gradients of the set of virtual triangles and an identity deformation gradient; and minimizing the loss function to preserve one or more features of the source virtual character face model on the target virtual character face model, wherein the one or more features comprise a local curve feature defined by the feature curve of the one or more feature curves; and render the target virtual character face model.

8. The system of claim 7, wherein the local curve feature is one or more of a mouth curve feature or an eye curve feature.

9. The system of claim 7, wherein the one or more features comprise a closeness feature defined by a first feature curve and a second feature curve of the one or more feature curves, and the one or more terms comprise a term defined based on a mapping distance between the first feature curve and the second feature curve.

10. The system of claim 9, wherein the closeness feature is associated with a mouth or an eye of a virtual character.

11. The system of claim 7, wherein the loss function further comprises a term defined based on symmetric pairs of vertices in the source virtual character face model.

12. A non-transitory computer-readable medium comprising processor-executable instructions configured to cause one or more processors to:

access a source human face model, a target human face model, and a source virtual character face model;

access one or more feature curves marked on the source human face model and the source virtual character face model;

deform the source virtual character face model based on the source human face model and the target human face model to generate a target virtual character face model, wherein deforming the source virtual character face model comprises:

generating a set of virtual triangles based on vertices of a feature curve of the one or more feature curves;

obtaining a loss function comprising one or more terms, wherein the one or more terms comprise a term defined based on the set of virtual triangles, and wherein the term comprises differences between deformation gradients of the set of virtual triangles and an identity deformation gradient; and minimizing the loss function to preserve one or more features of the source virtual character face model on the target virtual character face model, wherein the one or more features comprise a local curve feature defined by the feature curve of the one or more feature curves; and render the target virtual character face model.

13. The non-transitory computer-readable medium of claim 12, wherein the local curve feature is one or more of a mouth curve feature or an eye curve feature.

14. The non-transitory computer-readable medium of claim 12, wherein the one or more features comprise a closeness feature defined by a first feature curve and a second feature curve of the one or more feature curves, and the one or more terms comprise a term defined based on a mapping distance between the first feature curve and the second feature curve.

* * * * *